United States Patent
Curry

(10) Patent No.: US 9,185,361 B2
(45) Date of Patent: Nov. 10, 2015

(54) CAMERA-BASED TRACKING AND POSITION DETERMINATION FOR SPORTING EVENTS USING EVENT INFORMATION AND INTELLIGENCE DATA EXTRACTED IN REAL-TIME FROM POSITION INFORMATION

(75) Inventor: Gerald Curry, Hermosa Beach, CA (US)

(73) Assignee: Gerald Curry, Hermosa Beach, CA (US)

( * ) Notice: Subject to any disclaimer, the term of this patent is extended or adjusted under 35 U.S.C. 154(b) by 760 days.

(21) Appl. No.: 12/511,918

(22) Filed: Jul. 29, 2009

(65) Prior Publication Data

US 2010/0026809 A1 Feb. 4, 2010

Related U.S. Application Data

(60) Provisional application No. 61/137,261, filed on Jul. 29, 2008, provisional application No. 61/209,377, filed on Mar. 6, 2009.

(51) Int. Cl.
*H04N 5/225* (2006.01)
*H04N 5/335* (2011.01)
(Continued)

(52) U.S. Cl.
CPC .............. *H04N 7/183* (2013.01); *G06K 9/209* (2013.01); *H04L 67/12* (2013.01); *H04N 5/222* (2013.01);
(Continued)

(58) Field of Classification Search
CPC .......... H04L 67/22; H04L 67/12; H04N 7/18; H04N 5/222; H04N 5/232; H04N 7/181; H04N 7/183; H04N 5/23238; H04N 21/21805; H04N 21/44008; H04N 21/8126; G06F 3/04842; G06K 9/209
USPC ......... 348/148, 157, 143, 159, 169, 162, 163, 348/164
See application file for complete search history.

(56) References Cited

U.S. PATENT DOCUMENTS 5,363,297 A 11/1994 Larson et al.
5,513,854 A * 5/1996 Daver .............................. 700/91
(Continued)

FOREIGN PATENT DOCUMENTS

CH 628192 A5 2/1982
EP 1480450 A2 11/2004
(Continued)

OTHER PUBLICATIONS

Extended European Search Report dated Nov. 8, 2013 for European Application No. 09166775.8, 6 pages.

*Primary Examiner* — Daniel C Murray
(74) *Attorney, Agent, or Firm* — Kilpatrick Townsend & Stockton LLP

(57) ABSTRACT

Position information of equipment at an event, such as a ball, one or more players, or other items in a game or sporting event, is used in selecting camera, camera shot type, camera angle, audio signals, and/or other output data for providing a multimedia presentation of the event to a viewer. The position information is used to determine the desired viewer perspective. A network of feedback robotically controlled Pan-Tilt-Zoom (PTZ), manually controlled cameras and stationary cameras work together with interpolation techniques to create a 2D video signal. The position information may also be used to access gaming rules and assist officiating of the event. The position information may be obtained through a transceiver(s), accelerometer(s), transponder(s), and/or RADAR detectable element(s) fitted into the ball, apparel or equipment of players, the players themselves, or other playing equipment associated with the game or sporting event. Other positioning methods that can be used include infrared video-based tracking systems, SONAR positioning system(s), LIDAR positioning systems, and digital signal processing (DSP) image processing techniques such as triangulation.

95 Claims, 33 Drawing Sheets

(51) Int. Cl.
*H04N 7/18* (2006.01)
*H04L 29/08* (2006.01)
*H04N 21/81* (2011.01)
*H04N 21/44* (2011.01)
*G06K 9/20* (2006.01)
*H04N 21/218* (2011.01)
*H04N 5/222* (2006.01)
*H04N 5/232* (2006.01)

(52) U.S. Cl.
CPC ........... *H04N 5/232* (2013.01); *H04N 5/23238* (2013.01); *H04N 7/181* (2013.01); *H04N 21/21805* (2013.01); *H04N 21/44008* (2013.01); *H04N 21/8126* (2013.01)

(56) References Cited

U.S. PATENT DOCUMENTS

| | | | |
|---|---|---|---|
| 5,745,126 A | 4/1998 | Jain et al. | |
| 5,850,352 A * | 12/1998 | Moezzi et al. | 345/419 |
| 6,005,610 A | 12/1999 | Pingali | |
| 6,441,846 B1 * | 8/2002 | Carlbom et al. | 348/169 |
| 6,671,390 B1 * | 12/2003 | Barbour et al. | 382/103 |
| 6,678,641 B2 * | 1/2004 | Gibbs et al. | 702/189 |
| 6,681,398 B1 | 1/2004 | Verna | |
| 6,950,123 B2 * | 9/2005 | Martins | 348/157 |
| 7,231,088 B2 * | 6/2007 | Echigo et al. | 382/225 |
| 7,327,383 B2 * | 2/2008 | Valleriano et al. | 348/143 |
| 8,013,899 B2 * | 9/2011 | Gillard et al. | 348/218.1 |
| 8,353,791 B2 * | 1/2013 | Holthouse et al. | 473/415 |
| 8,427,545 B2 * | 4/2013 | Porter et al. | 348/218.1 |
| 8,451,333 B2 * | 5/2013 | Sandler et al. | 348/169 |
| 8,659,663 B2 * | 2/2014 | Elangovan et al. | 348/157 |
| 8,711,224 B2 * | 4/2014 | Sandler et al. | 348/157 |
| 8,723,956 B2 * | 5/2014 | Anderson | 348/157 |
| 8,848,066 B2 * | 9/2014 | Porter et al. | 348/218.1 |
| 9,007,463 B2 * | 4/2015 | Elangovan et al. | 348/157 |
| 2003/0003925 A1 | 1/2003 | Suzuki | |
| 2003/0036887 A1 * | 2/2003 | Gibbs et al. | 702/189 |
| 2003/0049590 A1 * | 3/2003 | Feldbau | 434/251 |
| 2003/0179294 A1 * | 9/2003 | Martins | 348/157 |
| 2005/0093976 A1 * | 5/2005 | Valleriano et al. | 348/143 |
| 2007/0135243 A1 * | 6/2007 | LaRue et al. | 473/467 |
| 2008/0192116 A1 * | 8/2008 | Tamir et al. | 348/157 |
| 2009/0041298 A1 * | 2/2009 | Sandler et al. | 382/103 |
| 2009/0046152 A1 * | 2/2009 | Aman | 348/157 |
| 2009/0048039 A1 * | 2/2009 | Holthouse et al. | 473/415 |
| 2009/0059007 A1 * | 3/2009 | Wagg et al. | 348/157 |
| 2009/0262193 A1 * | 10/2009 | Anderson | 348/157 |
| 2009/0284601 A1 * | 11/2009 | Eledath et al. | 348/157 |
| 2010/0026801 A1 * | 2/2010 | Williams et al. | 348/135 |
| 2010/0134614 A1 * | 6/2010 | Aman | 348/135 |
| 2011/0169959 A1 * | 7/2011 | DeAngelis et al. | 348/157 |
| 2012/0162435 A1 * | 6/2012 | Elangovan et al. | 348/157 |
| 2013/0300832 A1 * | 11/2013 | Hohteri et al. | 348/46 |
| 2014/0074263 A1 * | 3/2014 | Balakrishnan et al. | 700/91 |
| 2014/0125807 A1 * | 5/2014 | Elangovan et al. | 348/157 |
| 2014/0364141 A1 * | 12/2014 | O'Hagan et al. | 455/456.1 |
| 2015/0002272 A1 * | 1/2015 | Alonso et al. | 340/10.1 |

FOREIGN PATENT DOCUMENTS

| | | |
|---|---|---|
| EP | 1916845 A1 | 4/2008 |
| EP | 1928178 A1 | 6/2008 |
| JP | 2005-130230 A | 5/2005 |
| WO | 00/31560 A2 | 6/2000 |
| WO | 03/010966 A1 | 2/2003 |

* cited by examiner

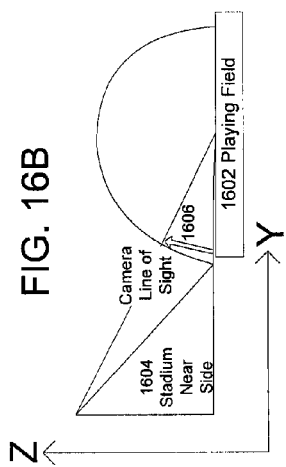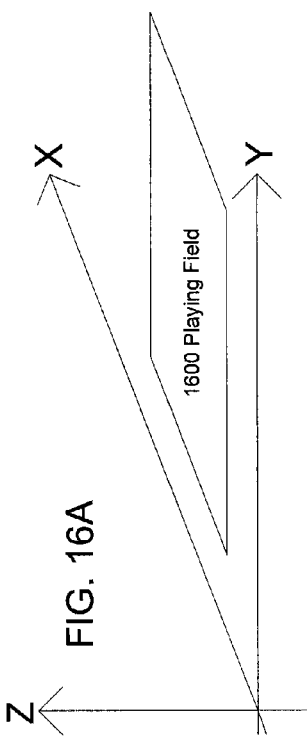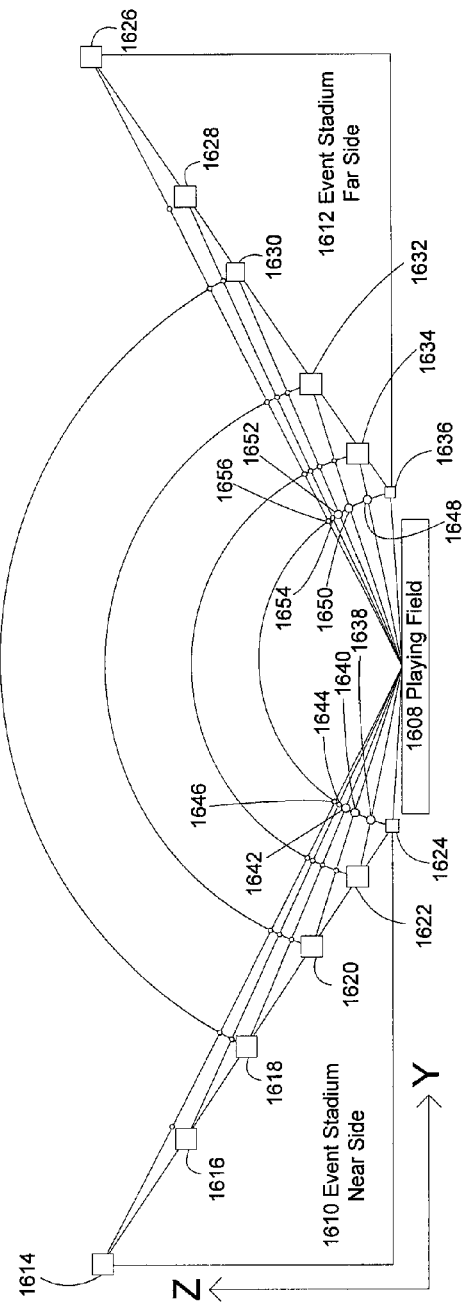
FIG. 16A
FIG. 16B
FIG. 16C

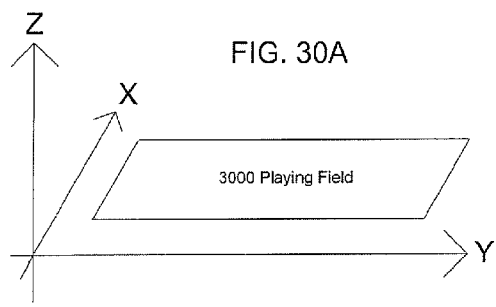
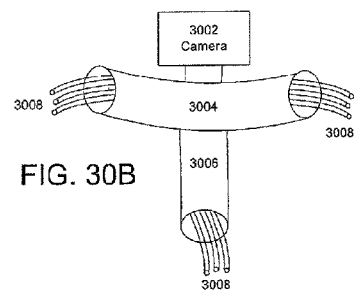
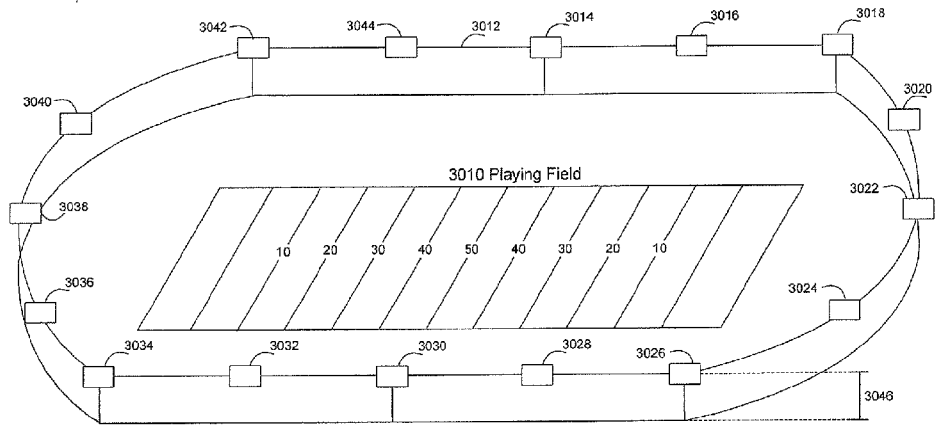
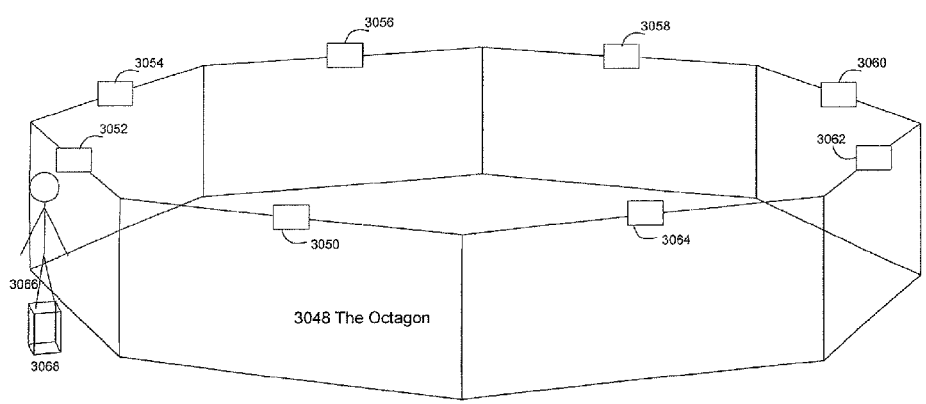

CAMERA-BASED TRACKING AND POSITION DETERMINATION FOR SPORTING EVENTS USING EVENT INFORMATION AND INTELLIGENCE DATA EXTRACTED IN REAL-TIME FROM POSITION INFORMATION

CROSS-REFERENCE TO RELATED APPLICATIONS

This application claims priority of U.S. Provisional Patent Application Ser. No. 61/137,261 entitled "Camera-Based Tracking And Position Determination For Sporting Events" by G. Curry filed Jul. 29, 2008 and U.S. Provisional Patent Application Ser. No. 61/209,377 entitled "Camera-Based Tracking And Position Determination For Sporting Events" by G. Curry filed Mar. 6, 2009. Priority of the filing dates of these Provisional Patent applications is hereby claimed, and the disclosures of these applications is hereby incorporated by reference.

BACKGROUND

1. Field of the Invention

The present invention relates to determining the position and other related data of a ball, playing equipment, and/or players in a game of play or sporting event and selecting video and audio data relating to the game or sporting event. The invention is also applicable towards video coverage of any live event.

2. Description of the Related Art

Presently in sports, the location of the ball and/or the players in a game of play is not specifically calibrated using technology. Referee officiating is generally left in the hands of human observation. The position of a ball during play is critical to game progress and typically determines the outcome of play. For example, in baseball, a strike is called according to the position of the ball as it crosses the plate in front of a batter. It is, however, often difficult to determine the location of a ball during play. Observers of a game who are interested in the outcome have a similar interest in better determining the position of a ball during play. Enjoyment of sports entertainment events would be increased by improved determination of ball position.

Many games and sporting events are televised or recorded with cameras for later viewing. The production of such event coverage involves the choice of camera placement for multiple cameras at an event and deciding which camera feed to use for the coverage that will be viewed for broadcast. These decisions are placed in the hands of humans—camera operators and other broadcasting personnel. Some important moments of play can be missed if the selected broadcast feed is not focused on the action of play. Often, the action in a game or sporting event occurs so quickly that it is difficult or in some cases impossible given the limits of human reaction speed for human observation and decision making to keep up with optimal selection of cameras and vantage point.

Currently in sports coverage, camera selection/switching, camera shot type, and camera angles are typically selected from a broadcasting booth by an event production director. The director communicates with the camera operators on the field and a team of intermediaries and then decides which camera feed and type of shot will be selected for the broadcast. The delay in this process can be relatively long, as it depends on a multitude of human interactions. In addition, EWSs (Extremely Wide Shot) or VWSs (Very Wide Shot) with "birds-eye view" camera angles are used more often than not in coverage, though such shots are lacking in detail and interest. This is due to the unpredictable nature of the event and the need for a live feed, in combination with the reality that a closer shot may very well forgo the desired action.

Another item still left in human hands is enforcement of the rules for the game or event. Gaming officials consistently have to use their limited powers of observation in a brief moment to judge the location of the ball and the players in a game. Often times, the official's decision hinges on whether or not the ball or a player is at a particular location at a particular time. The officiating task can be very difficult to perform accurately and requires special training. More recently however, some assistance from available technologies has been incorporated. For example, Instant-Replay has been included in some rule books such as in the games of the National Football League (NFL). In the NFL, coaches are provided with the opportunity to challenge calls by officials and request instant replay review of the on-the-field call by a designated official, who reviews just-recorded images from television coverage to either confirm or reverse the call on the field.

From the discussion above, it should be apparent that there is a need for greater availability of technology to assist with coverage of games and sporting events and with rules enforcement during games and sporting events. Embodiments according to the disclosure satisfy this need.

SUMMARY

Camera selection and viewpoint are selected in accordance with position information for balls, game equipment, and players during a game or sporting event. Such position information may be obtained, for example, using devices such as a transceiver, a transponder, an accelerometer, and/or a RADAR positioning device installed within a game ball, gaming equipment, apparel worn by players, and the like. Such devices can be fit or clipped onto, or embedded within, game equipment, apparel and clothing, and the like. In addition, infrared video-based tracking systems may be used in conjunction with the aforementioned positioning methods for better player and ball position tracking. Other positioning methods include digital signal processing (DSP) image processing techniques, LIDAR, and SONAR positioning techniques. Image processing techniques such as triangulation can be used to help detect the location of different objects. The position as well as other related data of the ball and/or associated players in a game can be determined in real-time. The data is used to select cameras and viewpoints for maximum interest, and is made available to officials for more accurate rules enforcement. Additionally, one embodiment (viewing mode) uses a 3D model of the gaming or event arena to position cameras (stationary and Pan-Tilt-Zoom) for optimal coverage. The position information from the players and ball is then used to determine the 3D location from where the game should be viewed. The multiple video signals (or video feeds) and interpolation techniques are used to construct the 2D viewer perspective from the 3D location determined.

Other features and advantages of embodiments in accordance with the disclosure should be apparent from the following description of the preferred embodiments, which illustrate, by way of example, the principles of the invention.

BRIEF DESCRIPTION OF THE DRAWINGS

This invention will be better understood when read in conjunction with the following figures or drawings:

FIGS. 16A, 16B, and 16C show camera configurations that allow for vertical or up-and-down rotating video shots in accordance with the disclosure.

FIGS. 30A, 30B, 30C, and 30D shows different camera mounting apparatuses that are used to place cameras around the ongoing event in accordance with the disclosure.

DETAILED DESCRIPTION

Figure 1:
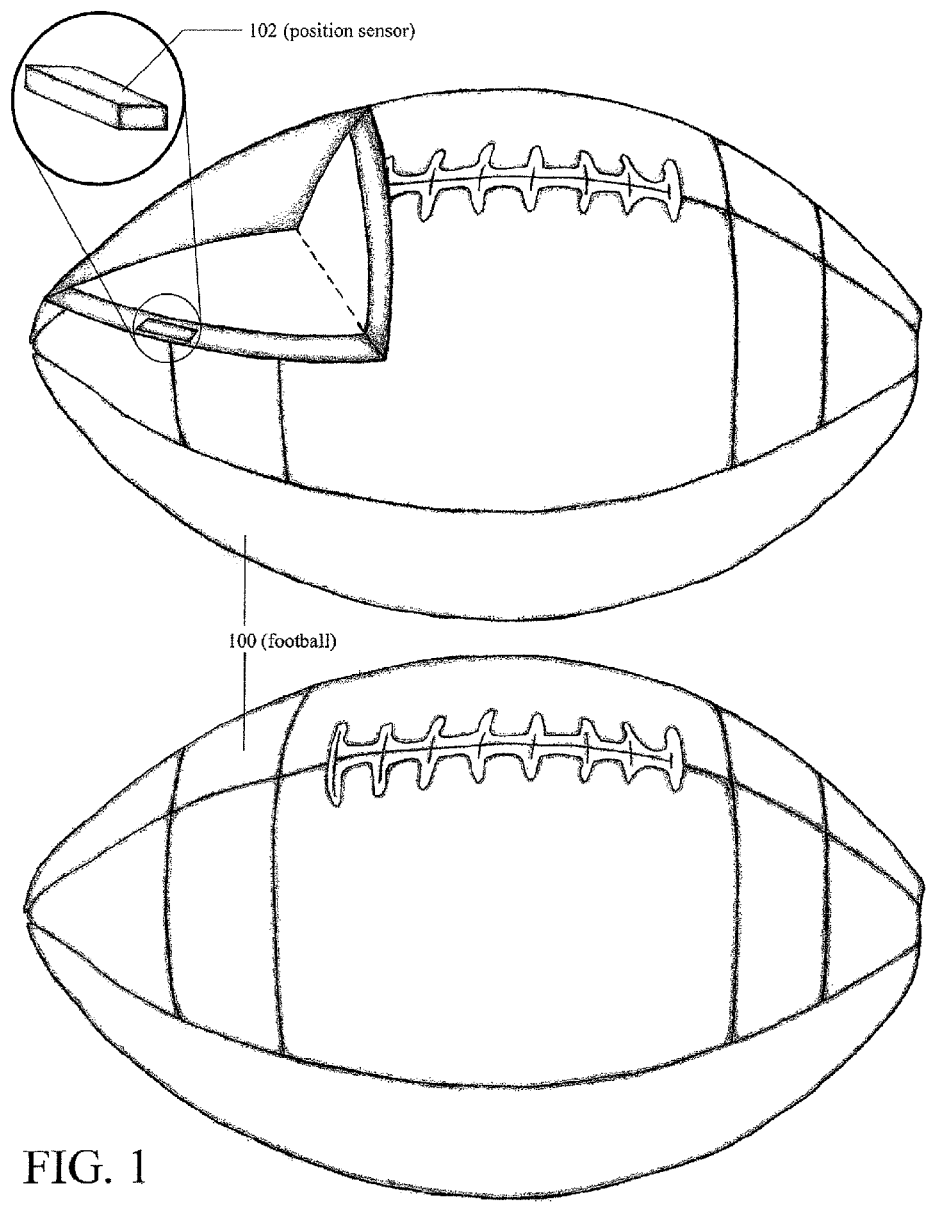
FIG. 1 shows a football constructed in accordance with the disclosure, having an embedded position tracking device to provide position data.

The embodiments disclosed herein provide improvements to coverage of games and sporting events. The invention described herein is also applicable to gaming practices, filming movies, or other live events that wish to be captured with sophisticated comprehensive coverage. In addition, the invention described herein allows for events to be captured from many different perspectives even if there is not going to be a live viewing. Gaming practices and expensive special effects shots during movie filming are examples of events that the system described herein can capture for later viewing. The embodiments provide a system that can use hardware and software to select the cameras, type of camera shot, and camera angles that will be used during coverage viewing based on where the player and the ball are at a given time during the event. This scenario is different from the present manual system where the production director, camera operators, and various intermediaries including producers, associate producers, associate directors, production managers, stage managers, production assistants, spotters, tape assistant directors, technical directors, vision mixers, vision switchers, electronic still store operators, camera assistants, RF (Radio Frequency) assistants, riggers, audio mixers, audio supervisors, audio assistants, video engineers, camera control unit operators, archivists, video tape recorder operators, slow-motion operators, editors, graphics operators, font operators, character generator operators, font coordinators, technical managers, field loggers, and chief vision engineers manually select which camera feed and viewpoint to use. The disclosed systems minimize the delay between what is happening on the field and which camera, type of shot, and/or camera angle is chosen for coverage. Electronics can now make decisions given the positions of the ball and/or the players in a game. In addition, since the time latency between the event and the decision making process can be minimized by electronics, a range of varied camera selection and differing camera shots and angles that were previously impossible, can now be made quite possible. The traditional EWSs or VWSs with "birds-eye view" angles can be replaced or complimented with a range of more dynamic closer and quickly panning shots. The entertainment package system described herein may be designed to work in conjunction with the present system of camera operators, intermediaries, and the production director. In that scenario, the majority of the decisions are made by the electronics and the camera operators, intermediaries, and the production director oversee and make sure the electronics and software are capturing the event in a desirable fashion.

The position of the ball and/or the players in a game of play can also be of use for rules enforcement and to officiating. Indirectly, new camera shots and angles can help officials when reviewing plays, such as in the NFL Instant Replay reviews. One embodiment (viewing mode) includes the usage of more advanced technologies to create a computer generated (CG) 3D environment of the event. This 3D environment can also be used to select from many different cameras around the event. More camera angles can certainly assist officials in After Action Review and Instant Replay reviews. More directly, the position of the ball and/or the players could be incorporated into the game ruling process.

Ball Tracking and Position Information

Figure 2:
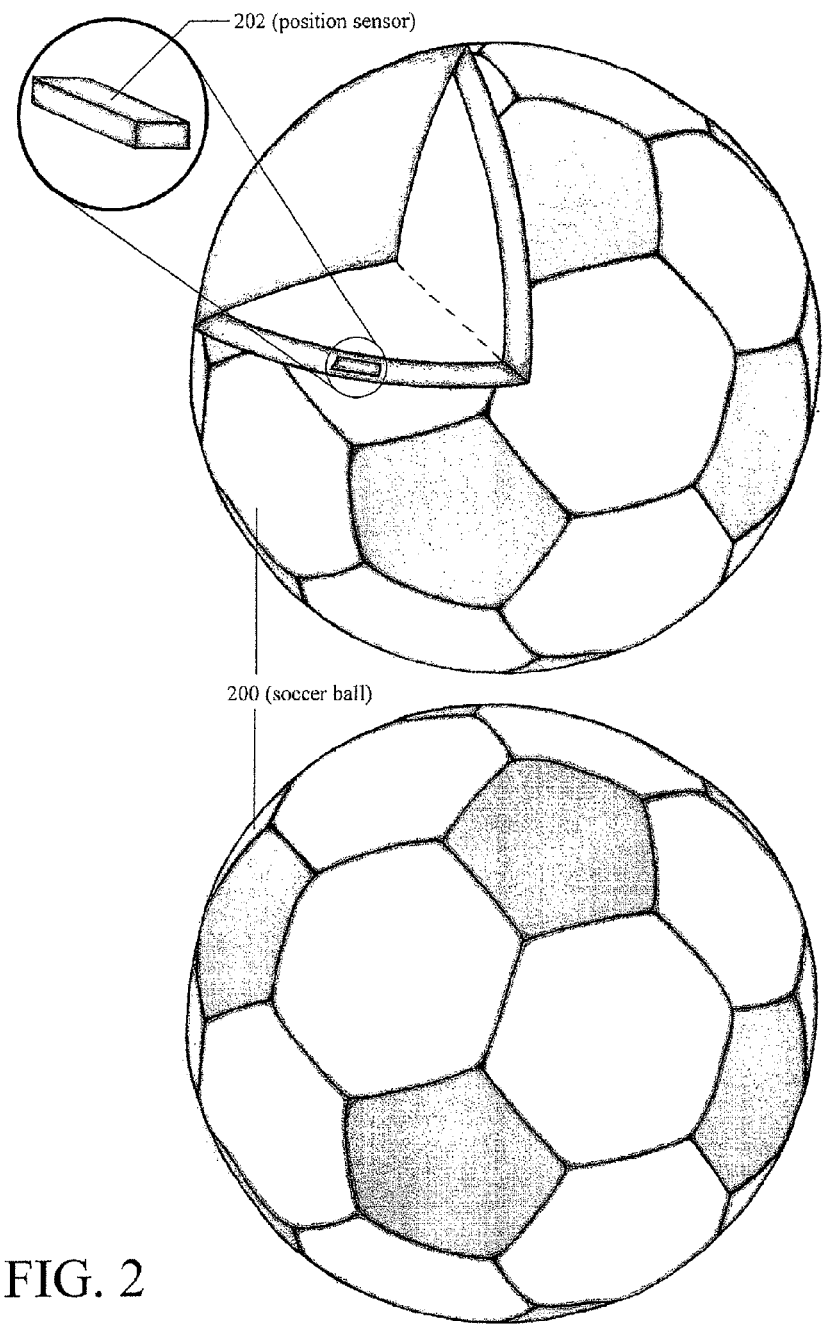
FIG. 2 shows a soccer ball constructed in accordance with the disclosure to provide position data.
Figure 3:
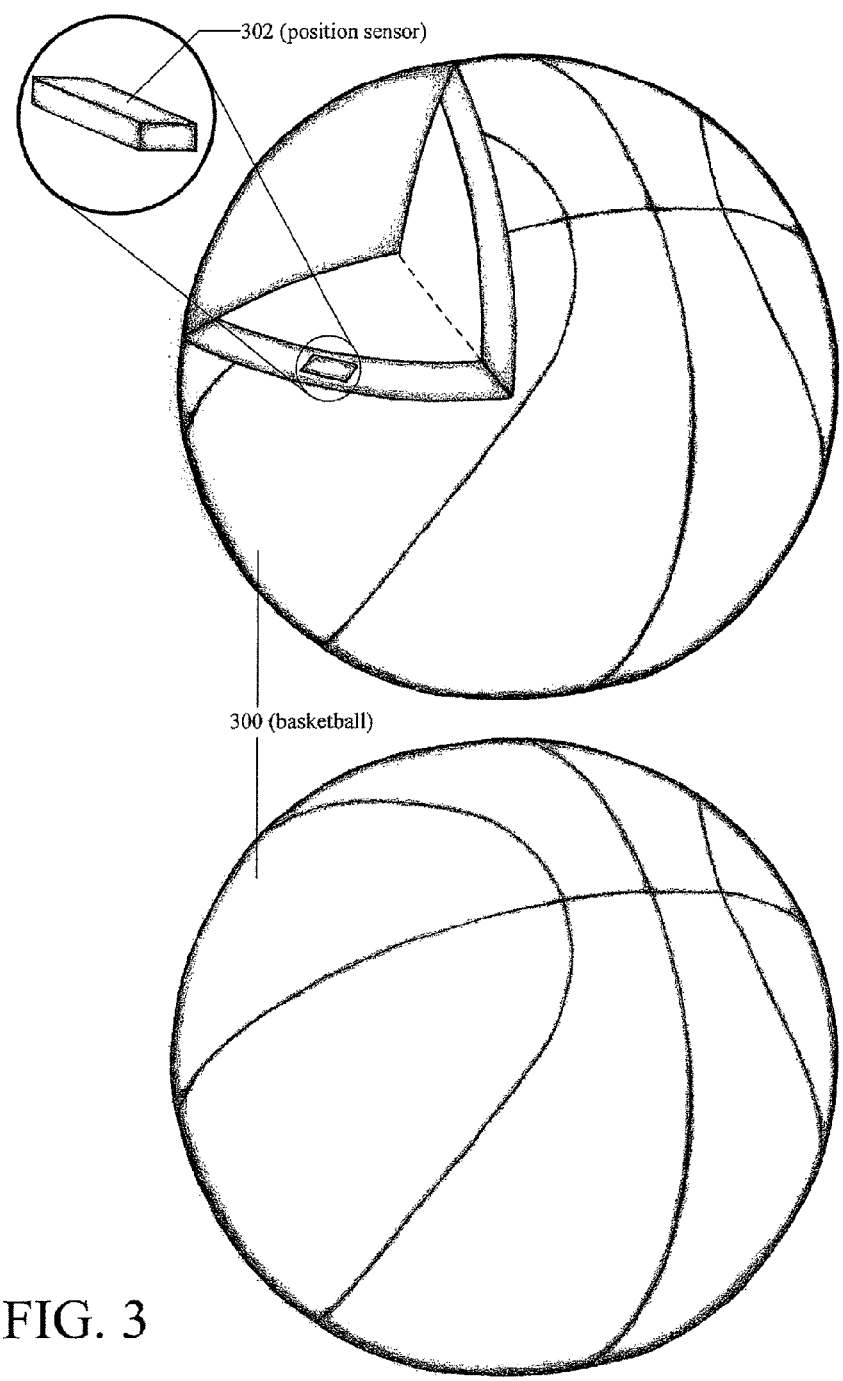
FIG. 3 shows a basketball constructed in accordance with the disclosure to provide position data.

The ball's location at a given time or the real-time position information of the ball is determined. The ball in a game is constructed so that a position sensor such as a transceiver and/or accelerometer can fit into the ball itself (see FIGS. 1 through 3). Other positioning system options make use of transponders, infrared video-based tracking systems, SONAR positioning systems, LIDAR positioning systems, and/or RADAR positioning systems. In the case of a RADAR positioning system, a RADAR detectable element is used as the position sensor and incorporated into the ball. For example, FIG. 1 shows a football 100 and what the football 100 would look like if part of it were cut out to reveal an embedded position sensor 102. Circles are used to spot shadow a zoomed-in look at the position sensor 102 itself. FIG. 2 shows a soccer ball 200 and what the soccer ball 200 would look like if part of it were cut out to reveal an embedded position sensor 202. Circles are used to spot shadow a zoomed-in look at the position sensor 202 itself. FIG. 3 shows a basketball 300 and what the basketball 300 would look like if part of it were cut out to reveal an embedded position sensor 302. Circles are used to spot shadow a zoomed-in look at the position sensor 302 itself.

Recent advances in electronics allow the fabrication of transceivers as small as a fingernail (a few millimeters in width, length and height) if not even smaller. The circuitry is then capable of transmitting signals to a system nearby the ball. The system uses the time it takes the signals to travel to and from the ball as well as the velocity and/or acceleration of the ball to calculate position information such as where the ball is on the field. The transceiver, RADAR detectable element, and/or accelerometer have to be designed to absorb the impact and force created by a game of play. This is similar to chips that are designed to fit onto rockets and spacecraft as they need to be able to survive an extremity of force when the rockets blast off Earth's surface. In addition, a power source can be incorporated into the chip. A port similar to the air pump source of a ball can be included in the ball design to allow for wired charging of the device. The power source can also be designed to charge wirelessly when in range of set designated charging signals. Wireless charging is similar to the way in which passive RFIDs use a magnetic field to induce a voltage on an inductive system inside an RFID chip. In this situation however, the chip charges and stores the voltage induced on the chip as opposed to using it for temporary functionality (as RFIDs do). Hermetic packaging is used to seal the chip from its surroundings. The position sensors should not affect the way the ball will interact in a game of play. Therefore, the power source is designed such that it is not heavy enough to affect the flight of the ball.

The ball can be constructed so the position sensor can fit within the ball itself. The position sensor is integrated into the rubber, bladder, and lining that make up the ball's outer surface (such as for a basketball, football or soccer ball). The sensor is incorporated into the ball so that it will not affect the flight of the ball and so that it can withstand impact without being damaged. The space taken up by the sensor is small and the sensor is designed so that it will not alter the ball's movement. Also, more than one transceiver and/or accelerometer may be embedded within the ball. This addition allows backup circuitry in case the initial circuitry fails. Also, multiple signals (e.g., three or more) allow the three-dimensional space occupied by the ball to be determined. One embodiment can use one transceiver with two or more other sensors. The other sensors are able to send three or more position data points to the transceiver. The transceiver then is able to send all of the data points together in one signal to the system outside of the ball which can use those data points to construct the 3D positional space presently occupied by the ball in software. Those skilled in the art will understand how such circuitry is provided in view of this description.

One way of embedding the position sensor or circuitry within the ball is to construct the circuitry within an integrated circuit chip and implant the chip during the manufacturing of the ball itself. This also applies to the other types of sensors such as accelerometers and RADAR detectable elements. This means that the chip is able to be positioned in the rubber, bladder and lining used to make the ball as it is made. The chip is sealed with hermetic packaging strong enough to deal with the manufacturing process of the ball. The molds used to make the balls are augmented to incorporate the embedded chip and/or other position sensors. Other options for ball transceivers are discussed later in the SURGICALLY IMPLANTABLE, PLASTIC, and NANOTUBE TRANSCIEVERS section.

Position sensors such as transceivers and/or accelerometers can be used in conjunction with any equipment to be located within the field of view of any cameras that are present during the event. For example, sensors may be embedded within a ball, and can include identification information that is transmitted along with the position information. In this way, the system can identify the ball (or other item of equipment) to which the position information is related. This scheme can enable multiple balls to be tracked during the event. For example, during the course of a game, multiple balls can be used, or balls can be taken out of play and replaced, or may be lost in the stands, and so forth. Prior to initiating operation of the system at the event, the sensors that are embedded or otherwise associated with the balls and equipment to be used during the event can be identified and made known to the system through a calibration process such that, during the event, position information and identification information transmitted from any equipment can be processed by the system to determine the item of equipment from which the information is received. Equipment at the ongoing event includes the ball, puck, or other gaming projectile used during the event.

Image processing techniques such as triangulation can be used to help detect the location of different objects such as the ball in a game of play. This method is also known in computer vision as triangulation. The method determines a point in 3D space given two or more 2D images of correlating features. The position of the two or more cameras that took the 2D images must be known to use this technique. Those of skill in the art understand how to use this method from the description described herein.

Player Position Sensors and Position Information

Figure 4:
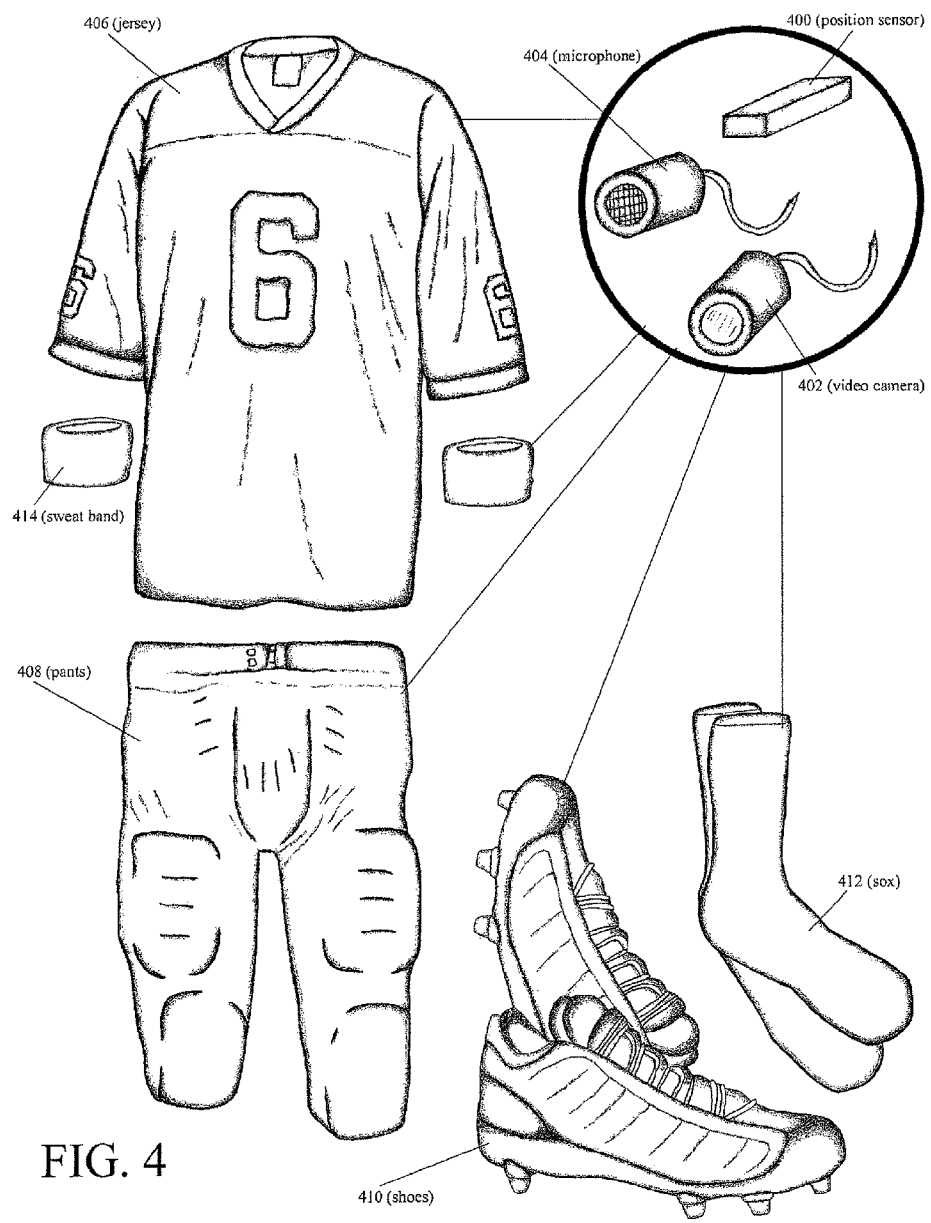
FIG. 4 shows sporting equipment and apparel constructed in accordance with the disclosure to provide position data.

The players' location at a given time or the real-time position information of the players is determined. Position sensors, such as transceivers and/or accelerometers, are used to provide position information and related data about players in a game. Other position system options can make use of transponders, infrared video-based tracking systems, LIDAR positioning systems, SONAR positioning systems, and/or RADAR positioning systems. In the case of a RADAR positioning system, a RADAR detectable element is used as the player position sensor. For example, FIG. 4 shows sporting equipment, apparel, clothing and the like typically used by football players. FIG. 4 shows small position sensors (such as transceivers) 400 that are designed to fit onto, clip onto, be embedded into, or placed under the various depicted items: football jersey 406, football pants 408, shoes 410, socks 412, sweat band or arm band 414. Football pants 408 include knee and thigh pads and a girdle with the associated hip pads and tail bone pad. Also, small audio transducers such as microphones 404 and small video cameras 402 can be incorporated into the aforementioned items.

Figure 5:
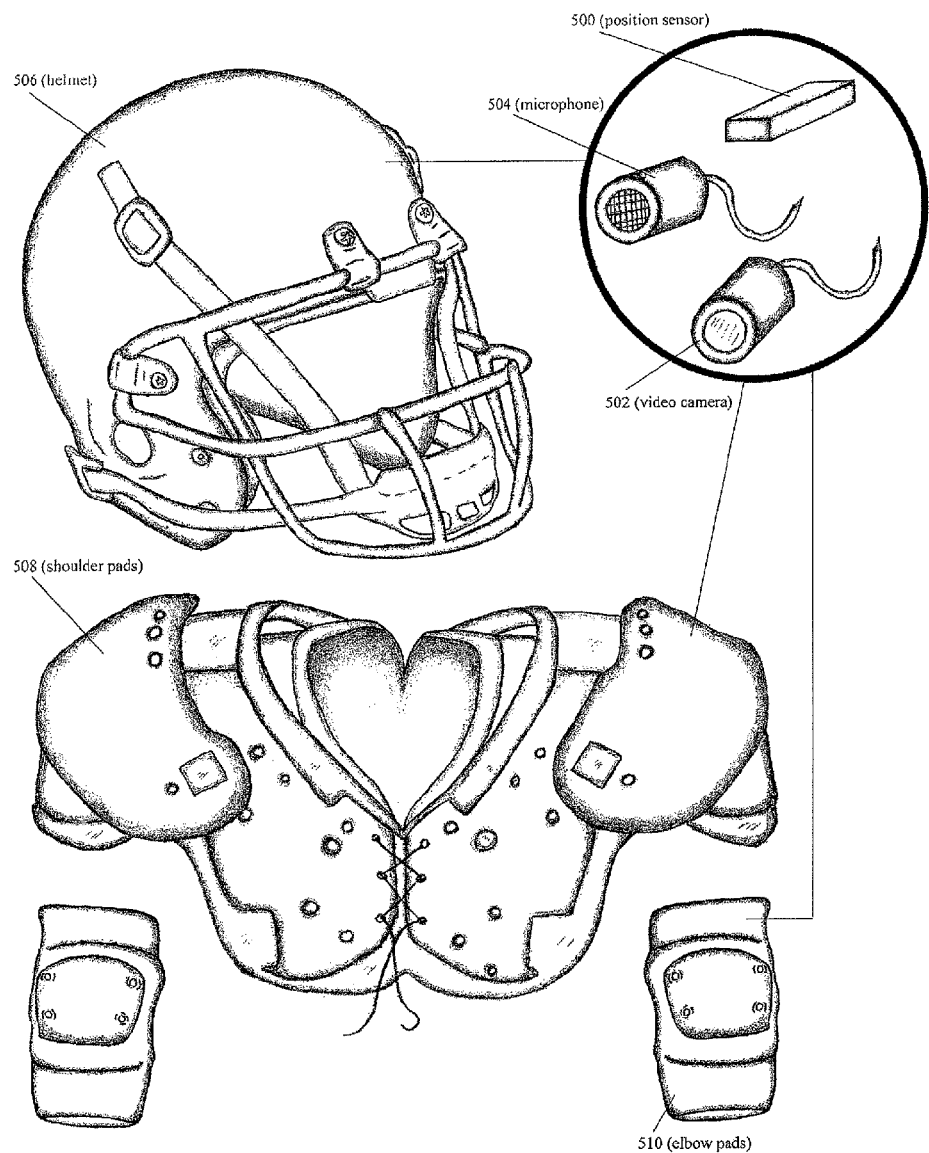
FIG. 5 shows sporting equipment and apparel constructed in accordance with the disclosure to provide position data.
Figure 6:
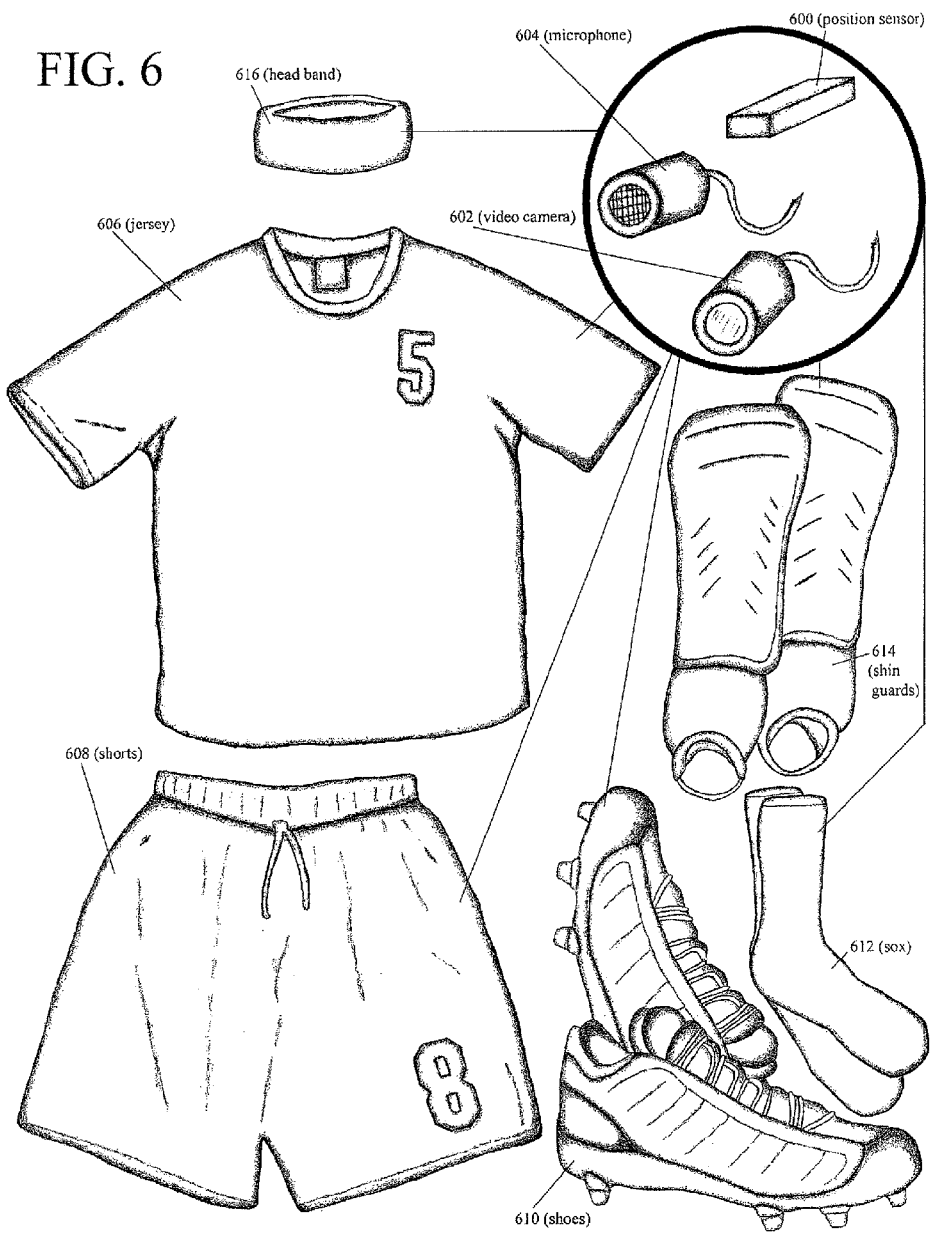
FIG. 6 shows sporting equipment and apparel constructed in accordance with the disclosure to provide position data.
Figure 7:
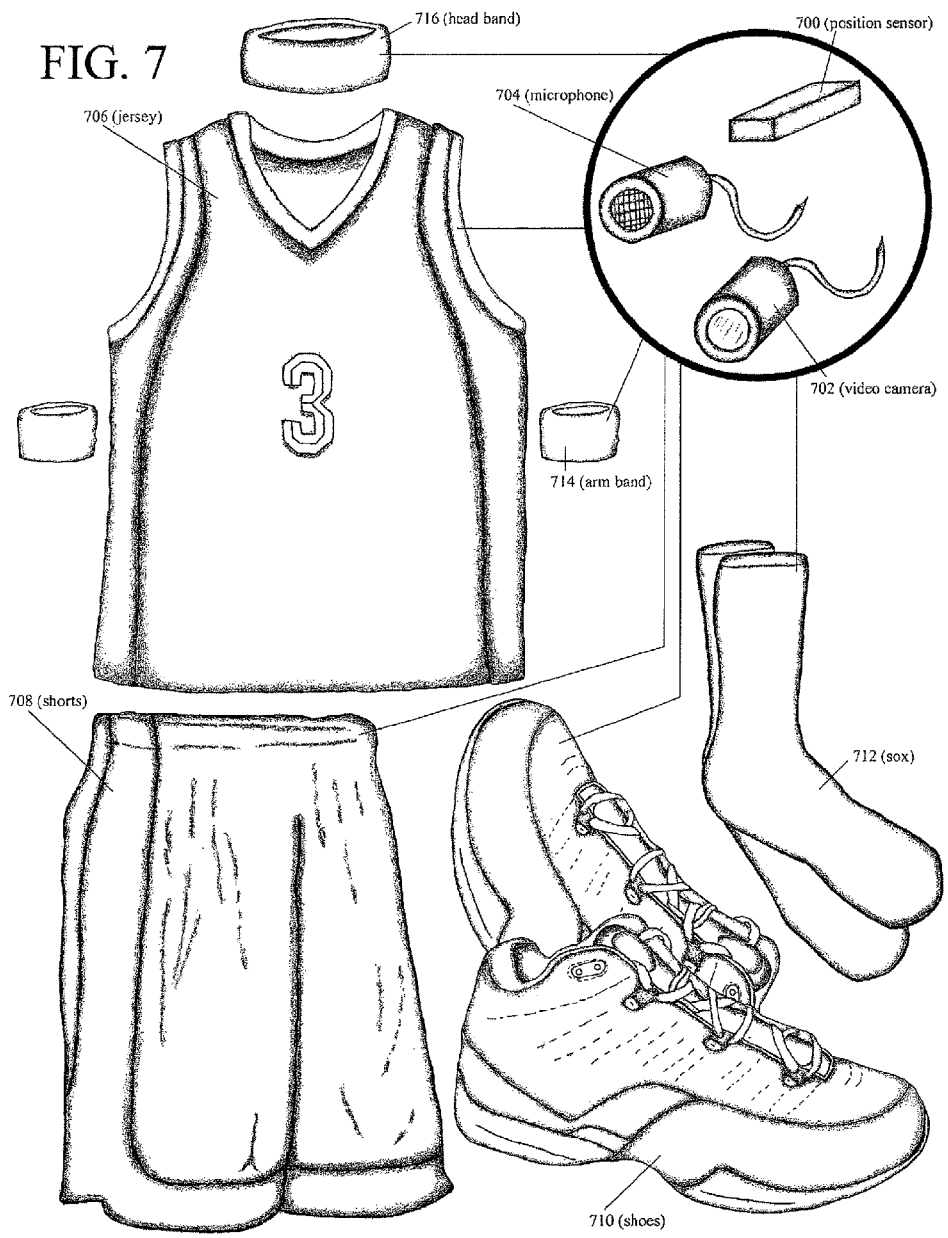
FIG. 7 shows sporting equipment and apparel constructed in accordance with the disclosure to provide position data.

FIG. 5 shows other sporting equipment, apparel/clothing, socks, and shoes used by football players. This figure shows how small position sensors (such as transceivers) 500 can fit onto, clip onto, be embedded into, or put under the various items: football helmet 506, shoulder pads 508, and elbow pads 510. Also, small audio transducers such as microphones 504 and small video cameras 502 can be incorporated into the previously mentioned items. FIG. 6 shows sporting equipment, apparel, clothing, and the like typically used by soccer players. This figure shows how small position sensors (such as transceivers) 600 can fit onto, clip onto, be embedded into, or put under the various items: soccer jersey 606, soccer shorts 608, shoes 610, socks 612, shin guards 614, and head bands 616. Also, small audio transducers such as microphones 604 and small video cameras 602 can be incorporated into the aforementioned items. FIG. 7 shows sporting equipment, apparel, clothing, and the like typically used by basketball players. This figure shows how small position sensors (such as transceivers) 700 can fit onto, clip onto, be embedded into, or put under the various items: basketball jersey 706, basketball shorts 708, shoes 710, socks 712, sweat band or arm band 714, and head bands 716. Also, small audio transducers such as microphones 704 and small video cameras 702 can be incorporated into the previously mentioned items.

The position sensors, such as illustrated in FIGS. 4-7, are designed to absorb the impact and force created by a game of play. This is similar to chips that are designed to fit onto rockets and spacecraft, as they need to be able to survive extreme forces when the crafts blast off from the Earth's surface. In addition, a power source will typically be incorporated into the chip design. The position sensors can be placed on the players in many different ways, so long as the position sensors (i.e., the transceiver, accelerometer, and associated equipment) can provide position information to the system, as described further below. Equipment at the ongoing event includes a player(s), apparel/clothing, socks, shoes, and other equipment described in this section and in FIGS. 4-7.

One exemplary option for placement of a sensor in equipment is for the position sensor to fit or clip onto the player's/players' equipment, apparel/clothing, socks, and/or shoes. The area where the position sensor makes contact should be chosen carefully to avoid damage to the equipment and discomfort or harm to the player. The position sensor should also be designed with hermetic (sealed) packaging and perhaps insulated so that impact or collisions of players in a game will not impair or disable its functionality. The position sensor should also be small enough so that it does not inhibit or impinge on player movement and action during a game.

The second exemplary position sensor placement method is to embed the position sensor within the player's equipment, apparel, clothing, socks, shoes, and other equipment. The equipment, apparel/clothing, socks, and/or shoes are constructed so that the sensors can fit into a hollow space or empty space in the equipment, apparel/clothing, socks, and/or shoes. Another option is for the position sensors to be incorporated into the manufacturing process of the equipment, apparel/clothing, socks, and/or shoes. In this way the position sensors are attached inside of the material used to make the equipment, apparel/clothing, socks, and/or shoes while the equipment, apparel/clothing, socks, and/or shoes are being made. The position sensors need to be designed small enough so that it/they do not inhibit the player's/players' movement in a game.

The third way to attach the position sensors is to fit the position sensors under the players' equipment, apparel/clothing, socks, and/or shoes used by players. The position sensors also have to be designed or maybe even insulated so that impact or collisions of players in a game of play will not disable its functionality. The position sensors need to be designed so that they are small enough so that they do not inhibit the player's/players' movement in a game of play.

If more than one position information sensor is attached on a single player, a better estimation of their 3-dimensional body position can be interpreted by the system outside the game of play. That is, the system can have more position information of that player, in the form of data concerning direction of movement, speed of movement, including lateral, rotational, and vertical data. The more sensors that are used, the better the 3-dimensional interpretation of the player will be. Also, additional position sensors (such as transceivers) provide a back-up signal in case the original signal fails. Infrared video-based tracking systems also help with estimating and determining the 3-Dimensional space occupied by the player/(s) at a given time. One embodiment (viewing mode) uses one transceiver in conjunction with an accelerometer(s) and multiple other sensors. The other sensors then send multiple position data points to the transceiver. The transceiver is able to transmit all of the multiple location and/or acceleration data points in one signal to the electronic system nearby. Position sensors such as transceivers and/or accelerometers can include identification information that is transmitted with the position information. In this way, an individual player can be associated with a particular sensor or sensors. If enough sensors are used, the position data points can be connected to display skeletal stick figures of the players in software. These skeletal stick figure players in software can then be fitted with Computer Generated (CG) avatars of each player. This is similar to the techniques used to create the "Gollum Character" in the movies The Lord of the Rings: The Two Towers and The Lord of the Rings: Return of the King. In the case of those movies a blue colored skin tight suit laced with motion capture dots was placed on the actor Andy Serkis. The actor then acted out a scene against a blue screen backdrop. The camera recorded the position of the actor's movements via the motion capture dots. Then the 3D CG character was fitted to positions recorded by the motion capture dots in the scene later. In a similar way then one embodiment (viewing mode) uses the position sensors to capture movements of the players. Then in software 3D CG avatars are fitted to the skeletal stick figures created by the multiple sensors. One method that can additionally be used to create the 3D CG character avatars is triangulation 3D laser scanning. This allows the system to get more precise 3D models of the players. The players motion points (skeletal and muscles) are still difficult to model completely inside software. Other options for player transceivers are discussed later in the SURGICALLY IMPLANTABLE, PLASTIC, and NANOTUBE TRANSCIEVERS section.

Image processing techniques such as triangulation can be used to help detect the location of different objects such as the players in a game of play. This method is also known in computer vision as triangulation. The method determines a point in 3D space given two or more 2D images of correlating features. The position of the two or more cameras that took the 2D images must be known to use this technique. That is, the position information can be obtained through a passive technique, such as image processing, rather than through data received from sensors associated with equipment. If desired, a combination of passive techniques and active (sensor) techniques may be used. Those of skill in the art understand how to use these techniques from the description herein.

Transmission Particulars

There are many different ways the system can use the ball and player transceivers for position determination. Frequency Division Multiple Access can be used in data transmission. Furthermore, the necessity for small chips will then require small antenna sizes and thus high frequencies must be used to send and receive the signals. Time Division Multiple Access or Code Division Multiple Access schemes can also be used to send and receive the signals. Modulations methods that can be used to send and receive the signals include, but are not limited to: Amplitude Modulation (Single Sideband, Double Sideband-Large Carrier, Double sideband-Suppressed Carrier), Frequency Modulation, Phase Modulation, Amplitude Shift Keying, Frequency Shift Keying, Phase Shift Keying, Quadrature Phase Shift Keying, Quadrature Amplitude Shift Keying (QAM), 8 QAM, 16 QAM, 32 QAM, 64 QAM, 128 QAM, 256QAM, 512 QAM, Minimum Shift Keying, Gaussian Minimum Shift Keying, Differential Quadrature Phase Shift Keying, and Offset Quadrature Phase Shift Keying. Also, specific wireless standards can be used to send and receive signals from the transceivers consisting of, but not limited to the following: Bluetooth, UWB (Ultra Wide Band), Zigbee, RFID, WiMAX, Spread Spectrum, WiFi, WCDMA, CDMA2000, and Edge.

Player Mounted Cameras

Presently in sports, cameras used to record the game are placed at a distance from the event. POV (Point of View) camera shots from the player's/players' perspective are not used for entertainment purposes or as an officiating aid.

A Camera is attached on top of, embedded into, or placed under equipment, apparel, clothing, socks, or shoes used by the player (see, for example, FIGS. 4 through 7). The camera feed is then transmitted via a transceiver to a system outside of the game of play. This provides a new possible camera shot of the game for entertainment viewing purposes. As well, this could be used to see different camera shots of the game and used for officiating purposes, such as Instant Replay and After Action Review.

The video cameras are designed to absorb the impact and force created by a given sport or game. The video cameras will most likely be placed as close to the vision point of the players so as to obtain a POV (Point of View) shot. If more than one video camera is attached to each player, more video signals are available to the system. Once more, if a few cameras are used in conjunction from the POV shot of a player, wider shots can be obtained. The wider shots would incorporate multiple shots of the game into one wider more panoramic shot. Further descriptions are included later that explain how to compose wider shots or camera output signals using multiple cameras or panoramic view cameras in PANORAMIC VIEWING FROM ONE VIEWPOINT. Also, 360-degree panoramic view cameras can be integrated into football helmets and around head bands worn by players. This allows players' POV shots to include a complete 360 degree panorama of what it looks like from their perspective. These shots also avoid the conventional tunnel vision that is obtained when a person holds a camera from a POV shot. The 1980's "slasher" movies come to mind when considering the "tunnel vision" POV shot, where the victim in the slasher film is typically being chased by a murderer seemingly without the use of the victim's peripheral vision. This type of limited POV shot is typically used. However, wider camera lenses as well as multiple shots from a POV vantage point can compose wider shots that are closer to what the players are actually seeing during the game. In accordance with the disclosed embodiments, the video cameras can be placed on the players in different ways.

The first exemplary option is for the video cameras to fit or clip onto the player's equipment, apparel/clothing, socks, and/or shoes. The area where the video camera makes contact should be chosen carefully and probably be close to the player's head. The video camera should also be designed or maybe even insulated so that impact or collisions of players in a game will not disable its functionality. The video camera should also be designed to be small enough so that it will not alter or inhibit the player's movement in a game.

The second exemplary technique is for the video camera to be embedded within the player's/players' equipment, apparel/clothing, socks, and/or shoes. The equipment, apparel/clothing, socks, and/or shoes are pre-made so that the video cameras can fit into a hollow space or empty space in the equipment, apparel/clothing, socks, and/or shoes.

Another option is for the video cameras to be incorporated into the manufacturing process of the equipment, apparel/clothing, socks, and/or shoes. In this way the video cameras are attached inside of the material used to make the equipment, apparel/clothing, socks, and/or shoes while the equipment, apparel/clothing, socks, and/or shoes are being made.

The final way to attach the video cameras is for them to fit under the player's/players' equipment, apparel/clothing, socks, and/or shoes used by the players. The video cameras also have to be designed or insulated so that impact or collisions of players in a game of play will not disable their functionality.

Player Audio

For conventional broadcasts, audio feeds of players in the game are not presently recorded for entertainment purposes to the extent they could be. Most broadcasting companies use primarily a combination of some backdrop noise in conjunction with sports commentators' dialogue to produce the audio feed (or audio signal or audio information) for a sporting event. Some sound equipment is placed on the field to record noises such as marching band songs or crowd applause. Then in a booth, either at the game or in an outside studio, sports commentators provide a dialogue to fit over gaming background noises.

An audio transducer such as a microphone is attached on top of, embedded into, or placed under equipment, apparel/clothing, socks, or shoes used by players (see FIGS. 4 through 7 for examples of attachment). The audio signal is then transmitted via a transceiver to a system outside of the game of play. This audio signal is used for a few different entertainment related applications in conjunction with the video recording of the game. The audio signal can obtain gaming noises and sounds. Also, it is used to acquire voices of the players in a game of play. The players' voices may be used in conjunction with the POV shots. The recorded audio signals are other inputs to the entertainment selecting system.

To continue functioning throughout the event, the microphones should be designed to absorb the impact and force created by a game of play. If more than one microphone were attached to each player, this provides more audio signals for the system to choose from. The microphones can be placed on the players in different ways.

The first exemplary option is for the microphones to fit or clip onto the players equipment, apparel/clothing, socks, and/or shoes. The area where the microphone makes contact has to be chosen carefully. The microphones also have to be designed or maybe even insulated so that impact or collisions of players in a game will not disable their functionality. The microphone should also be designed to be small enough so that it would not alter or inhibit the players' movement in a game.

The second method is for the microphones to be embedded within the player's/players' equipment, apparel/clothing, socks, and/or shoes. The equipment, apparel/clothing, socks, and/or shoes could be pre-made so that the microphones can fit into a hollow space or empty space in the equipment, apparel/clothing, socks, and/or shoes. Another option is for the microphones to be incorporated into the manufacturing process of the equipment, apparel/clothing, socks, and/or shoes. In this way the microphones are attached inside of the material used to make the equipment, apparel/clothing, socks, and/or shoes while the equipment, apparel/clothing, socks, and/or shoes are being made.

The third way to attach the microphones is for them to fit under the player's equipment, apparel/clothing, socks, and/or shoes. The microphone should also be designed or maybe even insulated so that impact or collisions of players in a game of play will not disable its functionality.

Officiating Aid

Position information of a ball in a game of play and/or the players in a game of play can be of use to officials. Depending on the sport, position information can provide officials with a way of telling whether or not the ball and/or the players were where they thought they were. Often times, controversial officiating calls come from situations where the ball and/or players are questionably at one place or another. This positioning system provides a solution to that problem. In addition, the new camera angles captured by the system increase the number of recorded camera shots and angles that can be used by officials in sports that feature Instant Replay and Action After Review rule reviews. Also, one embodiment (viewing mode) includes the usage of more advanced technologies to create a CG 3D environment of viewing coverage of the event. This could be used to assist officials in After Action Review and Instant Replay reviews.

Different Types of Cameras

There are a variety of different cameras that the system described herein can robotically control and use to automate coverage of sporting events. There are also a number of different cameras that can be manually controlled and that the system described herein can operate in conjunction with. The following cameras can be either robotically or manually controlled: ENG (Electronic News Gathering) video cameras, EFP (Electric Field Production) cameras, fixed cameras, fixed wireless cameras, hand-held cameras, hand-held wireless cameras, tracking or rail cameras, rail-cameras, mobycam, mini POV cameras, lipstick cameras, slow motion cameras, skycams, cablecams, pole cameras, stabilized cameras, motocams, boatcams, helicams, vehicle cameras, crane cameras, jib cameras, wireless cameras, dolly cameras, steadicams, come-and-go cameras, aerial tracking cameras, twist-cameras, tracking dolly cameras, helicopter wireless cameras, snowmobile cameras, specialty cameras, pop-up cameras, cone cameras, divecams, and other types of cameras.

Fixed or hard cameras are cameras that are mounted onto a camera mount in a stationary position. Hand held cameras are smaller than fixed cameras and can be held by a camera operator as opposed to being mounted to the ground. EFP (Electric Field Production) cameras are lightweight camcorders that can transmit live from the ongoing event. Tracking or rail cameras are cameras that are mounted on rails or other devices that allow them to synchronize movement with the subject they are recording. They can be automated or manually controlled. One such camera is the dollied sideline camera in American football. The mobycam is an underwater camera that moves back and forth along the length of a swimming pool. The mini POV (Point of View) camera is a slim camera that is often placed in unusual positions. The perspective captured by the mini camera allows the viewer to experience the effect of being part of the action or competition. These cameras can be setup in remote locations such as on the field goal post of the American football sporting event, and can be remote pan-tilt controlled. Mini POV cameras are sometimes called lipstick cameras. Slow motion cameras capture more frames per second than most other cameras. Sky-cams or cable cams are remote controlled cameras that hang from a system of cables over an event and can be controlled to move around by mechanically adjusting the cables. The pole camera is a small camera that is connected to a pole. The camera operator can be fitted with a camera support for the pole. The Stabilized camera is a camera that is balanced with a stabilization system such as a digital control system, or some other kind of stabilizer. The motocam is a motorcycle outfitted with a stabilized wireless camera. The boatcam is a boat outfitted with a stabilized wireless camera. The helicam is a helicopter outfitted with a stabilized wireless camera. Vehicle cameras are other vehicles outfitted with wireless stabilized cameras. Wireless cameras transmit their video signals through wireless frequencies such as radio waves or microwaves. Any of the cameras mentioned herein can be wireless cameras. Cranes or jibs are often used to move cameras up and down and side to side in different directions. Dollies are also often used to move cameras around the event. The steadicam is a vest device that was designed to balance the camera for the camera operator.

Specialty cameras are cameras designed for a specific application of event coverage, and that are used to record unique field of view coverage of the event. The invention described herein can make use of specialty cameras as well. One example of a specialty camera is the pop-up camera used by CBS to cover car racing events. Pop-up cameras are cube cameras that are built with spring assemblies in different holes in the ground around a race track. This allows them to pop up and view cars racing around the track. Then should a car run over the camera, its spring loaded system is designed so that the camera will be pushed down and pop back up and not be damaged. Another example of a specialty camera is the cone camera developed by Mike Hampton for the 2002 Winter Olympic Games. The cone camera was used to get unique camera shots of speed skating. The camera was encased in Styrofoam that was able to fit into a 23 cm high orange cone and record shots from a ground level perspective of the speed skating event. Another specialty camera is the divecam, used to cover the Olympic Games high diving event. A three-chip broadcast quality camera is encased in a 16 m glass tube. The camera rides on six wheels on a track that is mounted inside of the glass tube. The tube is filled with air, and extends from the high dive down into the pool below. Also, a joystick remote control allows a camera operator to follow the diver as the camera falls. The camera is released as the diver dives and falls with and follows the diver down into the pool below.

Different Types of Camera Movement

Cameras with fixed locations still have the ability to pivot the lens side-to-side or X-Y plane movement (pan) and pivot the camera lens up-and-down or Z-axis movement (tilt). As well as moving the camera lens, the camera' location itself can be designed to move side-to-side (X-axis movement), forward-backward (Y-axis movement), up-and-down (Z-axis movement), or some combination of the three. Truck is the term used to describe side-to-side camera movement on the X-axis (truck left or truck right). Dolly is the term used to described camera movement forward (dolly-in) or backward (dolly out) on the Y-axis. Arc is often used to describe curved camera movement in the X-Y plane. Crane/Pedestal up and down is the term used to described camera movement up or down on the Z-axis. Specialty cameras are typically used to accomplish these movements of the cameras position.

Current film crews that work on sporting events make use of moving cameras. This usually consists of putting cameras on large moving dollies on the sideline of a sporting event. The equipment is capable of moving the camera man and camera back and forth the sideline and up and down off of the ground. Also, in some cases cameras are suspended on cables and moved back and forth around a sporting event. The system described herein may choose to make use of dollies, cranes, jibs, poles, rails, and/or cables to move cameras around the sporting event. As mentioned later, cameras on cables allow the viewer vantage point the shift through close to a 180 degree range up-and-down over the top of the event. Since the human element introduces a significant delay factor into the system, robotically feedback controlled cameras (Pan-Tilt-Zoom) are used as described before. Other motorized types of cameras can also be used. The system makes use of the moving cameras to achieve a variety of additional shots of the action.

The system described herein can use many different types of cameras as described above. The system can robotically control the variables of camera lens movement of pan, tilt, zoom, and focus of its cameras at specific locations around the event. In addition, it can also control the movement of the position of some of those cameras in the X-Y-Z directions around the event.

Different Types of Microphones

The audio signal of a sports production typically uses either stereo, surround sound 5.1, or surround sound 7.1 format. HDTV uses the 5.1 surround sound format. Audio signals can also use one of many different types of compression formats. One example is Dolby Digital audio compression, which is used for ATSC (Advanced Television Systems Committee) DTV (Digital Television) standards. The final audio signal is made up of different audio components that are combined together for production. The different audio components typically include atmosphere and crowd audio, music, opening animation music, announcers voices, referee audio, player audio, coach audio, sound effects, and other audio sources.

Crowd microphones and ambience/atmosphere microphones record crowd and atmosphere noises of an ongoing event. Referee audio, player audio and coach audio are recorded from a wireless microphone. Sound effects are recorded from mono and stereo "field of play" microphones. Camera microphones and handheld camera microphones use stereo shotgun (or shotgun) microphones.

There is a number of different types of microphones that can collect audio data that when combined together make up the audio signal (or audio information). With different viewing options available to the user (viewer at home or director and production crew), different audio signals can be created as well. Microphones can be stationary, robotically controlled, and/or manually operated. The system can collect audio data from around the event and combine it based on the ball and player position information. Conversely, the system can combine the audio information not necessarily based on the ball and player position information. The system described herein can also use any of the different types of microphones in combination with different audio gathering apparatus. The different types of microphones that the system described herein receives audio information inputs from include crowd microphones, ambience microphones, atmosphere microphones, field of play microphones, stereo shotgun microphones, shotgun microphones, sports announcer headset microphones, commentator's noise cancelling ribbon microphones, lip microphones, XY stereo microphones, hand held microphones, headset microphones, lavaliere microphones, contact microphones, holophone microphones, digital processing microphones, clip microphones, boundary microphones, pressure zone microphones, specialty microphones, wireless microphones, RF microphones, and other types of microphones.

Microphones use two different types of pick-up patterns when collecting audio information from sound waves. The first type, omnidirectional, can pick up audio information sound waves that travel in all directions. The second type, unidirectional or cardio pattern, can only pick up audio information sound waves from a specific focused direction. Microphones also come in two varieties of sound power level tolerance. The first type, dynamic microphones, can withstand higher sound power levels without distortion or damage to the microphone. The second type, condenser microphones, are more sensitive to the higher sound levels and can be damaged, but are able to record higher quality audio information from incoming sound waves.

Shotgun microphones are condenser microphones that are proficient at capturing audio information from the audience and of the noises in the field of play. Hand held microphones are typically used for conducting interviews, and can be used with a parabolic dish. Lavaliere microphones are compact microphones that can clip onto clothing or be placed around the ongoing event. For example, sometimes lavaliere microphones are clipped behind the backboard of the basketball hoop. They can be used in conjunction with the parabolic dish. Contact microphones are buried underneath an event and pick up vibrations as opposed to acoustic sound of the event. Holophone microphones are able to record 7.1 channels of discrete sound. Digital processing microphones are able to tune to certain incoming sound frequencies and thereby record certain specific sounds, while rejecting the other surrounding sounds at different frequencies. An example is the "thud" of the kick of a ball. Clip microphones are small and non-obstructive and can be easily hidden from view. Boundary and pressure zone microphones are able to pick up high quality ambient sounds. Specialty microphones are specially designed to pick up unique noises or audio events. Any of the microphones mentioned above can work as wireless microphones. Most wireless microphones use RF (Radio Frequencies) to send the audio information.

Various types of audio gathering apparatus are typically used in conjunction with different types of microphones to better capture the audio information. One such apparatus is the shock mount. Shock mounts reduce noise that can be transferred mechanically to the microphone through mounting hardware, physical contact, or other mechanical activities that can cause distortions of incoming sound. Parabolic dishes used with omnidirectional microphones are able to be aimed at specific sounds and pick them up without picking up background ambiance. The parabolic dish more precisely steers the omnidirectional microphone's pick up pattern towards different sounds while also blocking out the atmosphere noises at the same time. Windscreens protect microphones from the wind or other moving air that can distort the sound waves captured by the microphone.

Sports broadcasting postproduction includes sound dialogue, voiceovers, sound effects, combining sound with music tracks, and other sound editing of the audio signal. Many of these effects can be incorporated into the live event based on position information of the ball and players.

Camera Control

The positioning system provided by this invention poses new possibilities for sports entertainment broadcasting and sporting event viewing. The location of the ball and/or players in a game of play provides new information about sporting events that is presently absent. This allows the aforementioned traditional way of recording a televised sporting event to be reassessed. Under the old system, the game is difficult to predict and the ability to capture the event is based on human reaction time. Thus, more conservative EWSs (Extremely Wide Shot) or VWSs (Very Wide Shot) with "birds-eye view" camera angles are used more often than not. The new position information described herein makes the game much more predictable in terms of viewing selection. Also, electronics can make thousands of decisions in the time it takes a human to make one. Therefore, since the delay in changing from one shot of the game to another is negligible, the options of how to shoot the game are left to the imagination and software design.

The system can have a variable range of integration with electronics and therefore can have varying degrees of complexity. For example, the simplest implementation or first embodiment, does not use software or player position information. The system also places various stationary and/or robotically controlled pan-tilt-zoom cameras around the event. The system then uses specialized hardware or FPGAs to implement a simple state machine to generate control signals and switch or multiplex the camera feed (from one camera to another) as the ball moves around the game of play. The different cameras are positioned to view the event from different locations around the event, and thus have different respective fields of view coverage, also referred to as field of view. The camera feed is the camera output (or video signal). The camera output may be video only, or the output may include video signal(s) or information, audio signal(s) or information, other data, or some combination of all.

Different types of formats are used for video signals depending on the type of television or viewing device on which the output will be viewed. Examples of typical video signals are Mono, Color NTSC, Color HDTV, Color HDTV (no interlace), Color PAL (United Kingdom), Color NTSC (Japan), Color SECAM (France), Color PAL (Germany), Color SECAM (Russia), Color PAL (China), and others. Also, there are different video signals for different computer viewing formats such as 640×480 VGA (4 bpp), 640×480 SVGA (8 bpp), 640×480 SVGA (RGB-16), 640×480 SVGA (RGB-24), 1024×768 SVGA (8 bpp), 1280×1024 SVGA (4 bpp), and others. The video signal will depend on system capability with the viewing audience. Also, conversions can be made from one to multiple formats to meet the needs of a wide variety of viewers. The video signal is also referred to as the viewer vantage point, as this is what the viewer is able to see of the sporting event. As well as multiplexing/switch the camera feed, control signals are able to tell the system how to adjust the robotically controlled feedback cameras (pan-tilt-zoom cameras). Depending on the ball position information, the pan-tilt-zoom cameras are able to adjust their pan, tilt, zoom, and focus functions.

The second implementation or second embodiment of the system (without software) determines the position information of the ball and the players in a game of play and uses those inputs to compute how to access the camera selection/switching, shot type, and camera angle decision. This implementation works in much the same fashion as the first implementation, but now has more inputs, player and ball position information, from which to generate control signals. The control signals then tell the system which cameras to use (camera selection) and how to direct the robotically controlled pan-tilt-zoom cameras by changing the pan, tilt, zoom and focus functions. The system is able to multiplex or select one of the different camera outputs appropriately.

The third implementation or third embodiment uses a CPU and software. This third implementation only uses the ball position information to select the appropriate camera output and video signal. The fourth implementation uses the ball and player position information. In the third and fourth implementations, the CPU and software give the designer more flexibility in changing how the system should operate as the software can be changed more easily than custom hardware or FPGAs. Likewise, the fourth implementation uses the ball and player position information inputs to select the camera output or video signal. The third and fourth implementations decide based on the input position information how to change the camera switching/selection, shot type, and camera angle based on the software package. The stationary and robotically controlled pan-tilt-zoom cameras provide camera outputs and video signals that the system selects from based on the input position information data.

The fifth, sixth, seventh, eighth, and ninth implementations or embodiments make use of cameras spaced next to one another so that the viewer has contiguous vision of the event in the lateral or radial (X-Y plane) direction and in the vertical (Z-axis) direction. The fifth implementation uses lateral or radial contiguous camera coverage. The sixth implementation uses lateral or radial contiguous camera coverage of 360 degrees. The seventh implementation uses lateral or radial contiguous camera coverage and vertical contiguous camera coverage. The eighth implementation uses lateral or radial contiguous camera coverage of 360 degrees and vertical contiguous camera coverage. The final, most complicated and ninth implementation uses 360 degrees of lateral or radial contiguous camera coverage and 180 degrees of vertical camera coverage. This ninth implementation is accomplished with enough camera coverage so that the event can be viewed from virtually any point of view. This allows the invention to display the event in the most aesthetically appealing way possible. The fifth, sixth, seventh, eighth, and ninth implementations use the ball and player position data inputs and a CPU and software. They also make use of stationary and/or robotically controlled pan-tilt-zoom cameras. Based on the input position information, they select the appropriate camera output and video signal. The large number of cameras provides the designer with a greater degree of complexity in the camera output selection and the ability to achieve more visually.

Much of the description below is optional for implementation of the invention, as there are different degrees of complexity involved in the nine different exemplary implementations. Also, the 3D model of the ball, players, and event interactions taking place in software is optional as well. It is not necessary to have a 3D model of the game inside software. However, this addition would only make the job easier on the system designer and would be a very helpful visual tool. Position data of the ball and players from an entire game could be recorded. Then later the software team can use this data to develop the camera selection software. Seeing the 3D game inside software would be more expensive to implement, but would be a powerful visual aid. The more complex implementations provide the viewer with more options to choose from.

The first four implementations are further described below in the section CAMERA PLACEMENT FOR SIMPLER TRADITIONAL IMPLEMENTATIONS. The fifth, sixth, seventh, eighth, and ninth implementations are further described below in the section MORE COMPLEX IMPLEMENTATIONS.

Camera Placement for Simpler Traditional Implementations

The first four implementations described above use event camera coverage that is similar to the way in which sporting events are filmed today. The different cameras have different respective field of view coverage, also referred to as field of view. Most cameras have variable focus lenses, such that the camera field of view can be changed by changing the focal length of the lens during camera operation. Cameras are placed at different places around the event so that the camera output and video signal can switch or cut between the different cameras. Also, robotically controlled feedback cameras are able to change their pan, tilt, zoom, and focus functions based on control signal inputs (position information). So, the ball and player position information enables the system to cut between cameras and track the game from the different cameras.

Figure 8:
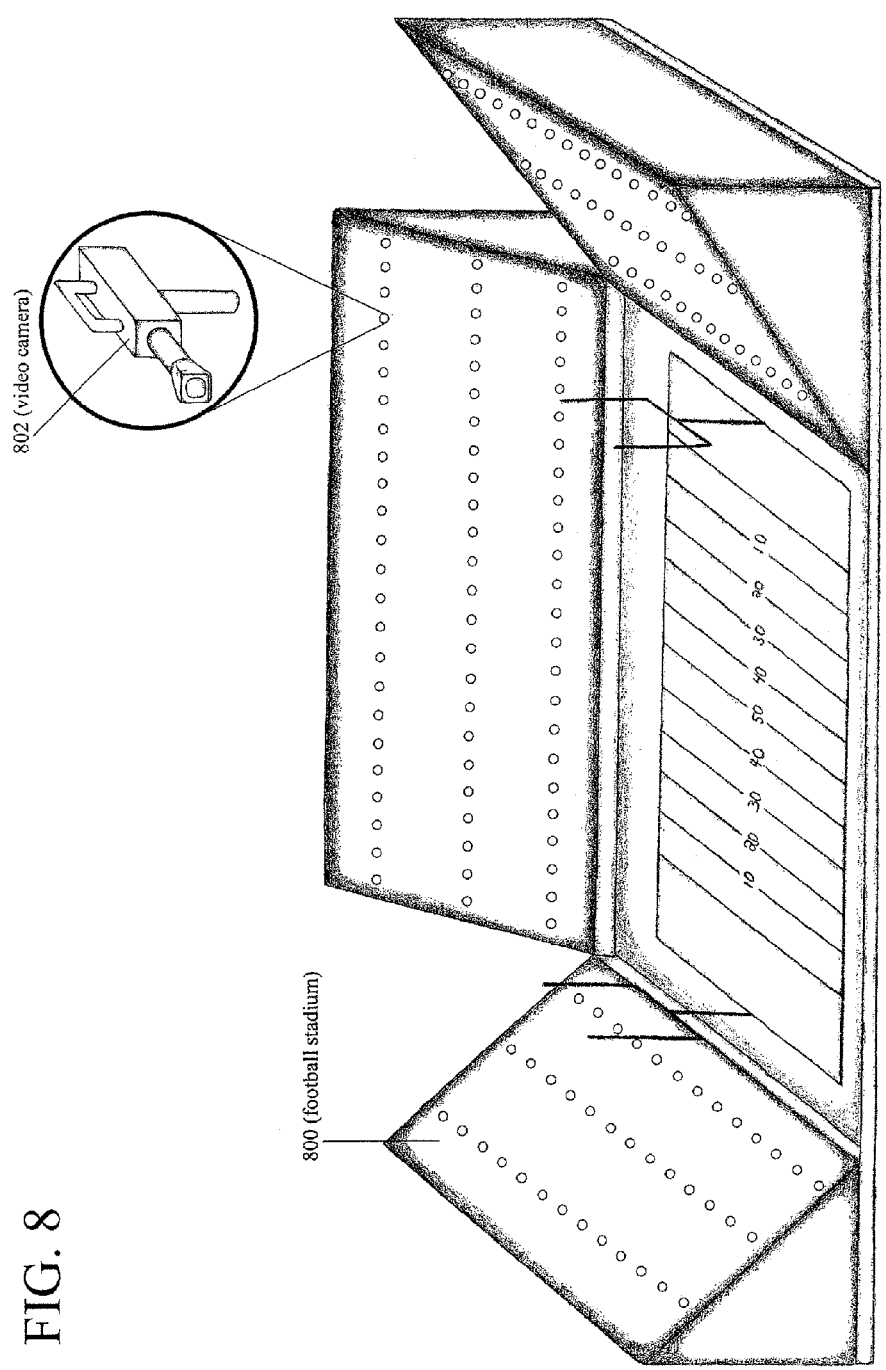
FIG. 8 shows camera placement in a football stadium in accordance with the disclosure.
Figure 9:
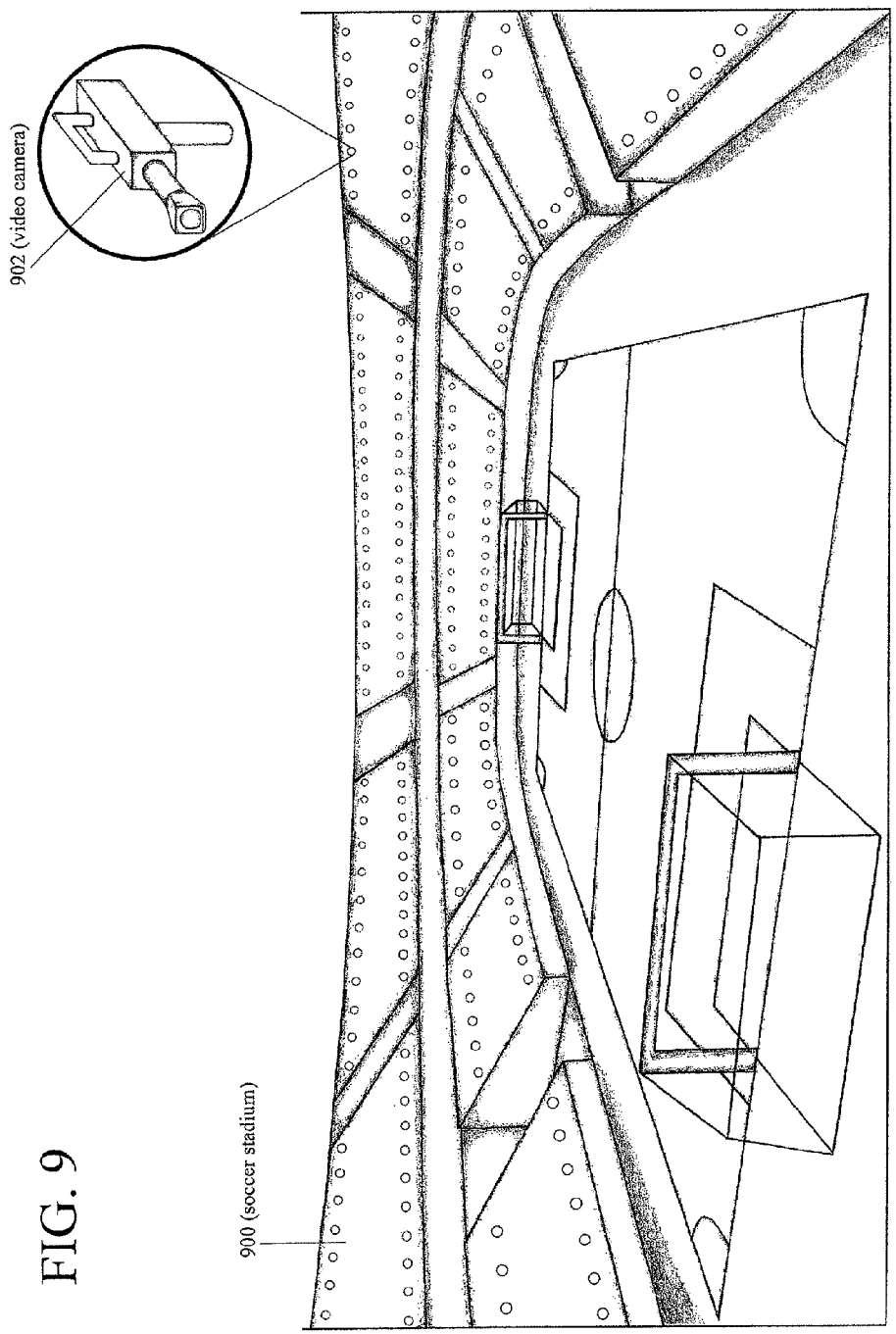
FIG. 9 shows camera placement in a soccer stadium in accordance with the disclosure.
Figure 10:
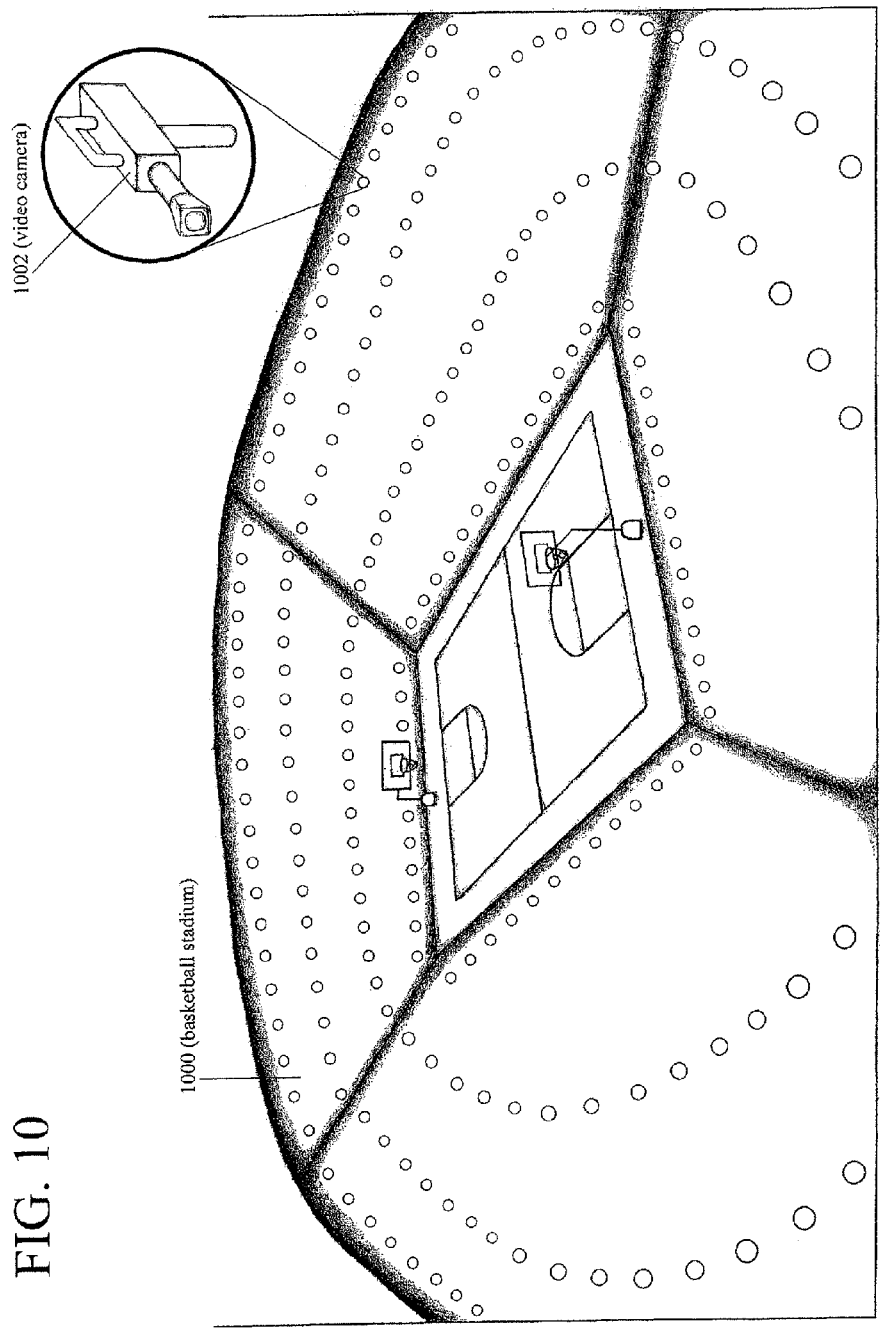
FIG. 10 shows camera placement in a basketball arena in accordance with the disclosure.
Figure 11:
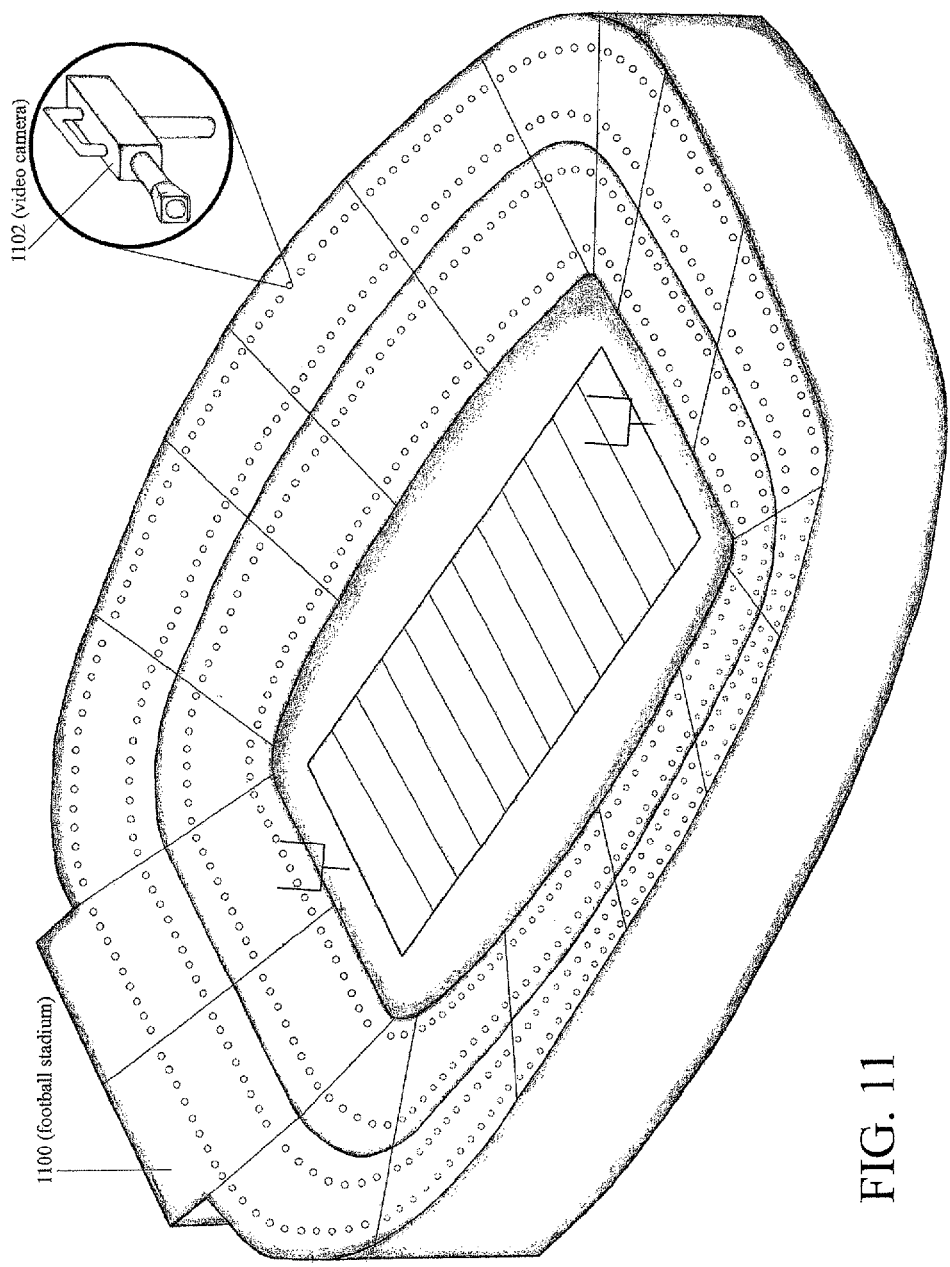
FIG. 11 shows another illustration of camera placement in a football stadium in accordance with the disclosure.

FIGS. 8, 9, 10, and 11 show camera arrangements that can be used to implement the system. More cameras, as opposed to fewer cameras, are used in FIGS. 8, 9, 10, and 11. The rational behind this is that it is easier to imagine an implementation with fewer cameras as opposed to an implementation with more cameras. Although the camera arrays shown in FIGS. 9 through 11 show complete or seamless camera arrays surrounding the playing field, incomplete or non-seamless arrays of cameras positioned at non-uniform positions can also be used and are used in these first four implementations. That is, each camera will provide its own respective field of view, and the cameras are arranged to provide independent respective fields of view. The Traditional Viewing Option described further below shows the type of software system that is implemented using these simpler camera configurations. Simpler implementations are able to replicate the way the game is being recorded today.

The Traditional Viewing Option automates the present methods of covering a sporting event. *Television Sports Production Fourth Edition* written by Jim Owens discusses and shows many of the current ways in which sports are covered. Camera arrangements for different sporting events are shown on pages 197-221. Also, microphone placement diagrams are shown on pages 223-231. One mode simply uses traditional camera placement arrangements to automate the present way in which sporting events are recorded. In this way pages 206-207 show the types of cameras and camera arrangements that this system is able to use to cover the sport Basketball. This diagram is complimentary to FIG. 10. Pages 213-215 show the types of cameras and camera arrangements that this system is able to use to cover the sport American Football. This diagram is complimentary to FIGS. 8 and 11. Pages 216-217 show the types of cameras and camera arrangements that this system is able to use to cover the sport Soccer. This diagram is complimentary to FIG. 9. Camera diagrams for other sporting events are shown in *Television Sports Production Fourth Edition* as well; likewise the invention described herein automates covering other sporting events that are not described here.

An alternative embodiment uses more complex camera arrangements. The more complex embodiment then has the cameras from the traditional camera arrangements in addition to other cameras. When this embodiment implements the Traditional Viewing Option, it selects from the cameras that are located in the traditional camera placement diagrams as described herein and in *Television Sports Production Fourth Edition*.

Simpler Traditional Implementation Microphone Placement

Traditional viewing automates the present methods of covering sporting events. *Television Sports Production Fourth Edition* written by Jim Owens discusses and shows many of the current ways in which sports are covered. Camera arrangements for different sporting events are shown on pages 197-221. Also, microphone placement diagrams are shown on pages 223-231. One mode simply uses traditional microphone placement arrangements to automate the present way in which sporting events are recorded. In this way pages 226-227 show the types of microphones and microphone arrangements that this system is able to use to cover the sport basketball. This diagram is complimentary to FIG. 10, in that microphones can also be placed around the event at the same or different location from where a camera is positioned. Pages 228-229 show the types of microphone and microphone arrangements that this system is able to use to cover the sport soccer. This diagram is complimentary to FIG. 9. Microphone diagrams for other sporting events are shown in *Television Sports Production Fourth Edition* as well; likewise the invention described herein automates covering other sporting events that are not described here.

An alternative embodiment uses more complex microphone arrangements. The more complex embodiment then has the microphones from the traditional microphone arrangements in addition to other microphones. When this embodiment implements the Traditional Viewing Option, it selects from the microphones that are located in the traditional microphone placement diagrams as described herein and in *Television Sports Production Fourth Edition*.

Game Audio Control

Position information of the ball and players in a game can be used to identify different conditional scenarios that occur at a given point in time in the game. Previously, this position information's role in the selection of the viewer vantage point of the game was described, but this position information can also be applicable towards the selection of the audio feed as well. Audio feeds or audio signals are captured from microphones positioned around the event. Position information that identifies critical moments in the game could be used to in turn synchronize background music with those moments. Position information can also be used to incorporate post-production sound editing of the audio signal (or audio information) into the live event. The system described herein can have built in audio-editing functions that edit and change the audio signal as the position information changes. For example, a critical fourth down opportunity for the Notre Dame Football team's offense could be identified by the system based on the time on the game clock and the down number. This could then be used to synchronize backdrop music such as Dropkick Murphy's "I'm Shipping Up to Boston" song with the event. Furthermore, different styles and sounds of music could be incorporated into the software entertainment package and could be used at different moments of the game to accent the viewer's and listener's experience with what they are seeing. This would go hand in hand with making the sports viewing experience more and more like watching a movie or playing a video game.

In addition to background music, conditional scenarios can also be used to set up sound effects and other sounds that are overlaid on the audio feed of the viewed event. For instance, collisions or "big hits" in American football can be identified by the system by capturing the velocity of the player that has the ball and the velocity of the nearest defender. This information can then be used to predict when the two fast moving players will collide in the game. The audio signal can then feature a big "woosh" or "thud" noise to accent the "big hit" in the game. This is similar to sound effects used in fight scenes in movies to accent punches and kicks. Fight scenes in the movie Rocky exemplify this technique. Also, since the system can perform thousands of operations per second (if not more), there is enough time to sink up sound effects with the in game action. In the "big hit" example, the system waits until the two previously mentioned players are within inches of each other before using sound effects so as to ensure that the collision prediction is indeed correct.

The audio signals of players can also be overlaid on the overall audio signal. In the Manual Viewing Option where the system uses POV shots, the audio signal of the user selected player is overlaid on the overall audio signal. In the other viewing modes, conditional scenarios are used to identify which voice or voices should be overlaid on the overall audio signal. If the game will be televised on a network such as HBO that permits uncensored conversation between players, officials, and spectators otherwise known as "trash talk", "trash talking" conditional scenarios can be incorporated into an uncensored version of the game. For instance, speech recognition and other audio processing techniques can be used to identify if two players are speaking very loudly or arguing with each other. Then the system described herein will select to overlay the two arguing players' comments on the overall audio signal using the player mounted microphones.

More Complex Implementations

The ninth implementation described earlier uses a sufficient number of cameras so that a 3D environment of vantage points of the game are available in real-time. The different cameras are positioned to view the event from different locations around the event and thus have different respective fields of coverage, also referred to as field of view. The full 3D environment is available in the ninth implementation, and is described more here now. It is noted however that the fifth, sixth, seventh, and eighth implementations are able to accomplish these same features, but in a more limited scope and more limited field of view of the event. This applies as well to the next section COMPREHENSIVE VIEWING OF ONE EVENT, the fifth, sixth, seventh, and eighth implementations are able to accomplish the features described in that section, but in a more limited scope and more limited field of view of the event. This applies as well to the next section COMPREHENSIVE VIEWING OF ONE EVENT, the fifth, sixth, seventh, and eighth implementations are able to accomplish the features described in that section, but in a more limited scope and more limited field of view of the event.

The 2D game shot, video signal, or the viewer vantage point, is obtained from combining different cameras' outputs together to compose a single 2D viewer perspective. The camera output may be video only, or the output may include video signal(s) or information, audio signal(s) or information, other data, or some combination of all. The cameras' video signals and coverage zones are used to shift the 2D viewer vantage point around the event. The vantage point of the camera feed for production (also camera output) can zoom in and out and trace radially or laterally all the way around the field in a span of 360 degrees. The 2D viewer vantage point uses the video information from the feedback camera network to track vertically up and down too.

The following describes an optional method that helps to figure out how to place cameras around the event. One way to determine how to position the plurality of cameras starts by developing a 3D model of the landscape of the arena or stadium at the event location. This 3D model is then used by software to determine where and how to place the different cameras. The types of cameras are taken into account when using this software, meaning the software knows the types of coverage and capabilities of stationary cameras and Pan-Tilt-Zoom (PTZ) cameras. The software then determines the 3D location (X-Y-Z location) of where to place the cameras around the event such that comprehensive coverage can be achieved. The cameras' orientation and field of view is also calibrated by the software. The camera 3D location and related data is then used to install the cameras around the event. After camera installation, further calibration of the correlation between the live video signals and the 3D model is fine tuned by the software. Once installed and calibrated, the cameras are then able to work together to capture the perspective of the 2D viewer vantage point from virtually anywhere in the 3D environment of the event in real-time. There are three possible ways to display the event to the viewer as will be explained further below. Camera installation can be either permanent or temporary for a broadcasted event. The event will also be recorded for Instant Replay and After Action Review applications.

Figure 12:
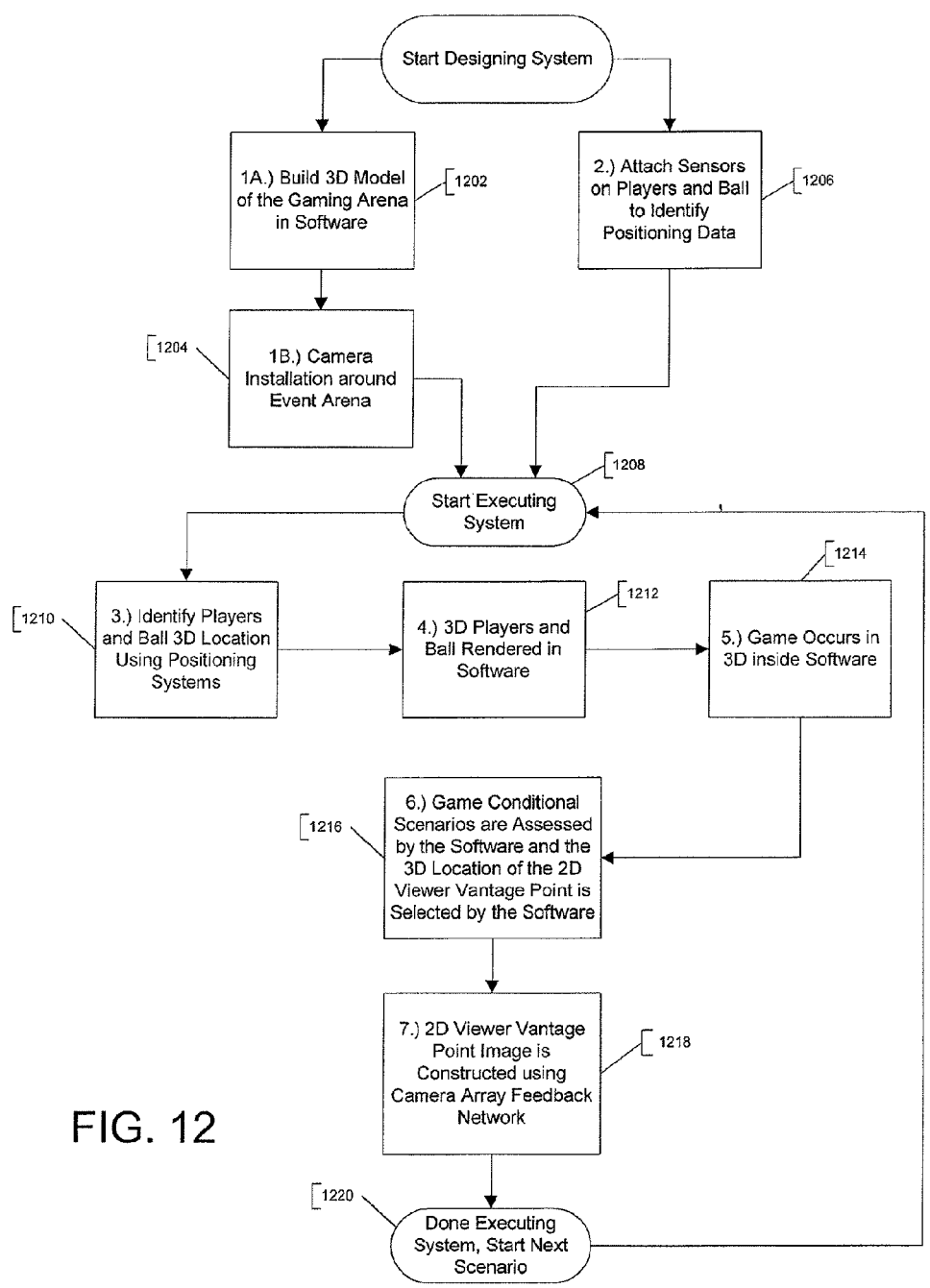
FIG. 12 is a flow chart of operations to perform the camera selection and viewpoint features described herein.

One mode to construct and execute the entire system is illustrated in FIG. 12. This Figure is a further level of complexity added to the fifth, sixth, seventh, eighth, and ninth implementations described before. FIG. 12 builds a 3D version of the event in software. This is not needed to implement the more complex implementations, but is a useful tool that exemplifies the most complex implementation. FIG. 12 helps to show the different parts of the system that are integrated together to accomplish the desired functionality. There are four major components of the system's design. Three of them are described in the first two steps and shown in FIG. 12 in blocks 1202, 1204, and 1206. The fourth system component is software that selects the output viewer vantage point given the position information inputs and the camera network feedback inputs. The functionality of the software is illustrated in the system execution steps (steps three to seven) shown in blocks 1208, 1210, 1212, 1214, 1216, 1218, and 1220. In the first step (1202), a 3D model of the event arena is constructed in software.

Next, at block 1204, the cameras are installed around the event using the 3D model as described in the previous paragraph. In the second step (1206), the players and the ball are located relative to the event playing field using the sensor and positioning system techniques described earlier. In the third step (first system execution step in block 1210), position information inputs of the system are identified or the players and the ball are located using the position sensors and methods described before. At block 1212, the player location data is then processed by the software, and the software creates 3D models of the players and the ball. The ball is constructed using at least three position data points and the player position information is fitted with 3D model avatars as described before. At block 1214, the game occurs in 3D inside the software. So, then in software the game takes place on the 3D model of the event in the exact same way the game is happening on the actual field or arena itself. At block 1216, the desired outputs are identified inside the software. Based on the player and ball position information, the desired camera, shot type, and camera angle is identified inside software. This then identifies to the system the 2D viewer vantage point desired or the 3D location where the live video feed (video signal) should be shot from in the 3D event arena. At block 1218, the software composes the desired live video shot or 2D viewer vantage point using the array of feedback cameras in the camera network. The seventh step (1218) described here is explained in detail in this section on MORE COMPLEX IMPLEMENTATIONS and later in the sections COMPREHENSIVE VIEWING OF ONE EVENT and PANORAMIC VIEWING FROM ONE VIEWPOINT.

Block 1220 shows that once the viewer vantage point is displayed to the viewer, the system then proceeds back to block 1208 where the software begins then to decide the next viewer vantage point to show the viewer. In a literal sense the software will be constructing a series of 2D images or viewer vantage point images that when viewed one after the other comprise the actual viewer vantage point or camera output and video signal. The Motion Picture Standard is 24 frames per second, broadcast television uses 30 frames per second, and the fastest camera speed currently used in an NFL broadcasting camera is 1000 frames per second. The frames needed by the system will depend on the event scenario, but will likely be somewhere between 24 and 1000 frames per second. It is duly noted that slow motion shots require cameras to shoot more frames per second than live or non-slow motion video recordings.

There are three main ways to construct the 2D viewer vantage point perspective output (the seventh step 1218) that allows the user to feel the 3D environment or immersive view of vantage points of the ongoing event. The first way to implement the 2D viewer vantage point is to render the 2D shot from the 3D game going on inside software. This would provide the viewer with a perspective of a live game that would look just like a CG sports video game of the event. The 3D model of the event created in software along with the 3D model of the ball and the CG avatar models of the players then interact together like a CG video game. The ball and player movements, however, are the same as what is occurring in the live event. CG audiences are also imposed in the stadium stands, for a more life-like experience. The viewer is then able to see this video-game like view of the event in either a pre-selected or manual viewing option. These different types of viewing options are described later. In the manual viewing option the viewer is be able to manually track their viewer vantage point into any angle or 3D viewpoint of the CG event. This first method can be used in conjunction with the Manual Viewing Option mentioned later. The CG movements of players in an actual game are then also useful information for video game makers. This movement information could be used in conjunction with the design of sports video games and allow game makers to more accurately emulate and create more realistic movements of their video game characters and ball interactions.

The second way to display the event in the seventh step (1218), is to use 3D imaging technology to mix live images taken by the cameras with the 3D model of the game created in software, and render a 2D viewer vantage point of those images. The multiple video signals are combined together in software using 3D imaging technology to provide the system with a 3D environment of vantage points to select from. There are two ways to implement the mixture of 3D models and live video signal information. Both implementations use the 3D model of the gaming arena and the CG 3D model avatars of the players. The first implementation attaches video signal information to the pre-existing 3D models, and updates it as it changes. The second implementation in addition creates 3D models of the players and game in real time. The second implementation then compares the real time 3D models with the pre-existing 3D models and augments its pre-existing 3D models. Then this method attaches the video signal information to the new 3D model. This second method can be used in conjunction with the Manual Viewing Option mentioned later. The second method can additionally be used to show pre-selected viewing options similar to those described herein.

The company L-3 Communications is presently developing a 3D imaging technology used for surveillance applications called Praetorian. Praetorian stitches video signal imagery onto pre-existing simple 3D models of buildings and landscapes. Praetorian takes all of the different surveillance video signals and attaches or puts the images into and onto the different parts of the existing simple 3D model of the surveillance area. An embodiment using 3D imaging technology similar to that developed by Praetorian would involve using pre-existing more complicated 3D models of players created from fitting CG avatars on top of the position information. This method then attaches the color of the images recorded by the cameras onto the pre-existing 3D models. These images change then as the video signals change.

Professor Takeo Kanade at Carnegie Mellon University in Pittsburgh, Pa., USA is well-known for developing methods for implementing this kind of camera technology in his Virtualized Reality project. Kanade and his students use a camera room filled with fifty cameras where they use image processing methods to create 3D models of the shape and color of the images captured on the cameras. His group uses a technique that is able to triangulate the position of different features of an object being filmed. The position of different corresponding parts of the object can then be determined using the multiple images, how the corresponding parts of the object change, and the known positions of the cameras. The triangulation technique calculates the distance from the camera to a known feature. In the triangulation technique, multiple images are taken of an object and the cameras' positions are known. The different cameras then compare the corresponding features in each image, and triangulate the position of the corresponding features. Knowing the correspondence point between two images together with knowledge of the position of the cameras when the images were taken is enough information to determine the location of the correspondence point relative to the cameras and thus its 3D location within the room. Kanade's group then integrates, and merges together the different parts of the shape models of the different objects in the camera room. Kanade's group then is able to fit images and color taken from the different cameras onto his triangulated 3D models.

An embodiment that is similar to Kanade's method uses pre-existing 3D models of the event gaming arena and CG 3D model avatars of the players. The system then triangulates real time 3D models of the ongoing event, namely the players.

These 3D models are typically crude in shape and form and thus are compared with the pre-existing 3D models. The system compares the real time 3D models with the pre-existing 3D models and optionally with the player and ball position information. The comparison is used to augment the pre-existing 3D models based on the triangulated 3D models, mapping movement recorded by the triangulated 3D models to the pre-existing 3D models. This allows the pre-existing 3D models to show more realistic movements. The triangulated 3D models are not precise in shape and form and provide the system described herein with an accurate indicator of 3D player movement more so than the actual complicated 3D geometry. This is used for the CG 3D model player avatars. The result is a mixture of pre-existing 3D models and real time 3D models. The recorded video imagery can then be overlaid on top of the different portions of the event, namely the CG 3D model player avatars. The second implementation process is iterative and updates frequently (typically as quickly as the frame rate) to capture motion and interactions of the event.

This second technique to display the event in the seventh step (1218), is still in its infancy of development in terms of providing a high quality video signal with a realistic resolution, depth of field, and perception of real objects. The daunting task of successfully accomplishing this technique lies in the ability to create accurately 3D models of objects of complicated geometry and movement, such as human beings. In this case, sports players. At this point, the technology is only able to create simple 3D models of human characters, with jagged 3D models that still look more like video game 3D CG characters than a live 2D video feed (video signal). One mode uses a third way to create the 2D viewer vantage point. This method identifies in software the 3D location of the desired 2D viewer vantage point and then constructs that 2D image using the feedback camera array network. The third way to execute the seventh step (1218) is described in greater detail below in the two sections COMPREHENSIVE VIEWING OF ONE EVENT and PANORAMIC VIEWING FROM ONE VIEWPOINT.

LIDAR or Light Detection and Ranging is an optical sensing technology that measures properties of scattered light to identify the distance to an object or the 3D surface of an area. The method uses laser pulses to identify the distance to different objects in the LIDAR system field of view. LIDAR is similar to RADAR in principle, but instead sends out signals at much higher frequencies. The higher frequency electromagnetic waves create strong reflections off of just about all types of materials, whereas RADAR only creates strong reflections off of metallic objects. Those of skill in the art understand how LIDAR can be used to identify the 3D surface area within its range. Thus, LIDAR technologies are used in one embodiment to create 3D surfaces of the ongoing event.

Comprehensive Viewing of One Event

One mode features the third way to execute the seventh step (1218) in FIG. 12. Its is noted that this method does not need the 3D modeling process described by FIG. 12. The 3D modeling process is a possible enhancement of the system and an alternative embodiment. Comprehensive viewing of one event can take place without the 3D model of the live event inside software. This third method uses the feedback camera array to construct the 2D viewer vantage point perspective from the desired 3D location of that particular shot. The camera technology used to implement this third method is similar to film techniques used to film the movie The Matrix and featured in the technology referred to as EyeVision. The infamous 360-degree panning sequences filmed in the movie The Matrix were accomplished using a still camera array featuring 122 cameras spaced roughly 3 degrees apart on a constant radius in a circle around the filmed actor. In order to film the rotation of the actor in slow motion, the 122 still cameras then fire sequentially one after the other around the circle. The movie The Matrix also used software that created intermittent frame images using image interpolation methods.

The EyeVision technology premiered in Super Bowl XXXV in Raymond Jones Stadium in Tampa, Fla. in 2001, and was co-developed by CBS, Carnegie Mellon computer vision professor Takeo Kanade, Princeton Video Imaging, and Core Digital Technologies. EyeVision featured the use of thirty-three cameras placed at approximately 80-ft level above the ground in the upper deck of the stadium. Each camera cost CBS approximately $20,000 and was mounted on a robotic platform that was able to precisely pan and tilt the camera in any direction. The cameras' movements were controlled by feedback robotic control systems that moved the cameras around. The cameras' zoom, focus, pan, and tilt capabilities were all computer controlled. EyeVision used its thirty-three cameras to capture the game from a range of 220 degrees. Thus, the cameras were placed at 7 degrees of separation apart from one another on a constant radius from the filmed event. EyeVision designates one camera as the master camera. The master camera is operated by a camera man, and it tracks and zooms around the game in the way that the camera man chooses to film the event. A computer receives zoom, focus, pan, and tilt data from the master camera and can then mathematically calculate what every other cameras' variables should be for zoom, focus, pan, and tilt actions so that the multiple cameras can capture the same range of action of the event from the different angles. The thirty-two other cameras then move and react to film the event in the same way the master camera zooms, focuses, pans and tilts. EyeVision then produces thirty-three images of the events on a constant radius so that a 220-degree circular rotation of viewer vantage point can be executed in 7-degree steps around the game.

One mode uses feedback robotically controlled cameras similar to the EyeVision cameras described above. However, this mode uses the position information of the players and ball in conjunction with the shot selection software to determine the 3D location of the desired 2D game shot, whereas EyeVision simply traces the master camera and camera operator's movements. The system controls where to look from the position information of the ball and players, whereas EyeVision designates the movements of its cameras based on the master camera and camera operator. One mode uses different 360 degree circular or elliptical arrangements of cameras that enable sideways or X-Y lateral or radial rotations in 360 degrees. It also uses different layers of 360 degree circles of cameras to further enable Y-Z or X-Z up-and-down rotations of fixed angles depending on the steepness of the stadium's stands. Once the camera network is able to move around in 360 degrees and up and down to any location in the stands, most every viewpoint from the stadium is achievable. The system can select and control any individual camera from the network of cameras. Then the cameras are able to zoom, focus, pan and tilt from all of these view points. Furthermore, interpolation techniques are used to create the necessary intermittent shots used in-between the various viewpoint camera transitions to allow for seamless transitional tracking around the stadium. It should be understood that the point of focus will typically be the game that is going on, on the field inside the stadium. The focal point will thus be determined by the location data of the ball and players in the game.

The 360 degree circles of cameras can be constructed using different numbers of cameras on different degrees of separation on a constant radius from the focus point. The different cameras are positioned to view the event from different locations around the event and thus have different respective fields of view coverage, also referred to as field of view. More expensive camera arrays featuring more cameras use smaller degrees of separation between cameras. Cheaper implementations will feature fewer cameras with larger degrees of separation between cameras. The example degree of separation used to describe one mode is chosen to be in between what was used in the movie The Matrix (3 degrees) and what was used in EyeVision (7 degrees). Thus, 5 degrees of separation is the example used requiring 72 cameras for each 360 degree circle. The invention can also be implemented with cameras separated by about 0.5 degrees to about 45 degrees.

The cameras are arranged radially around the event in the X-Y plane typically in elliptical, circular or contoured shapes. The focal point is what the camera is recording and focusing on, the radius is the line of sight from the camera to the focal point. For panning shots, many of the cameras are designed to focus on the same focal point and are spaced around the focus point in different shapes arranged radially around the focus point. The cameras are then arranged at radial positions around the focus point in that the camera array forms circular, elliptical, and other contoured shapes. The cameras can vary somewhat in their Z-axis orientation, such that they do not lie perfectly in the same X-Y plane, but close to it and substantially in the same plane.

FIG. 8 shows a football field and stadium 800 and the video cameras 802 associated with the system described by the invention. The video cameras 802 are represented by circles. Once more, a large circle is used to spot shadow a zoomed-in look at one of the video cameras 802. Cameras implemented in the actual system itself may consist of different shapes and sizes. One mode uses stationary and/or Pan-Tilt-Zoom (PTZ) cameras, such that they blend suitably into the event. Robotically controlled feedback cameras are used more so than stationary cameras, as the camera array needs to be able to adjust and move as the position information of the players and ball change. Such cameras use robotics and feedback networks to control the focus, zoom, pan, and tilt functions of the camera through a computer. More cameras, as opposed to fewer cameras, are used in this figure as well as in FIGS. 9, 10, and 11. The rational behind this is that it is easier to imagine an implementation with fewer cameras as opposed to an implementation with more cameras. One mode uses enough cameras so that the event can be captured from many angles, and allows the construction of so many 2D viewer vantage point perspectives that the viewer is able to feel the immersive sense of a 3D environment. FIG. 9 shows a soccer field and stadium 900 and the video cameras 902 associated with the system described by the invention. The video cameras 902 are represented by circles. In addition, a large circle is used to spot shadow a zoomed-in look at one of the video cameras 902. FIG. 10 shows a basketball court and stadium 1000 and the video cameras 1002 associated with the system described herein. The video cameras 1002 are represented by circles. Once more, a large circle is used to spot shadow a zoomed-in look at one of the video cameras 1002. FIG. 11 shows another view of a football field and stadium 1100 and the video cameras 1102 associated with the system described by the disclosure. The video cameras 1102 are represented by circles. Once more, a large circle is used to spot shadow a zoomed-in look at one of the video cameras 1102.

Figure 13:
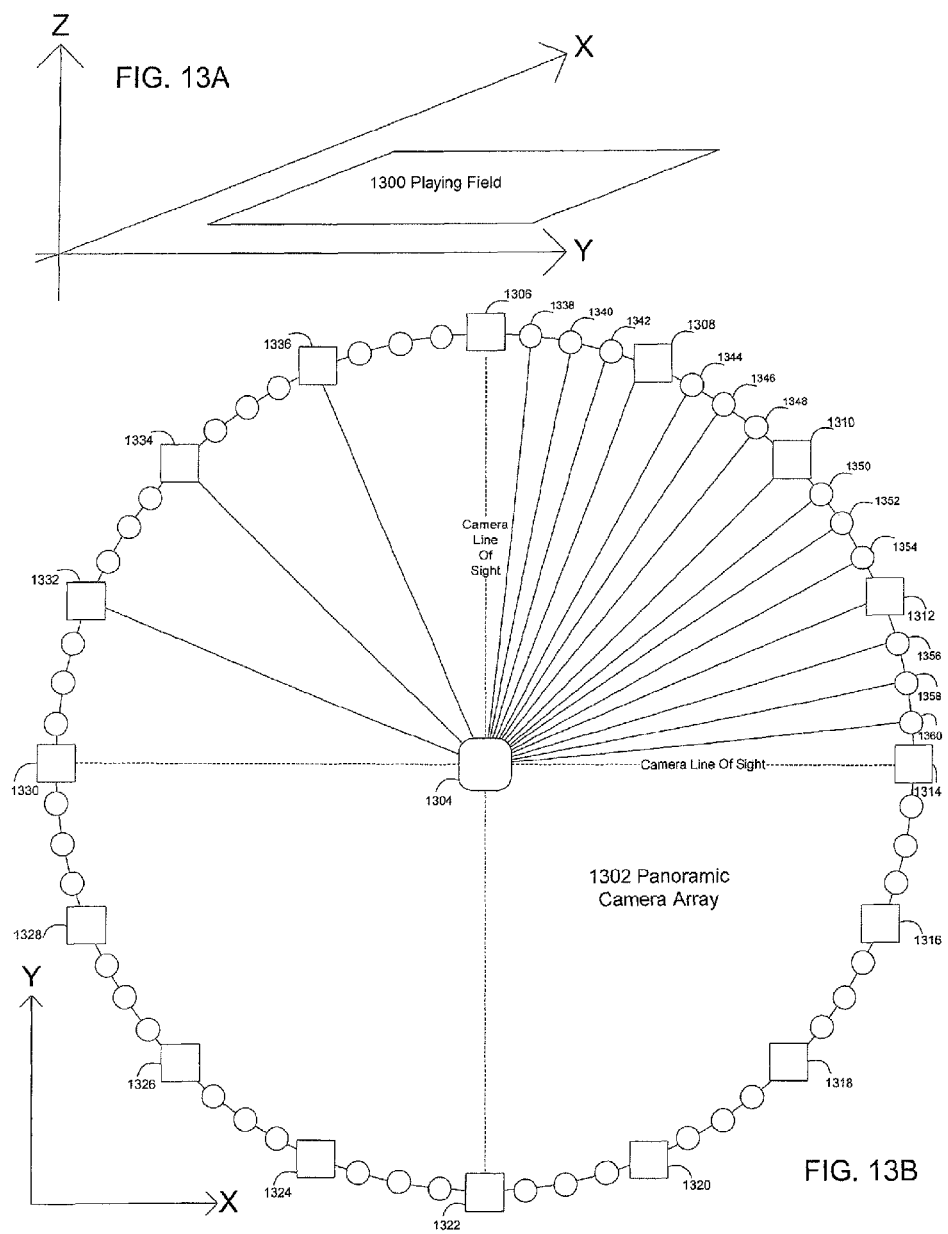
FIGS. 13A and 13B illustrate 360-degree arrangements of cameras and how they work together to construct rotating video shots in accordance with the disclosure.

The camera arrays shown in FIGS. 8 through 11 are able to construct up to 360-degree circles or ellipses that then allow the 2D viewer vantage point to rotate around the 360-degree range. Although the camera arrays shown in FIGS. 9 through 11 show complete or seamless camera arrays surrounding the playing field, incomplete or non-seamless arrays of cameras positioned at non-uniform positions can also be used. That is, each camera will provide its own respective field of view, and cameras may be arranged so these respective fields of view may be combined to provide a complete or seamless field of view, or the cameras may be arranged to provide independent respective fields of view. This was described above in the section CAMERA PLACEMENT FOR SIMPLER TRADITIONAL IMPLEMENTATIONS. Elliptical camera arrays do not use a constant radius distance from the focus point to the different cameras. In elliptical camera arrays the 360-degree rotation will then change the depth perspective of the viewer vantage point slightly as the radial distance between the cameras and the focus point will vary. Some camera-focus-point radii will be longer than the others and some camera-focus-point radii will be shorter than others. Further discussion of elliptical camera arrays is continued later. In the perfect circle camera array, the 2D viewer vantage point is able to rotate sideways or in the X-Y lateral or radial direction anywhere in this 360-degree range as shown in FIG. 13.

FIG. 13A shows an X-Y-Z axis relative to a playing field 1300. FIG. 13B shows an X-Y cross-sectional view of a panoramic camera array 1302 as featured in FIGS. 8 through 11. The camera array 1302 features 16 cameras placed equidistant from one another on a perfect circle marked by the squares 1306, 1308, 1310, 1312, 1314, 1316, 1318, 1320, 1322, 1324, 1326, 1328, 1330, 1332, 1334, and 1336. Thus, the cameras are arranged radially around the focus point. Each camera is positioned so that it is focusing on and observing a focus point 1304. The shape in 1304 is the focus point of the camera array. As mentioned before, this focal point 1304 will depend and vary based on how the position data of the players and ball changes. The position data is input to the software which then determines where to look or change the focus points of the camera array. Each camera then adjusts accordingly to maintain a constant camera-focus-point radius. FIG. 13B features sixteen cameras as opposed to the seventy-two cameras mentioned earlier for the previously mentioned 5 degrees of separation between camera perspectives. This camera array of sixteen cameras was used for the sake of brevity and to aid in the explanation of the general concept of such a camera array. Camera arrays featuring seventy-two cameras in a circle function the same way that this sixteen camera array functions. The camera array 1302 then allows for 360-degree tracking around in a circle. The live video signal switches from one camera to another allowing the 2D viewer vantage point to track around in the circle.

The camera arrays shown in FIGS. 8 through 11 and in FIG. 13B can be computer and robotically controlled using feedback networks. Each of the cameras marked by the squares 1306, 1308, 1310, 1312, 1314, 1316, 1318, 1320, 1322, 1324, 1326, 1328, 1330, 1332, 1334, and 1336 are robotically controlled so that the camera focus, zoom, pan and tilt capabilities are variably controlled by a computer. In this way all of the cameras can work together as a network to film the gaming event and maintain constant radii between the focus point and the camera perspective. All of the cameras then are able to focus and track the movements of the game together. The movements of the cameras are determined based on the position data of the ball and players in the game.

In FIG. 13B image interpolation is shown in the circles between the square shapes that show the 16 cameras in 1306, 1308, 1310, 1312, 1314, 1316, 1318, 1320, 1322, 1324, 1326, 1328, 1330, 1332, 1334, and 1336. The circles between the squares that represent the cameras 1306-1336 show the X-Y perspective and field of vision between the focus point and the interpolated images. Not all of the interpolated images, pictured in the circles on the periphery of the camera array circle, are labeled for the sake of simplicity. The image interpolation points between camera 1306 and 1308 are shown in 1338, 1340, and 1342. The method for constructing the interpolated perspectives in 1338, 1340, and 1342 is described further below and shown in FIG. 14. The image interpolation points between camera 1308 and 1310 are shown in 1344, 1346, and 1348. The image interpolation points between camera 1310 and 1312 are shown in 1350, 1352, and 1354. The image interpolation points between camera 1312 and 1314 are shown in 1356, 1358, and 1360. Likewise, the interpolation points between the remainder of the cameras 1314 and 1316, 1316 and 1318, 1318 and 1320, 1320 and 1322, 1322 and 1324, 1324 and 1326, 1326 and 1328, 1328 and 1330, 1330 and 1332, 1332 and 1334, 1334 and 1336, 1336 and 1306 are pictured in the small circles in FIG. 13B. The use of image based interpolation techniques allows the invention to calculate images in-between individual camera shots to make the 360 or variable camera degree rotations transition the 2D viewer vantage point more smoothly. Image based interpolation, sometimes referred to as image based space-time interpolation, uses mathematical algorithms to blend two different images together into one image.

Those of skill in the art have found out that images we finally perceive in our brain are not the same as the one-tone representation of the image sensed by the eye. What is perceived in the brain is an interpretation of the different 3D physical cues of form, texture, and motion. Image based space time interpolation draws from the concept of a modal perception, which is the full perception of a 3D physical structure when it is only partially perceived. For instance, we perceive objects, such as a chair, as full volumetric structures even if only parts of those objects are visible. Image based space time interpolation is able to morph two images together to create one intermittent image. The interpolation algorithms look for hints of where information is missing and use different image blending methods to create intermittent images. The result is extra images of what it would look like from an intermittent point of view between two images and our brains interpret the images strung together as motion in a 3D world. Temporal filters are often used in such interpolation techniques. Temporal filters compare two images and average the difference. Interpolation techniques were used in the movie The Matrix for smoother transitions in the 360-degree rotation shots. Also, frame rate conversion is often achieved by using frame repetition, temporal filtering, and/or motion-compensated interpolation.

Figure 14:
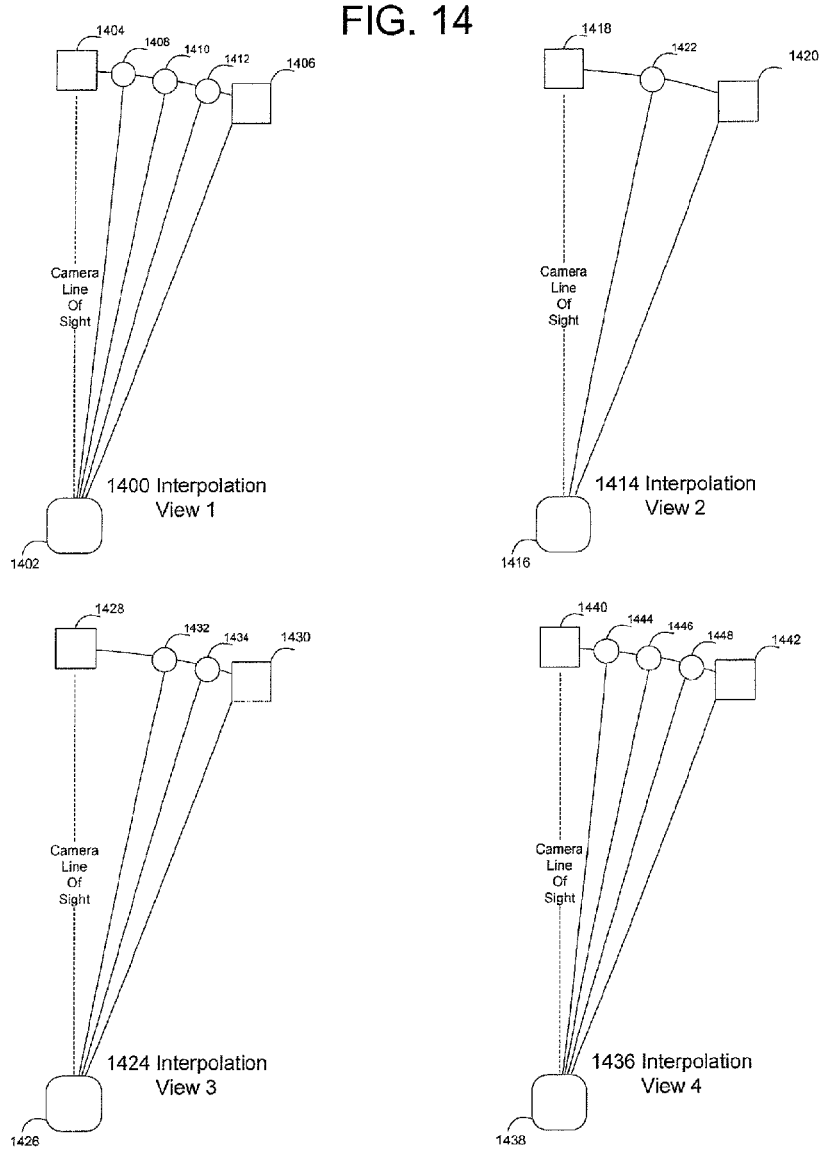
FIG. 14 shows how multiple interpolation images can be constructed from two images in accordance with the disclosure.

A process for constructing the interpolated images from the vantage points illustrated in FIG. 13B, between cameras 1306 and 1308 is shown in FIG. 14. In the first interpolation view (Interpolation View 1) 1400, cameras 1306 and 1308 correspond to cameras 1404 and 1406 respectively. In FIG. 13 the three interpolated points between cameras 1306 and 1308 are shown in 1338, 1340, and 1342. Those same three interpolated points are shown in FIG. 14 in 1400 in Interpolation View 1 as viewpoints 1408, 1410, and 1412. Interpolation View 1 (1400) shows the interpolated viewpoints 1408, 1410, and 1412 as they are constructed upon completion of the intermittent interpolated perspective images. In Interpolation View 2 (1414), the first interpolation image 1422 is created using the image from camera 1418 and the image from camera 1420. In Interpolation View 3 (1424), a second interpolation image 1434 is constructed using the image from a first interpolation image 1432 and an image from a second camera 1430. In Interpolation View 4 (1436), a third interpolation image 1448 is constructed using an image from a first camera 1440 and a first interpolation image 1446. Thus, FIG. 14 illustrates how intermittent images can be created using interpolation and used to populate vantage points in between different cameras. The method illustrated in FIG. 14 can be applied to FIG. 13B and one can see how the remainder of the interpolated circles can be composed using the images from the sixteen cameras marked by the square shapes 1306, 1308, 1310, 1312, 1314, 1316, 1318, 1320, 1322, 1324, 1326, 1328, 1330, 1332, 1334, and 1336. Furthermore, this same technique can be used for the case of a 72-camera array using 5 degrees of separation in between cameras. For 360-degree panoramic viewpoints of an event with 1 degree of separation between images, four interpolated images are composed between each camera image. This kind of camera array, seventy-two cameras and 288 interpolated camera view points, would allow the 2D viewer vantage point to track seamlessly around the stadium in 360 degrees. It should be noted that there are limitations on the extent to which the interpolation methods can be used to replace necessary cameras. If the images used to create interpolated images are too far apart, or if the images are not similar enough, it can be difficult to construct an accurately looking interpolated image.

Once a 360-degree camera array is constructed, the camera array is able to zoom-in to create a smaller circle and track around those viewer vantage points which are closer to the event. The 2D viewer vantage point then is able to spin around the 360-degree range from the 360 zoomed-in images. Zoomed-in interpolated images can be constructed from zoomed-in images. Therefore, the 2D viewer vantage point can effectively zoom in from any point in the 360-degree circle of cameras and interpolated images. Zooming and transitioning between shots is another effect that is achievable by this system. This is accomplished by slowly elongating the camera-focus-point radius as the viewer vantage point changes from one camera (or interpolated image) to another. This effect achieves both zooming and rotating around the sporting event. This effect can be accomplished either in zooming-in toward the game and rotating around the event or in zooming-out and away from the event while rotating the viewer vantage point around.

Figure 15:
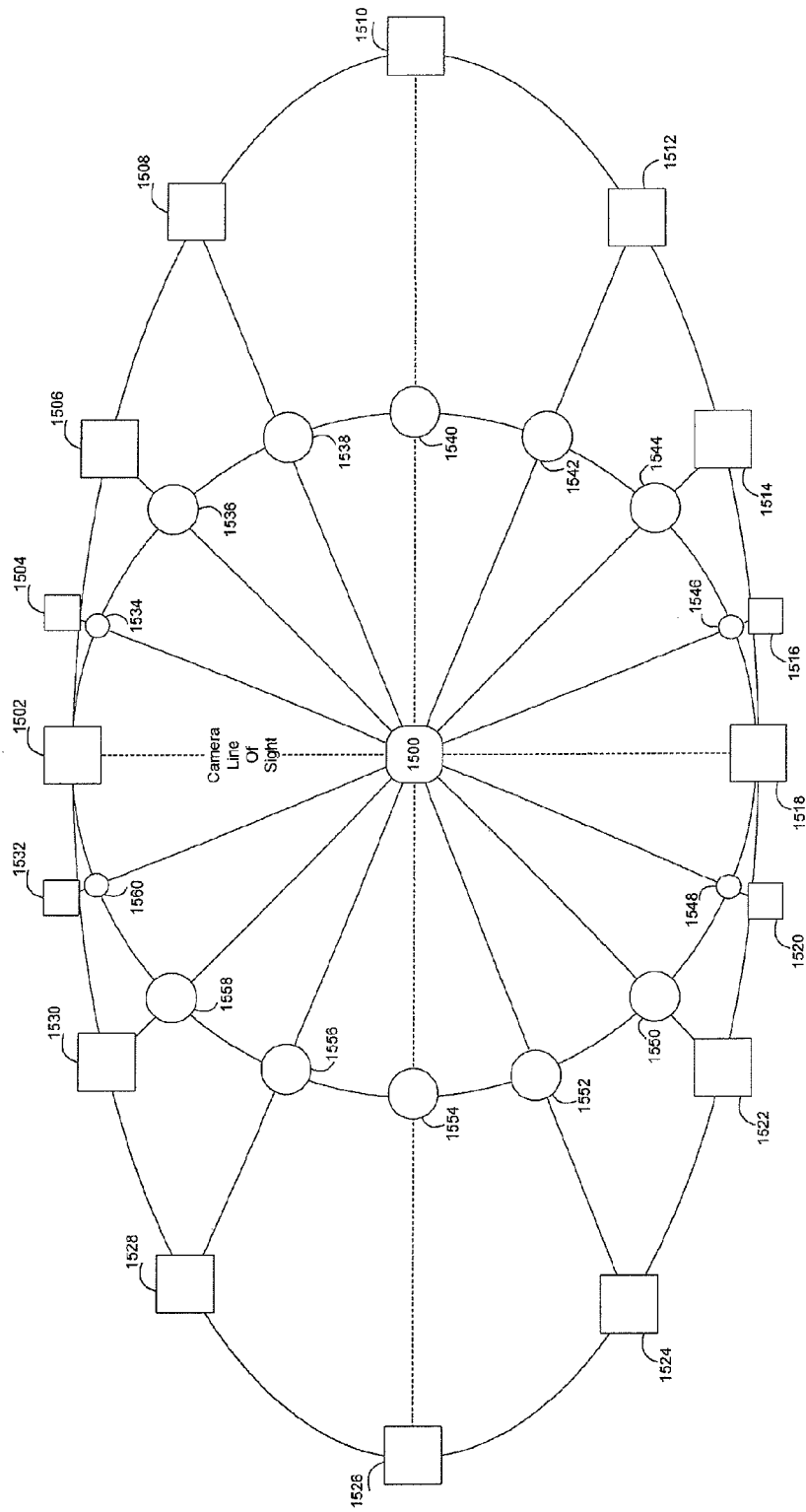
FIG. 15 shows how elliptical camera arrangements can use a zooming function to zoom and create circular image arrangements between the cameras and zoomed shots in accordance with the disclosure.

Most sporting event stadiums are not constructed to allow the placement of camera arrays to be configured in perfect circular arrangements. The system designer then has two options. A first option is to use an elliptical camera array from which to conduct the 360-degree rotation, where the camera-focus-point radii will vary. A second option is to mimic a perfect circular camera array using the zooming function of some of the cameras. This second technique is illustrated for the case of a 16-camera array in FIG. 15. All sixteen cameras 1502-1532 are focused on the center point 1500 of the ellipse or circle, such that the line of sight between the cameras and the focus point is as pictured in FIG. 15. The perfect camera array circle is composed by using two cameras (1502 and 1518) with normal viewing perspective and the other fourteen cameras zooming into the constant radius distance of view from the focus point (set by the distance of the two cameras 1502 and 1518). Thus, the camera 1504 zooms into the perspective of the point 1534 such that the image-focus-point radius from 1534 to 1500 is the same as that set by the distance between cameras 1502 and 1500. Likewise, camera 1506 zooms into the perspective of point 1536, camera 1508 zooms into the perspective of point 1538, camera 1510 zooms into the perspective of point 1540, camera 1512 zooms into the perspective of point 1542, camera 1514 zooms into the perspective of point 1544, camera 1516 zooms into the perspective of point 1546, camera 1520 zooms into the perspective of point 1548, camera 1522 zooms into the perspective of point

1550, camera 1524 zooms into the perspective of point 1552, camera 1526 zooms into the perspective of point 1554, camera 1528 zooms into the perspective of point 1556, camera 1530 zooms into the perspective of point 1558, and camera 1532 zooms into the perspective of point 1560. Using the combination of the normal camera perspectives and the zoomed-in camera perspectives the perfect circle array of camera images can be constructed at constant image-focus-point radii. The system can use both the circular and elliptical camera configurations to add a wider variety of shots for the software to select from.

A single 360-degree camera array allows the 2D viewer vantage point to track around in 360 degrees and to zoom in and out from any perspective on that 360-degree circle or ellipse. Also, multiple 360-degree camera arrays can be used so that the 2D viewer vantage point can track 360 degrees around the event from different vantage points in the stadium as shown in the camera arrays in FIGS. 8 through 11. FIGS. 16A, 16B, and 16C illustrate how the camera rings are able to transition the 2D viewer vantage point from an upper deck to a lower deck. FIG. 16A shows an X-Y-Z coordinate system relative to a playing field 1600. FIG. 16B then shows a cross-section of the stadium along the Y-Z plane. Cross section 1602 shows the playing field relative to the Y-Z plane. Cross section 1604 shows the near side of the event stadium relative to the Y-Z plane. An arrow 1606 indicates the largest possible angle between the highest viewing point in the stadium and the event, and the lowest viewing point and the event. This angle varies somewhat depending on what part of the game the camera is focusing on. This angle also changes depending on the stadium and how steeply rising the angular geometry of the stadiums' stands are. Embodiments can account for angles 1606 in a range from about 5 degrees to about 90 degrees. The angle will typically be in a range between about 40 degrees and about 60 degrees. For the sake of simplicity the angle used to describe FIG. 16C and the invention will be 45 degrees. FIG. 16C illustrates how to conduct Y-Z plane 2D viewer vantage point rotations from the 0 degree perspective to the 45 degree perspective.

FIG. 16C shows how to conduct Y-Z viewer vantage point rotations around the stadium. A field cross section 1608 shows the playing field relative to the stadium. A first stadium cross section 1610 shows the near side of the event stadium relative to the playing field. A second stadium cross section 1612 shows the far side of the stadium relative to the playing field cross section 1608. FIG. 16C shows a Y-Z cross-section of different cameras that are each one camera that is part of a 360-degree radial (X-Y plane) camera array as described earlier in FIGS. 8 through 15. FIG. 16C shows six rows of 360-degree radial camera arrays. It is noted that simpler implementations can make use of vertical camera arrays that do not simultaneously lie on radial 360-degree camera arrays. The two cameras in the first row of cameras, from the near and far side, are pictured by the squares 1624 and 1636 respectively. The two cameras in the second row of cameras, from the near and far side, are pictured by the squares 1622 and 1634 respectively. The two cameras in the third row of cameras, from the near and far side, are pictured by the squares 1620 and 1632 respectively. The fourth cameras in the first row of cameras, from the near and far side, are pictured by the squares 1618 and 1630 respectively. The two cameras in the fifth row of cameras, from the near and far side, are pictured by the squares 1616 and 1628 respectively. The two cameras in the sixth row of cameras, from the near and far side, are pictured by the squares 1614 and 1626 respectively.

In FIG. 16C the six rows of cameras are able then to transition in a circular motion in the Y-Z plane through a 45-degree angle. The transition occurs by changing the viewer vantage point across a constant image-focus-point radius. The transition can also occur using a varying image-focus-point radius that will allow the viewer vantage point to feel both movement of perspective and zooming action (either zooming-in or zooming-out). This is similar to the techniques described earlier in FIG. 15. The six cameras, when correctly placed around the field will provide 7.5 degrees of separation between the 45 degree range. The 5-degree separation implementation described earlier uses nine rows of 360-degree camera arrays. Circular constant image-focus-point radius rotations are performed from the near side of the stadium 1610 by first using the image from the camera pictured in 1624. The camera output then transitions to the zoomed-in image captured by camera 1622 at the vantage point 1638. The camera feed then transitions to the zoomed-in image captured by camera 1620 at the vantage point 1640. The camera feed then transitions to the zoomed-in image captured by camera 1618 at the vantage point 1642. The camera feed then transitions to the zoomed-in image captured by camera 1616 at the vantage point 1644. The camera feed then transitions to the zoomed-in image captured by camera 1614 at the vantage point 1646. As used in the X-Y plane rotation, the Y-Z rotation makes use of interpolated images to provide seamless transitions of viewer vantage point. For the example of 5 degrees of separation, four interpolated images in between each camera and each zoomed-in image, would allow for forty-five vantage points for the 2D viewer vantage point to transition through.

Camera Y-Z rotations are similarly performed from the far side of the stadium 1612 starting with the camera 1636 depicted in FIG. 16C. The viewer vantage point then transitions to the zoomed-in image 1648 from the camera 1634. Likewise, the viewer vantage point then transitions to the zoomed-in images 1650, 1652, 1654, and 1656 from cameras 1632, 1630, 1628, and 1626, respectively. Interpolation is used here as well and this 6 camera-image model shows how a 9-camera image implementation would work. The 9-camera image implementation can then make use of interpolation to produce four images in-between each of the camera and zoomed-in camera images. This then produces forty-five images with perspectives that are equidistant from the event in the Y-Z plane. The other circles pictured in FIG. 16C show that other constant image-focus-point radius circular rotations can be achieved from a viewer perspective that is at a greater distance from the event or using a larger constant image-focus-point radius.

As described earlier, the camera arrays featuring 5 degrees of separation can use four interpolated images in between each camera to construct 360 images of the event in the X-Y plane. The technique used to construct the forty-five images in the Y-Z plane then can similarly be used to construct forty-five images in each of the 360 cross-sections of the X-Y plane. It is noted that one of these cross-sections of the X-Y plane is the X-Z plane. Seventy-two of the cross-sections of forty-five images will come from camera and zoomed-in camera images. Of the images, 288 of the cross-sections of the forty-five images will come from interpolated images of the cameras, and use the zooming and interpolation techniques described to produce those images. It is noted that viewer perspective rotations can also be used in both lateral or radial side-to-side angles and vertical up-and-down angles. The effect of conducting both lateral or radial and vertical viewer perspective rotations are diagonal movement both up and around at the same time. Likewise, down and around at the same time. Different implementations can use varying numbers of cameras, degrees of separation between cameras, and number of interpolated images produced between cameras and zoomed-in camera perspectives.

The result of the rows of camera arrays and interpolated images is the ability to track the viewer vantage point around in 360 degrees and up and down in 45 degrees. Elliptical rotations produce the effect of rotating and zooming. Zooming can be used to create circular and elliptical rotations, so that the viewer vantage point perspective of the event can move around to anywhere in the stadium and zoom in and out from anywhere in the stadium. The 3D location of the desired shot is determined first by the software. The software then uses the cameras, and interpolation methods described to construct a shot at or close to that 3D location. Zooming and tracking can then occur at that 3D location. The system then iterates as the position information changes, and develops new sets of 3D coordinates. It then rotates to that perspective and tracks the 2D viewer vantage point to that new perspective.

Figure 17A:
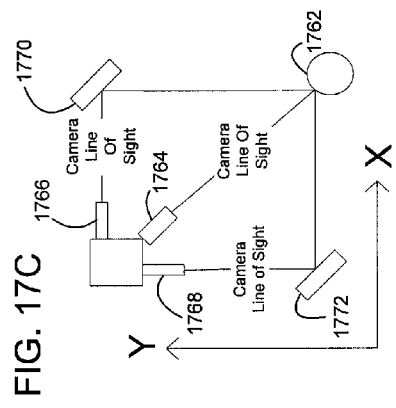
FIGS. 17A and 17B show camera configurations that allow for vertical or up-and-down rotating video shots using cameras suspended by cables in accordance with the disclosure.
Figure 17C:
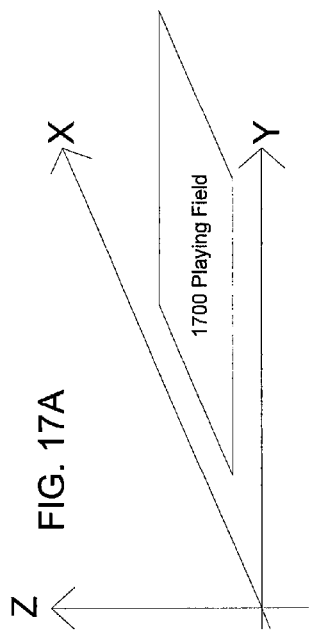
FIG. 17C shows a camera configuration that uses three camera lenses and mirrors to obtain multiple perspectives from a camera at one location in accordance with the disclosure.
Figure 17B:
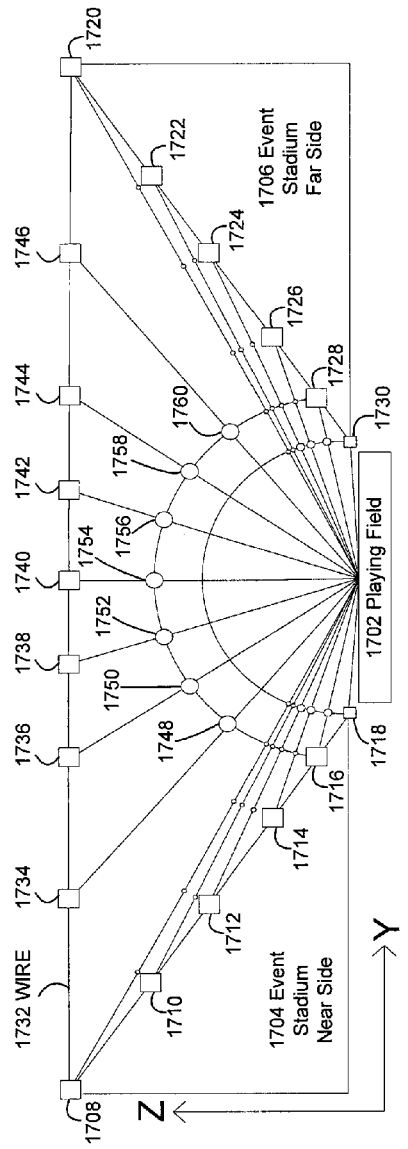

The 45-degree range created by the cross-sections of the X-Y plane rows of cameras can be expanded to feature close to a 180-degree range rotation. This is accomplished by hanging cameras on wires or cables above the event as shown in FIG. 17B. FIG. 17A shows a playing field 1700 relative to the X-Y-Z coordinate system. FIG. 17B shows a playing field cross section 1702 relative to the Y-Z plane, a near side of an event stadium cross section 1704 and a far side of an event stadium cross section 1706. The cameras around the stadium are shown in the squares 1708, 1710, 1712, 1714, 1716, 1718, 1720, 1722, 1724, 1726, 1728, and 1730. Those cameras in FIG. 17B correspond to the cameras 1614, 1616, 1618, 1620, 1622, 1624, 1626, 1628, 1630, 1632, 1634, and 1636, respectively, in FIG. 16C. Cameras are also suspended on a wire or cable 1732 in FIG. 17B and are shown in the 7 squares 1734, 1736, 1738, 1740, 1742, 1744, and 1746. The cameras 1734-1746 can then zoom into perspectives that allow close to 180 degree rotation around a constant image-focus-point radius. The cameras 1734, 1736, 1738, 1740, 1742, 1744, and 1746 then zoom into the vantage points featured in the circles 1748, 1750, 1752, 1754, 1756, 1758, and 1760 respectively. It is noted that interpolation is also conducted between these vantage points to allow more seamless transitions of viewer vantage point around the close 180-degree range. It is not a complete 180-degree range because it is necessary for a camera to be elevated somewhat off the Z-axis from the playing field in order to view the game. The implementation featuring 5 degrees of separation would use approximately thirty-six cameras configured similarly as in FIG. 17B around the event. Four interpolation images in between cameras allow for 1-degree separation between transitional viewer vantage point images.

Robotically controlled feedback mirrors can also be positioned around the event to reduce the number of cameras needed to capture the event. Multiview mirror pyramid panoramic cameras make use of a mirror pyramid to compose panoramic images from one perspective. Similarly, cameras can gain vantage points of the event by using carefully calibrated robotically controlled feedback mirrors. FIG. 17C shows a configuration of a camera tripod that has three camera lenses built into it. The camera lenses are shown in the rectangles in 1764, 1766, and 1768. The focal point of the cameras is pictured in the circle in 1762. The first camera lens 1764 has a direct shot from its perspective of the focus point 1762. The second camera lens 1766 obtains a view of the focus point 1762 from the perspective of the mirror 1770. Likewise, the third camera lens acquires a view of the focus point 1762 from the mirror 1772. Camera arrangements such as featured in FIG. 17C can be incorporated into the system invention to reduce the number of cameras needed to capture an event. There are a number of different ways in which mirrors such as these can be incorporated into the system described herein.

In the implementations described herein, camera position and field of view for each camera to be controlled by the system are used by the system to select camera output. Position information for each camera at the ongoing event can be calibrated based on the placement of the camera at the event, as well as pan, zoom, tilt, and focus information for the camera. For a robotically controlled feedback camera, the pan, tilt, zoom, and focus information can be stored at an initial calibration operation and can be continuously updated during operation of the system as the event continues. The updated camera position information will indicate where the camera is looking. Similarly, a manually-operated camera could be subject to an initial calibration operation to let its location, pan, zoom, tilt, and focus data be known to the system, which can then store and monitor the camera position information even as the camera was operated in a manual fashion. Similar information may be received from cameras whether the cameras are stationary, being in a fixed location throughout the event, or if the cameras are mobile and move about during the event.

The following camera placement description is of a more complicated implementation. Less expensive implementations can use fewer cameras and a more limited range of 2D viewer vantage point perspectives to choose from.

Panoramic Viewing from One Viewpoint

Panoramic 360-degree images can also be constructed from a single viewpoint. In this way, the viewer vantage point is able to view 360-degrees of vision from a certain 3D location in the event from a certain viewpoint. Such viewpoints are optionally used, since much of the 360-degree imagery will not be viewing what is going on in the gaming event itself. However, at critical moments in the game, these types of panoramic shots would add an immersive feeling of what it would be like to be at the event. Placement of panoramic 360-degree cameras at certain locations around the event will allow the viewer vantage point to track into a shot from that perspective and then spin around giving them a view of the stadium's response to in game action. Such shots can be used at times in the game such as when a touchdown has occurred in American football. Panoramic camera arrays or panoramic view cameras can be incorporated into football helmets, so that the viewer can track around in 360 degrees of vision perspective of what a player is able to see.

Figure 18:
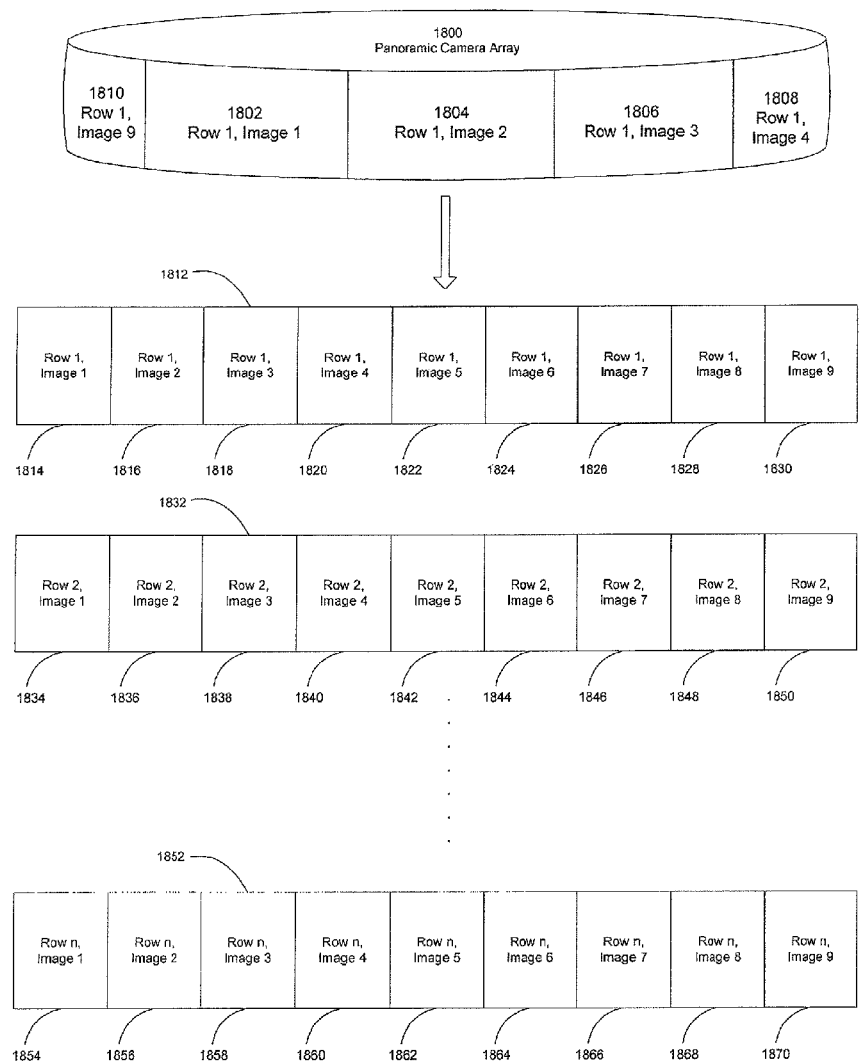
FIG. 18 shows how a panoramic view camera operates by combining images from one location in accordance with the disclosure.

Multiview mirror pyramid panoramic cameras use a mirror pyramid to record multiple views from a single perspective. The second option for designing a panoramic view camera involves the use of multiple camera lenses such that the different images can be later combined for a complete 360-degree panorama. Other implementations can also use more than one camera. FIG. 18 shows how such images are combined together, and in the case of this example nine images are used to construct a panorama. 1800 is a panoramic view camera, where all of the camera lenses, or one lens and mirror pyramid, capture images from the center of the circle. The panorama of images captured by the camera 1800 is shown in FIG. 18 in 1802 (image 1), 1804 (image 2), 1806 (image 3), 1808 (image 4), and 1810 (image 9). In the panoramic camera 1800, images 5 through 8 are on the other side of the circle and thus cannot be seen. The 9 images are combined together in a computer and arranged one next to the other as shown in 1812 so as to create 1 large panorama. In 1812 each of the nine images is placed side by side so that the panorama is formed by image 1 (1814), image 2 (1816), image 3 (1818), image 4

Figure 19A:
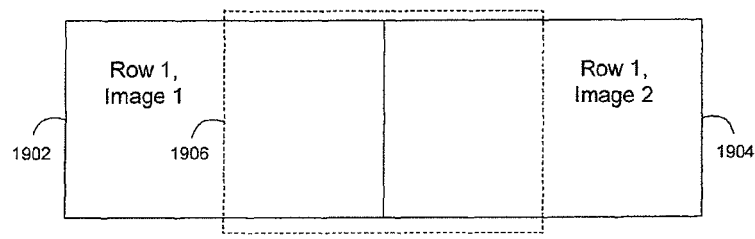
FIGS. 19A, 19B, and 19C show how a panoramic camera operates by combining images from one location and can allow a single frame perspective to pan around those images in accordance with the disclosure.
Figure 19B:
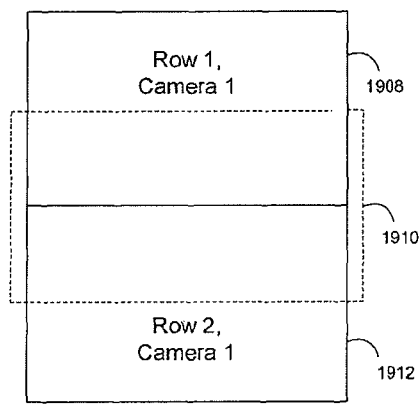

(1820), image 5 (1822), image 6 (1824), image 7 (1826), image 8 (1828), and image 9 (1830). An infinite number of perspectives can then be formed by panning around this panorama of images and is shown in FIG. 19A. FIG. 19A shows how a viewer vantage point 1906 can slide sideways back and forth and capture an infinite range of images within the larger image created by a first image 1902 and a second image 1904. FIG. 19B shows how a viewer vantage point 1910 can slide up and down and capture an infinite range of images within the larger image created by a first image 1908 and a second image 1912. Likewise, the viewer vantage point can slide up and down within a larger panorama created by two panoramas placed on top of one another, for instance panorama 1812 placed on top of panorama 1832. It is noted that when the vantage point slides to the end of one side of the panorama in 1812 it loops back to the other side. Therefore, the pan can occur in a circle and go around and around.

Figure 19C:
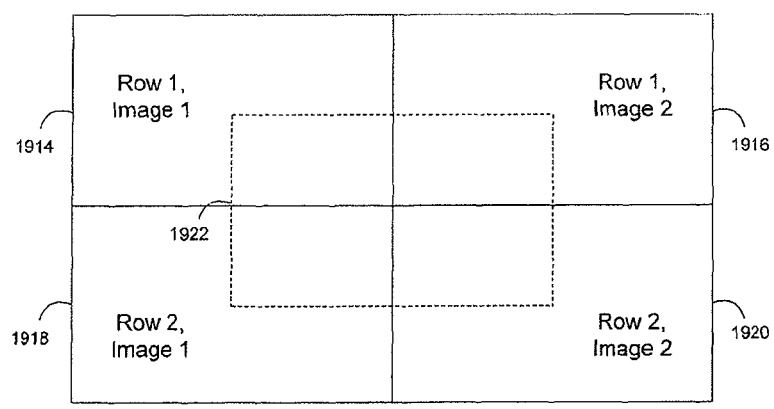

As well as constructing radial or lateral panoramas, vertical panoramas can be constructed too. Furthermore, lateral or radial and vertical panoramas provide even larger images of an event than can allow the viewer vantage point to trace around. FIG. 18 shows a second panorama 1832. This second panorama 1832 is constructed from nine images as in 1812. The images 1834, 1836, 1838, 1840, 1842, 1844, 1846, 1848, and 1850 are then combined in a computer so that the large panorama 1832 is composed. The two rows of panoramas 1812 and 1832 can then be combined one on top of the other to allow the viewer vantage point to pan both side-to-side and up-and-down. FIG. 19B shows how the viewer vantage point 1910 can trace up-and-down between the first image 1908 and the second image 1912. Using the concepts illustrated in FIGS. 19A and 19B, one can see how in 19C the viewer vantage point 1922 can trace anywhere in the larger image composed. The larger image is constructed from 1914, 1916, 1918, and 1920. From the illustrations in FIGS. 19A, 19B, and 19C one can see then how the viewer vantage point can trace side-to-side and up-and-down around the larger image created from the two rows of panoramas 1812 and 1832. It is noted that image correlation methods are used to properly align the panoramic images side by side and on top of one another inside software.

More rows of panoramas can be added to construct even larger images from which to pan side-to-side and up and down. FIG. 18 also shows an nth panorama 1852, where n is an integer value greater than 2. The nth panorama 1852 is composed from the 9 images 1854, 1856, 1858, 1860, 1862, 1864, 1866, 1868, and 1870. Zooming functions of cameras can also enable the ability to zoom in on different areas from around the panorama. Panoramic view cameras such as those described in this section are computer controlled to allow for instant panning and zooming around from one specific viewer vantage point.

Camera Mounting Apparatuses

Different camera mounting apparatuses can be used to place cameras around an ongoing event. These camera mounting apparatuses can be either permanent or temporary installation fixtures. They can be installed around an event temporarily or long term. The cameras themselves will likely be designed such that they can be temporarily installed and removed from the permanently installed camera mounting apparatuses. Many event stadiums today are pre-wired up, so that cameras can be quickly connected before covering an event. In a similar fashion, camera mounting apparatuses can be pre-wired up so that cameras can be quickly installed shortly before event coverage.

The camera mounting apparatuses that are described herein are especially useful for placing cameras in close proximity to the event itself. One factor that determines how to place cameras around the event is whether or not the camera obstructs the view of a spectator at the event. The variety and number of cameras used to implement the invention described herein can be limited because more complex camera arrangements will obstruct the view of spectators at the event. It is desirable to place cameras around the event such that they do not obstruct the view of the spectators. However, even today cameras placed around different events do obstruct the spectators' view on occasion. Thus, the invention described herein aims to minimally obstruct the view of the spectators at the event, and find the optimal camera coverage configuration(s) that will provide comprehensive coverage and minimally obstruct spectators' view of the event.

FIG. 30 shows two different camera mounting apparatuses. FIG. 30A shows the X-Y-Z coordinate system relative to the playing field 3000. FIG. 30B shows a pole aspect of the mounting apparatus. Cameras (robotically controlled and otherwise) are mounted on poles that are distributed around the event boundaries. A radial (X-Y) portion of the pole is shown in 3004. The X-Y portion 3004 of the pole can wrap around the event arena in circular, elliptical, polygonal, or other kinds of encircling shapes. The camera 3002 mounted to this radial portion of the pole 3004, is shown in 3002. The pole that wraps around the event is then elevated above ground level by the vertical portion of the pole shown in 3006. The radial portion of the pole 3004 and the vertical portion of the pole 3006 can both be designed to have a hollow cavity inside of them. This hollow cavity allows for space for wires and cables 3008 to run inside of the pole from the camera to the rest of the system. The pole can be made of different types of metal and other sturdy materials.

FIG. 30C shows the first camera system which features a radial camera apparatus pole 3012 that wraps around a football field 3010. Presently in American football, camera men move up and down the sideline on large dollies that sit at ground level and elevate the camera above the ground level. These dollies obstruct the view of the spectators on the sideline somewhat, depending on the stadium and respective seating configuration. The radial pole 3012 can be positioned in front of a first row of spectators such that it minimally obstructs the view of the spectators sitting in the first row. This is done by adjusting the vertical pole length shown by 3046. Also, the distance off of the sideline boundary, and the distance away from the first row of the stands are factors that effect obstructive view. Typical heights used for 3046 range from about 7 to about 12 feet. The cameras can be placed high enough to look out over the players and coaches on the sidelines. The cameras mounted by the camera apparatus 3012 are shown in 3014, 3016, 3018, 3020, 3022, 3024, 3026, 3028, 3030, 3032, 3034, 3036, 3038, 3040, 3042, and 3044.

FIG. 30D shows a second camera mounting system. This camera mounting system pertains to the mixed martial arts sport the Ultimate Fighting Championship (UFC). In this event mixed martial artists fight in a caged arena called The Octagon shown in 3048. The Octagon 3048 is an eight-sided structure, with metal chain-link walls, and a top metal boundary that is encased in vinyl. The Octagon has a diameter of 32 ft, allowing 30 ft of space from point to point. The top metal boundary or fence height is about 5 feet 6 inches to 5 feet 8 inches high. Presently, camera men stand on stools around the event and film the event with large cameras that hang over the outside of the top of The Octagon (3048) or top metal boundary. The camera mounting apparatus described by the invention herein features robotically controlled feedback cameras that are posted around the top metal boundary of The Octagon. These cameras are shown in FIG. 30D in 3050, 3052, 3054, 3056, 3058, 3060, 3062, and 3064. The invention described herein is less obstructive to the spectators' view of the event than the present method featuring camera men. In the present method camera men block the spectators' view of the fighters when they stand in front of The Octagon. FIG. 30D illustrates this current method with a camera man 3066 standing on top of a stool 3068. The camera man 3066 operates his camera 3052 in the current method. The Octagon itself is a useful camera mounting apparatus, and allows the invention described herein to easily mount cameras around the top of it.

Multiple pole mounted camera apparatuses can be installed at different layers around the event stadium. In this way the pole mounted camera apparatuses are placed in different seating sections or decks of the stadium to achieve different vertical (or Z-axis) camera perspectives. Thus, the different layers of pole mounted cameras can be installed at different levels in the event arena stands. They can be placed in between stand sections so as to minimally obstruct the view of the spectators at the event. As well as mounting cameras on poles that are mounted around the event, cameras can be suspended by cables from the ceiling of the event arena. In this implementation the X-Y portion of the camera mounting apparatus is still used with the cameras mounted on top of it. Instead of using the vertical Z-axis portion of the pole, the X-Y portion of the pole is suspended by cables from the ceiling of the event arena. Suspending the camera mounting apparatus can make it less invasive in terms of blocking the spectators' view of the event.

Programming Options

A system constructed in accordance with the disclosure provides the ability to capture sports entertainment in a way that is presently impossible in both actual games and in movies themselves. The problem inhibiting capturing the action of live play, as previously mentioned, is largely due to the unpredictable nature of the event. People in the past have tried to enhance the game viewing experience, as was seen in the XFL upon its debut. The XFL tried to bring the viewer closer to the action by positioning camera men on the field in with the action. The result was often a few hectic shots of the players with little correlation to the game at hand. The problem with this idea was in the unpredictable nature of the event and the latency of human reaction time. Even in making movies about sports, film makers have had numerous problems capturing authentic shots of a sporting event. The problems exist in the ability to recreate the event with actors and stunt men. Once more, it is hard for the people simulating the game to feel the emotion and show the same type of display of in game performance as the actual athletes do themselves. Oliver Stone's movie Any Given Sunday exemplifies this. The film even used some NFL players to shoot many of its shots and the movie still had problems capturing large shots of a sporting event. Most of the shots of the in game action are tight, narrow shots of only a few players interacting at a time. Larger shots of the game evolving are mostly absent from the film and are absent from most sports films.

In accordance with the disclosure, film making shots of the game are united with the game itself in a way that is now next to impossible in both sporting events and the movies. The processing to provide such control with a large degree of automation is to quantify all of the possible film making shots that are aesthetically appealing to the eye by conditional statements related to position information of the ball and the players in the game. A control program can be produced for computer-controlled camera selection and viewpoint selection. What is meant by film making shots should be considered within the context of movies in general. For example, the movie The Matrix, is an excellent example of the types of shots to capture. Shots of the action that zoom in and out very quickly and rotate around the action in all angles. The idea is to heighten the viewing experience as much as possible.

Testing on NFL players shows vertical leaps of around three to four feet, speed to run forty yards in 4.3 seconds, and bench pressing tests of 225 pounds lifted more than thirty times without rest. It should be apparent that these players are far from the normal in terms of abilities, but right now you can't see that fact with the traditional EWSs (Extremely Wide Shot) or VWSs (Very Wide Shot) with "birds-eye view" camera angles. What the invention provides is the ability to put the players' athletic gifts on display by using shots that show how fast they run, how high they jump and how big and strong they are. The viewing experience will immerse the viewer in the game and make them feel not only like they are there, but like they are playing the game themselves. Video games offer a good example of the ways in which the system looks to immerse viewers in the game. Consider the pocket-cam and its influence on poker viewing. The pocket-cam was incorporated into televised sports in the mid-90s, allowing viewers to see what cards the poker players were holding on each hand. The recent surge in the popularity of poker (e.g., no limit Texas Hold'em) started just after this time in the late-1990s to early 2000s. In this way, the viewing experience of sports can be affected in a similar fashion by enhancing the entertainment experience.

The software to control the camera location and selection features illustrated in FIGS. 8-11 can range from simple to complex. The software incorporates different scenarios and ways of looking at a game of play based on the input variables (position information). As the player(s) and ball in the game interact, the software can figure out a number of different ways to shift the vantage point of the viewer around the action. This can achieve perspectives that are similar to the way a sports video game looks as you play it. The options of how to implement the viewing experience can vary quite a bit once the position of the ball and the players are made known. The system is then able to select any which way to look at the event.

In addition to the ball and player position information, other gaming factors are constantly monitored variables and inputs to the system. These variables include the time on the clock, the score in the game, what down it is in American Football (i.e. 1st, 2nd, 3rd, or 4th), the yardage needed for a first down and line of scrimmage in American Football, and other important information related to the ongoing event. Data such as this can be tracked electronically based on player and ball position information. Also, production personnel can oversee the variables and make sure that the system is updating them correctly and adjusting them if need be. In American football team playbooks and corresponding formations are also monitored by the system based on the player and ball position information. In the article "Online Off-Season" by Eddie Matz in *ESPN The Magazine* issue of Jun. 29, 2009 at page 92 Matz describes Hudl Pro. Hudl Pro is a software application that allows NFL teams to store their playbooks electronically and make them available to their players online. Electronic playbooks of team formations will allow the system described herein to identify which playbook formations the team is lining up in before a play starts. Playbooks are categorized based on team formations, and the team formations have subsets of executable plays. As the play begins, the system can determine based on the playbook plays, player and ball position information which particular play is occurring. The predicted play may not be completely accurate as the game can happen randomly outside the context of known playbooks. However, electronic playbooks better help the system described herein to predict what is likely going to occur during the game before it happens.

Embodiments of the disclosure can provide for simultaneously recording multiple different viewing modes. For each viewing mode, the software selects different combinations of camera switching/selection, camera shots, and camera angles. The viewer is provided with the option of different viewing modes that would pull from different types of filming styles. The system may also include a number of film making methods of shooting various films into the different viewing modes. The viewer is able to select from different styles of viewing the game that may be influenced by different film shooting techniques.

There are various ways the system may incorporate different film making methods into the software used to record the game. Firstly, the way the system tracks and zooms around the action can vary. The system may track and zoom through different perspectives of different players and the way they are interacting as the game evolves. Secondly, the types of shots may differ. Wider shots or mid or medium shots or close shots may be used to capture the action. Also, the vantage point of the viewer can zoom in and out of different camera shot types as the game changes pace. Thirdly, the color and lighting used to display the game may differ. For instance, very color saturated views of the game may be desired to bring out the movie-like experience that may be seen in epic films such as The Lord of the Rings trilogy or 300. There are many different ways to merge film making techniques and styles with the software used to capture the sporting events. Additionally, the same goes for video games. There are numerous different styles and techniques that video games use to immerse the viewer in the game that could be applied to the system's software.

Finally, a delayed camera feed in the telecast of sporting events would allow many new filming options in terms of slow motion shots. Conditional circumstances for the input position information can be used to classify crucial moments in a sporting event such as when a player is diving into the end zone in a football game. This then, would allow for the system to cut into slow motion as the viewer's perspective tracked around the game. One mode features camera technology as described earlier. This kind of technology enables the invention to capture slow motion 360-degree rotation shots like what was seen in the movie The Matrix. Additionally, in sporting events like football, there is a lot of down time in between plays. In football, a delayed feed would have little effect on the live event and would allow for slow motion shots to be incorporated into the recorded game.

The following section provides some simple sample programming algorithms that can be used. The software uses a set of quantifiable conditional game scenarios on which to key different viewing methods that heighten the aesthetic appeal of the entertainment experience. Different game scenarios should be quantified in terms of location data of the ball and the players in the game.

As noted, a computer system can be interfaced with the camera outputs and video signals from the cameras and can be used to control camera selection and point of view. A user interface provided by a control program for the computer system provides user options for selection during coverage of the game or sporting event. This helps improve shot composition and provides more interesting coverage for viewers.

User Interface

Figure 20A:
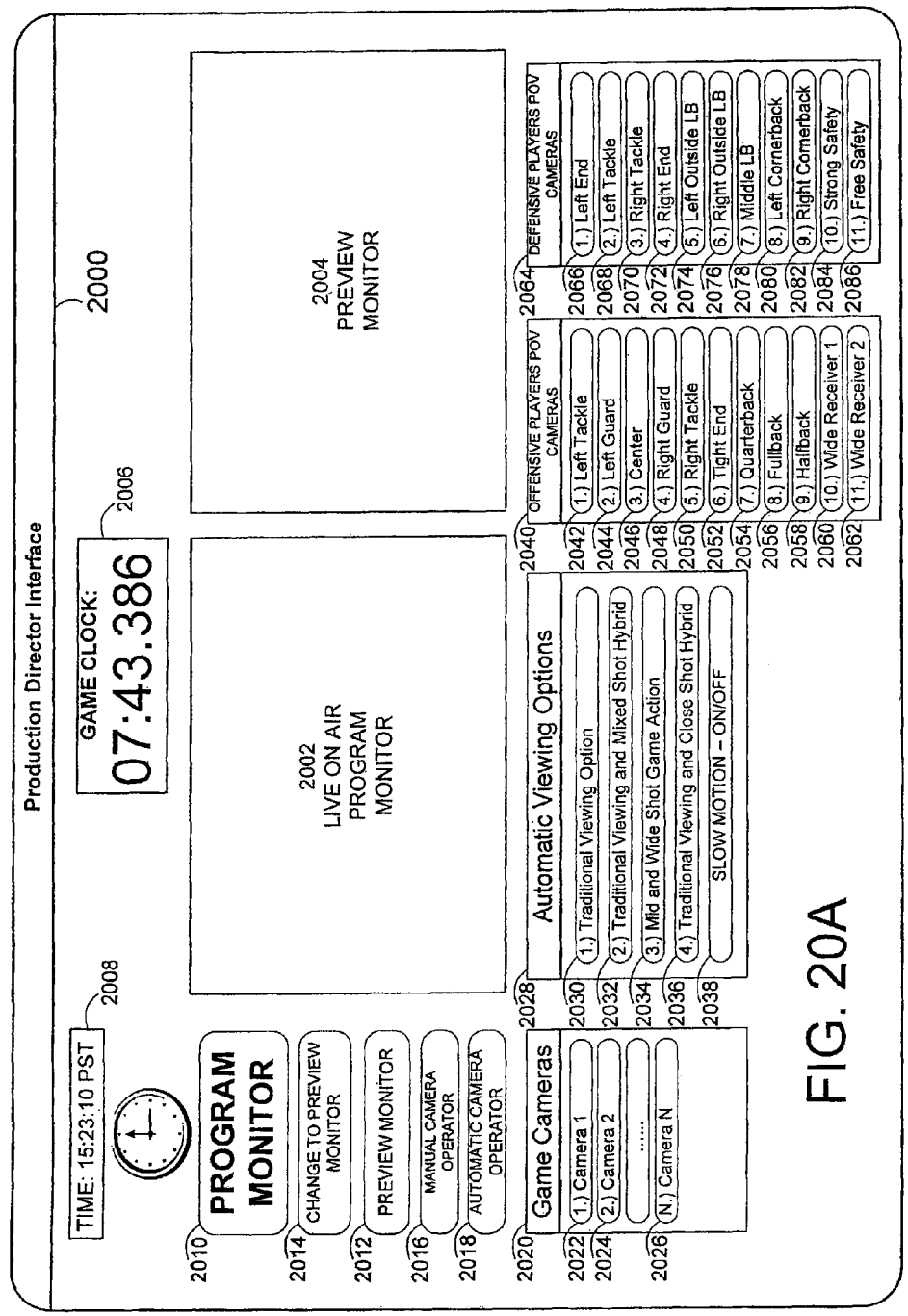
FIG. 20A shows a menu interface that provides the production director with different viewing options and camera switching controls in accordance with the disclosure.

There are two main types user interface that the system described herein uses to interact with its users. The first type of interface allows the production director to interact with the automated camera selection. This first embodiment is used in a system that is broadcasting or transmitting one live on air camera output or video signal of the event to its viewing audience. This interface is shown in FIG. 20A in 2000. The game clock is shown in 2006. The time of day is shown in 2008. The live on air camera output or video signal is shown on the live on air program monitor 2002. The camera output or video signal that the director is likely going to switch to next is shown in 2004 on the preview monitor. The director interface 2000 will also have other monitors arranged around the production control area. The different monitors will display all of the different camera outputs that the system has available to select from. These cameras can be selected in 2020, which hands over control to the various game cameras.

In this first embodiment, the director first selects (provides user input) the screen he wants to change (2002 or 2004) and then selects the camera output to change it to. User input can come from a mouse, keyboard, touch screen, or other interfacing input system. So, if the director wants to change the live on air program monitor 2002 he first selects the program monitor 2010. Then the director selects the desired camera output or video signal, for example camera 1 of the game cameras 2022. The director can also select to change the preview monitor 2004. To change the preview monitor 2004, the director first selects the preview monitor 2012. Then the director selects the desired camera output or video signal, for example camera 1 of the game cameras 2022. The director can shuffle the video signal on the preview monitor 2004 to the live on air program monitor 2002. Once the director decides that he wants to transition the live on air program monitor 2002 from the selected camera output to a different camera output on the preview monitor 2004 he selects 2014 Change to Preview Monitor. There are certain cameras that can be configured to be both atomically and manually operated. These cameras can be switched to hand over control to allow a manual camera operator take control of the camera. This override is performed by first selecting 2016 Manual Camera Operator, and then selecting the appropriate camera. For instance, camera 1 of the game cameras 2022. The director can then also, select to re-automate one of the cameras that can dual function as both manually and automatically operated. To enable automated camera control, the director first selects Automatic Camera Operator 2018. Then the director selects the appropriate camera, for example camera 1 of the game cameras 2022.

There are a number of different camera outputs that the production director can select from. Also, there are a number of automated video signals that the production director can select to cut to. The production control area will have a number of monitors placed around it. One or more camera outputs or video signals can be displayed on a particular monitor. The director interface will then be able to show all of the different camera outputs on all of the different monitors. All of the game cameras are available to the production director in 2020, where the director can select any one of the cameras used to cover the event. The game cameras include the automatically controlled cameras that create the automated camera output or video signals. The game cameras are shown in camera 1 2022, camera 2 2024, . . . , and camera n 2026, where n is some number 3 or greater. Many of these game cameras automatically track the ongoing event action based on the player and ball position information. Pan-tilt-zoom cameras are able to change their pan, tilt, zoom, and focus functions to follow the ongoing event. In this way the system allows the director to manually select which camera output he wants.

The production director can also select different Automatic Viewing Options 2028. The first automatic option is the Traditional Viewing Option 2030. The next three viewing options are part of the automatic mixed viewing option. The first is the Traditional Viewing and Mixed Shot Hybrid 2032. The second is Mid and Wide Shot Game Action 2034. The third is Traditional Viewing and Close Shot Hybrid 2036. The director then also has the option to turn the slow motion on or off by selecting Slow Motion On/Off 2038. The automated camera outputs constantly change based on the position information. So, if the director wants to select a particular camera output, he needs to select one of the game cameras 2020 as mentioned before. When the director selects one of the Automatic Viewing Options 2028, he hands over camera changing control to the automated system as described herein.

There are also POV cameras that show the perspective of different players on the field. The POV cameras have been described previously in the sections PLAYER MOUNTED CAMERAS and PANORAMIC VIEWING FROM ONE VIEWPOINT. The POV cameras allow the director to switch to viewpoints that the players are seeing as they play the game. The director can select any one of the Offensive Players POV cameras 2040. The director can select 2042 left tackle, 2044 left guard, 2046 center, 2048 right guard, 2050 right tackle, 2052 tight end, 2054 quarterback, 2056 fullback, 2058 halfback, 2060 wide receiver 1, and 2062 wide receiver 2. The director can also select different Defensive Players POV cameras 2064. The director can select 2066 left end, 2068 left tackle, 2070 right tackle, 2072 right end, 2074 left outside linebacker, 2076 right outside linebacker, 2078 middle linebacker, 2080 left cornerback, 2082 right cornerback, 2084 strong safety, and 2086 free safety.

The production director interface can be adapted to monitor multiple live transmitted camera outputs. In this embodiment the director will have to monitor more than one televised camera output or video signal at the same time. Since this is very difficult, it is likely that multiple directors will monitor the different live transmitted camera outputs or video signals. The transmission of multiple live camera outputs allows the end user at an end user viewing system at home to manually select which viewing mode they wish to see.

The second type of user interface allows an end user at home to manually select from multiple live transmitted camera outputs or video signals. This interface works in much the same way a television viewer changes from one channel to another on the television set. The distinguishable difference is that the viewer is able to use an interface that allows them to navigate through game viewing options that are organized in a particular fashion as described herein. User input can come from a remote control, mouse, keyboard, touch screen, or other interfacing input system. First, different camera outputs or video signals are transmitted to the end viewer's viewing system. Transmission is the act of sending a signal. The camera output signals can be sent over a transmission line, streamed over the internet, or broadcast in the air as a television signal. The television signal is usually sent with an antenna in the form of propagating electromagnetic signals such as radio waves and microwaves. The camera output signals can be sent over many different types of transmission media to the end user. Transmission media includes coaxial cables, copper wire, microwave link, RF (Radio Frequency) link, satellite links, multicore cables, triax cables, fiber optic cables, and fiber optics. Transmission media can also take the form of waves (including, without limitation, radio, microwaves, acoustic, and/or light waves, such as those generated during radio-wave and infra-red data communications). The end user viewing system includes any type of video display.

The end user viewing system can come in the form of a television, computer monitor, LCD (liquid crystal display), DLP (digital light processing) display, CRT (cathode ray tube), plasma flat panel display, PDA (personal digital assistant), cell phone, or other video displaying device.

For viewing control, a end user then has four main viewing control options to select from:
(1) Traditional Viewing Option
(2) Manual Viewing Option
(3) Player Manual Viewing Option
(4) Mixed Viewing Option FIG. 20B displays a sample end user Menu interface 2088 that the viewer can use to select the different types of viewing options. A first option is Traditional Viewing Option 2090, a second option is Manual Viewing Option 2092, a third option is Player Manual Viewing Option 2094, and a fourth option is Mixed Viewing Option 2096. A final option 2098 allows the end user to exit the menu. It is noted that clever use of the cameras is used to simultaneously capture multiple viewing perspectives. Recall that each camera is computer controlled in terms of focus, zoom, pan, and tilt capabilities. Thus, for multiple viewing options to exist different viewing modes will need to borrow some shots from each other, and/or use other cameras that are not being used by the other viewing modes. In this way the multiple viewing modes can coexist by using different cameras and borrowing shots from each other when need be. The functionality of the different viewing modes is described further below.

The Traditional Viewing Option and different Mixed Viewing Options described below are applicable to both the director interface and the end user interface. There are many different ways in which different viewing options can be incorporated into the director interface and end user interface. In the director interface, there can be multiple production directors that oversee each of the different viewing options further described below. Also, there can be one production director who can select from the different viewing modes and compose a single live on air video signal or camera output. In addition to video information, audio information, graphics, record playback, and other elements that go into the production of the ongoing event need to have appropriate user interfaces. Those interfaces can be included in the production director interface described herein, or they can have separate interfaces for separate operators to use.

Traditional Viewing Option

The Traditional Viewing Option 2030 (director interface) and 2090 (end user interface) uses the traditional EWSs (Extremely Wide Shot) or VWSs (Very Wide Shot) with "birds-eye view" camera angles. The first four implementations in the section CAMERA CONTROL described the lower level of system complexity needed to implement this viewing option. The sections CAMERA PLACEMENT FOR SIMPLER TRADITIONAL IMPLEMENTATIONS and SIMPLER TRADITIONAL IMPLEMENTATION MICROPHONE PLACEMENT also described the types of discrete camera and microphone configurations that can be used to implement this viewing mode. This viewing option uses the system described herein to track around the game and show shots of the game that look similar to how the games are presently shot The Traditional Viewing Option incorporates the way sporting events are presently covered and filmed. The system uses the player and ball position information to identify the particular situations where the director has to make a decision in the production booth and manually select from one of the different camera shots. The camera shot selection decision then is built into the system's software and conditional logic based on the position information. So, each scenario a director would encounter is quantified in terms of ball and player position information inside software. Other factors that influence the decision are also constantly monitored variables and inputs to the system. These variables include the time on the clock, the score in the game, what down it is in American Football (i.e. 1st, 2nd, 3rd, or 4th), the yardage needed for a first down and line of scrimmage in American Football, and other important information related to the ongoing event.

The director's most important objective is to keep track of the ball movement and to follow the ball during a game. The director must also ensure that the viewer is aware of where the ball is at a given time. An example of this is in the sport of American Football, where the viewer must reestablish where they are in the field after a play, especially a play with a high yardage gain. The task of keeping track of ball movement is where the position information of the ball greatly simplifies following the ball. The robotically controlled feedback pan-tilt-zoom cameras are able to keep track of where the ball is moving. The event director's goals include capturing the viewer's interest, bringing out the emotion of the event, and covering the event clearly and understandably. Directors' usually make use of three types of camera coverage presently in sports. They use an action or game camera to show the wide shot or zoomed out vantage point of the event, the perspective that is most often used. The director also uses hero cameras that are closer to the field for close-ups following an entertaining display of athleticism. The third type of camera coverage used includes special assignment cameras that are set up at specific points around the event to capture anticipated action.

Different types of sports require the director to apply different rules or methods for covering the event. Individual sports differ from team sports in that much of the coverage will focus on the dominant player with tighter and closer shots of that player in between action shots. An example of this is in tennis and golf sports coverage where close up shots are used of the dominant player in between and during the game action. Continuous action sports also differ from stop-and-go sports in that there is no pause or break during the event gaming action. Continuous action sports include hockey and soccer. Stop-and-go sports include baseball and American Football. Basketball is both continuous action and a stop-and-go sport, as there are pauses for foul shots and timeouts. Continuous action sports require more preparation for rapid camera coverage, since there are no pauses are breaks in between coverage.

The directing emphasis during sporting events is usually on scoring. The camera coverage will follow the team on offense using them as the focal point of the production. As the pace of the game increases, the director will try to add to the emotional appeal of the event by using tighter closer shots with more radical angles and increase the intercutting between shots. This is another point of interest where the invention described herein is able to capture what a director typically wants to cover. The system described herein is able to rapidly cover an event with closer and tighter shots without loosing track of the ball or what is going on because it is able to predicatively change its camera coverage based on the position information. Presently in sports, as game action increases directors have to juggle keeping track of the events relationships and interactions while at the same time trying to capture tighter shots of the action that increase the emotional appeal of the coverage. The director has to tradeoff keeping track of the game for the tighter closer shots. The invention described herein can simultaneously accomplish both keeping track of the game's interactions and obtaining tight emotional shots of the game action. The position information allows for rapid panning, tilting, zooming, focusing, and camera switching such that both zoomed out perspectives and tighter close shots can be incorporated into a single shot.

An important factor for the coverage of sporting events is the viewer's orientation while following the ball's movement. The event director uses certain rules and makes sure to not disorient the viewer when following the ball and when cutting in between cameras. One basic rule is to never switch from one camera to another when critical action is taking place in the event arena. Changing camera perspective or respective field of view coverage at an important time in the game requires the audience to reestablish their relationship to the game at that critical moment. This can leave the viewer disoriented at a moment when the game can change.

There are three different types of gaming action that the director has to be aware of when considering how to cut in between different cameras within the coverage of an event. The first is horizontal game action which includes sports that move back and forth across the screen in a horizontal motion, such as basketball and American football. Camera switching for this type of action usually takes place from one side of the field or court. The director uses an imaginary axis or line that can be drawn down the length of the field or court splitting it in half. For basketball this line is drawn from backboard to backboard, and for American football this line is drawn from field goal to field goal. The director will then switch between cameras on one side only of the imaginary axis during a particular play or series of action. This rule of thumb exists so that the viewer will not become disoriented in between camera switching sequences. The second type of gaming action is vertical action where the ball moves vertically across the screen from the bottom to top. An example of vertical action game is tennis, where the viewer's perspective is from behind one of the tennis players on the baseline. In vertical action events the director wants to be sure to be able to capture the entirety of the ball's movement from the camera perspective being used. An example of this is when a golfer puts the ball towards the hole. Other vertical action games include golf, and the track and field events javelin, hammer, and shot-put. The third type of gaming action is circular action where motion takes place around a circular axis. Circular action sports include baseball, boxing, mixed martial arts, racing and wrestling. During circular action events the director usually sets up boundaries around the event and rotates around the event as the action moves around. The audience is not disoriented as easily during circular motion events.

Many of the directing techniques mentioned above come into play when sporting event coverage is put together. The directing decisions and shot selection choices are thought out well in advance of the event. *Television Sports Production Fourth Edition* written by Jim Owens includes some of the planning tools that are used to map out how an event should be captured prior to covering such an event. Pre-scripted shot lists (page 93), shot sheets (page 94), and story boards (page 95-96) describe how the director wishes to cover the event. Likewise, camera blocking notes (page 122-123) include a list of directions from the director that tell the camera operator when and where to direct the camera given what is going on in the game. These kinds of directions can be conditionally classified based on the player and ball position information. This can then tell the robotically controlled feedback cameras to change the respective field of view coverage in the same way a camera operator would cover the event today.

Traditional coverage of sporting events uses fewer cameras, as compared to more complex embodiments described herein. Thus, directors need to be careful when switching from one camera's respective field of view coverage to another camera's respective field of view coverage when the field of view coverage changes dramatically. This is so as to not disorient the viewer as to what is occurring during the event. One mode uses enough cameras so that more complicated embodiments mentioned later can bridge this switching gap by allowing the viewer to change perspective from one view to an entirely different view while filling in the transition with other cameras' perspectives. This makes the transition from one perspective of the event to the other seamless and not as disorienting as simply cutting to another spot in the event arena. This allows many of these traditional rules to be reconsidered. Furthermore, the position information of the ball and players allows these transitions to occur instantly and dynamically without loosing track of what is going on. This is because the camera switching is pre-established based on conditional scenarios according to the position information.

Post Production of ongoing events allows the event to be re-shown with more well thought out directing of the camera perspectives and in game action. Post production also allows editors to correct mistakes by cutting them out or by covering them with other material. During post production the video signal of the event can be embellished and augmented using visual effects, sound effects and music. Many of the post production techniques currently used for re-shown sporting events can be built into the live game using the position information of the ball and players along with the camera technology described herein.

Position information of the ball and players in an ongoing event can also queue up generating text and illustrated graphics, or be used in conjunction with it. The font director is presently responsible for loading text graphics. Text graphics appear at the bottom of the screen and contain information about the game. This information usually includes gaming scores, clock time, gaming specific information such as line of scrimmage, down number, and yards needed for a first down in American football, and other sports statistical data. A sport data interface allows automatically loading pre-existing information on the screen in the game, and manually inputting and loading information during the game. This interface can be used with the system described herein, or it can be incorporated into the director interface mentioned before.

Illustrated graphics are used by commentators to draw lines on the event during replays to show how the gaming plays or formations are interacting. Other illustrative graphics include virtual field of play lines or Augmented Realities, such as seen in the "yellow line" in American Football. More discussion of illustrative graphics is addressed later in the section AUGMENTED REALITIES.

Manual Viewing Option

The Manual Viewing Option 2092 makes use of the first and second methods used to implement the seventh step 1218 of FIG. 12. In this viewing option, 3D environments of the game are constructed using the 3D model of the event created in software, and the player CG avatars created using the player position information. The first method then uses the 3D event in software for broadcasting the event. The second method combines live video signal imagery with the 3D game occurring from inside software. This is accomplished as described before using two different techniques. The first attaches the video signal imagery to pre-existing 3D models. The second method uses image processing means such as triangulation to create real time 3D models, which are used to augment the pre-existing 3D models, and further map the video signal imagery to those models. One mode makes use of the first and simplest method to implement the seventh step 1218. In this way the 3D game in software is made available for viewers.

The stadium inside software then superimposes CG audiences around the event. The result is a 3D model that looks much the same way a video game appears at it is being played. However, the viewer is able to witness the movements and interactions of the live game itself. The viewer vantage point is able to track anywhere in the 3D environment and their 2D perspective is rendered in real-time. This allows the viewer to walk around anywhere in the 3D event environment. They can walk around the stands and choose which seat they want to sit in. The viewer may even want to walk down and around the field or track their perspective back out and around the event so that they can see the event from any 3D reference point in the 3D environment they desire. They will be able to walk around the stadium and choose where to sit. They will be able to walk around the field themselves, and maybe stop by the announcers' booth and sit down and listen to the conversation. This will be very similar to the way video games allow the player to walk around a 3D environment by looking through their 2D screen perspective. The manual viewing option will be a window into what it would be like to be at the event itself.

It is also possible to expand this feature to allow the viewer to view the CG environment from pre-selected view points based on the position information of the ball and players. However, real video signals from these angles are likely more exciting and appealing to view than CG imagery. Although, the option to add pre-selected view points based on position information as the rest of the viewing options do, is another option that the invention can accomplish.

Player Manual Viewing Option

Figure 21:
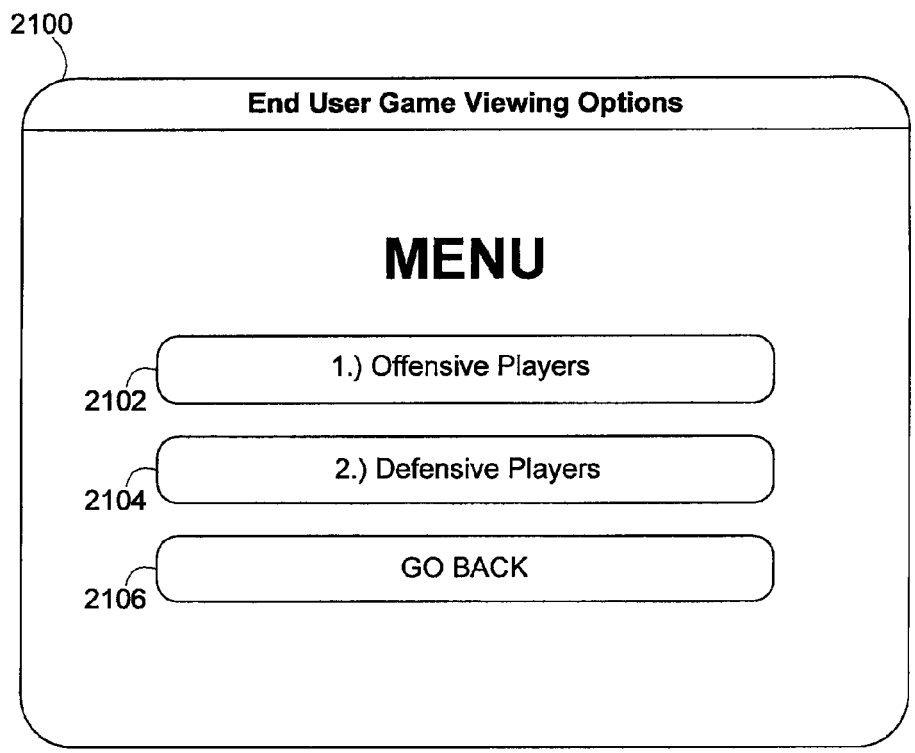
FIG. 21 shows another menu interface that provides the end user at an end user viewing system with different viewing options in accordance with the disclosure.
Figure 22:
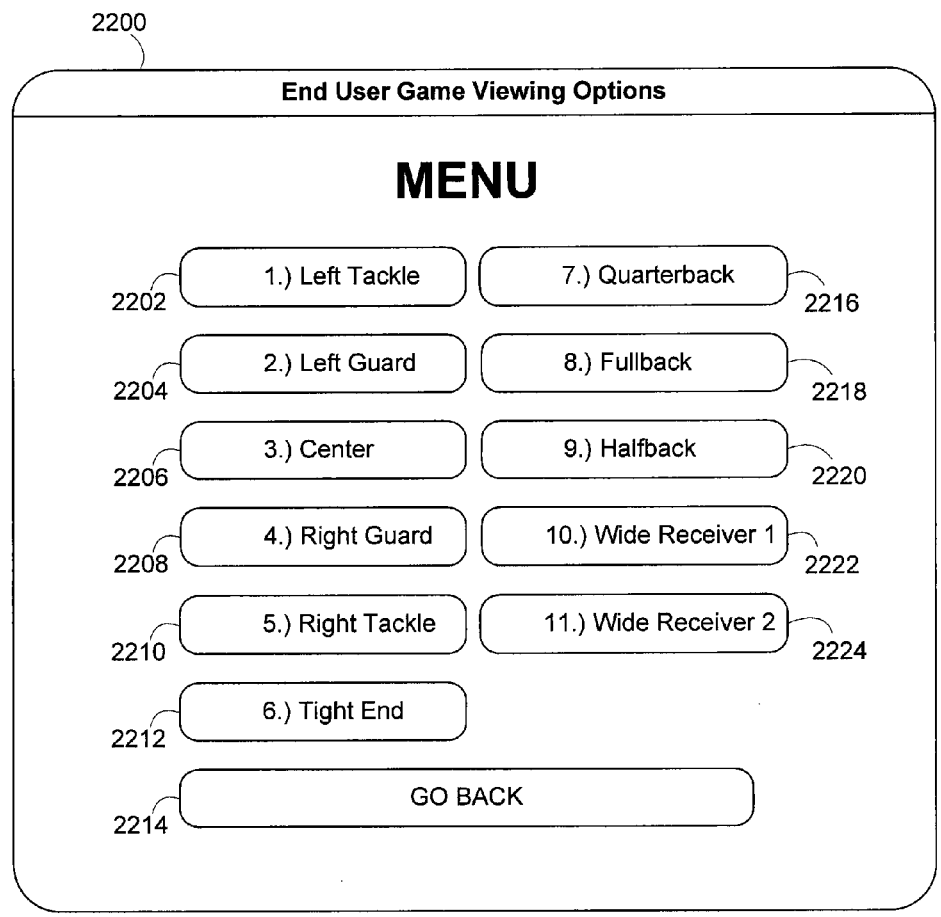
FIG. 22 shows yet another menu interface that provides the end user at an end user viewing system with different viewing options in accordance with the disclosure.
Figure 23:
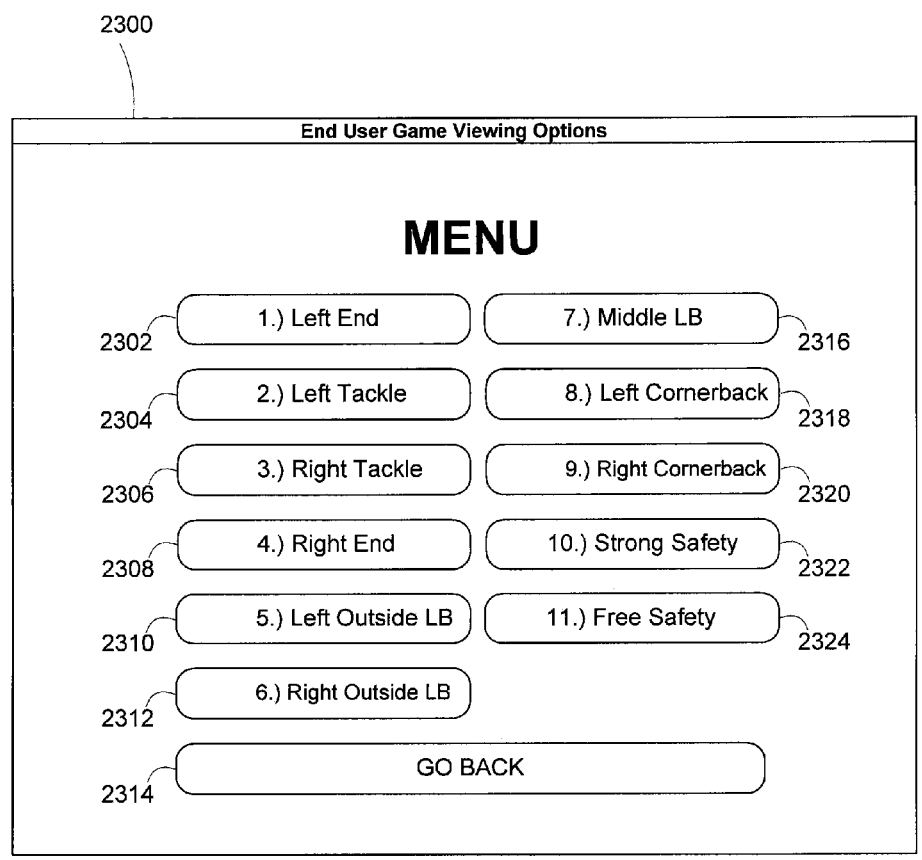
FIG. 23 shows yet another menu interface that provides the end user at an end user viewing system with different viewing options in accordance with the disclosure.

The Player Manual Viewing Option 2094 described here is for the sport of American football. Likewise, the same methodology can be applied to other sports such as soccer, and basketball. This allows the end user to transition through each of the POV shots of each player in the game one by one. Once the end user selects option 2094, they will next be referred to the end user game viewing options screen 2100 shown in FIG. 21. The end user then has the option of choosing either offensive players 2102 or defensive players 2104. A third option 2106 is to GO BACK or to return to the previous screen 2088. Upon selecting the offensive players (option 2102), the end user will be directed to the options on screen 2200 shown in FIG. 22. The end user then has the ability to select the POV view shot of any of the players: 2202 left tackle, 2204 left guard, 2206 center, 2208 right guard, 2210 right tackle, 2212 tight end, 2216 quarterback, 2218 fullback, 2220 halfback, 2222 wide receiver 1, and 2224 wide receiver 2. Option 2214 is the final option that then allows the end user to return to the previous screen 2100. Upon selecting the defensive players 2104, the end user will be directed to a menu 2300 shown in FIG. 23. The end user will be able to select from: 2302 left end, 2304 left tackle, 2306 right tackle, 2308 right end, 2310 left outside linebacker, 2312 right outside linebacker, 2316 middle linebacker, 2318 left cornerback, 2320 right cornerback, 2322 strong safety, and 2324 free safety. Option 2314 allows the end user to return to the previous screen 2100.

The Player Manual Viewing Option 2094 will make use of player mounted cameras and microphones. The user then will be able to select, one by one, the perspective of each of the athletes as they play the game. If 360 degree panoramic view cameras are incorporated into helmet and head-bands worn by players (as described in PANORAMIC VIEWING FROM ONE VIEWPOINT), these POV shots will be able to pan around what the player is seeing in 360 degrees. The zoom function within the player POV shot will not be available for manual usage to the end user. This is because there are numerous viewers and only one camera. However, the production director interface can allow for the director to use this zooming function. Also, the system will have to be careful with using the POV zooming function to construct shots for the other viewing modes. If such an action is done, then that particular manual viewing option will need to zoom as well.

Mixed Viewing Option

Figure 20B:
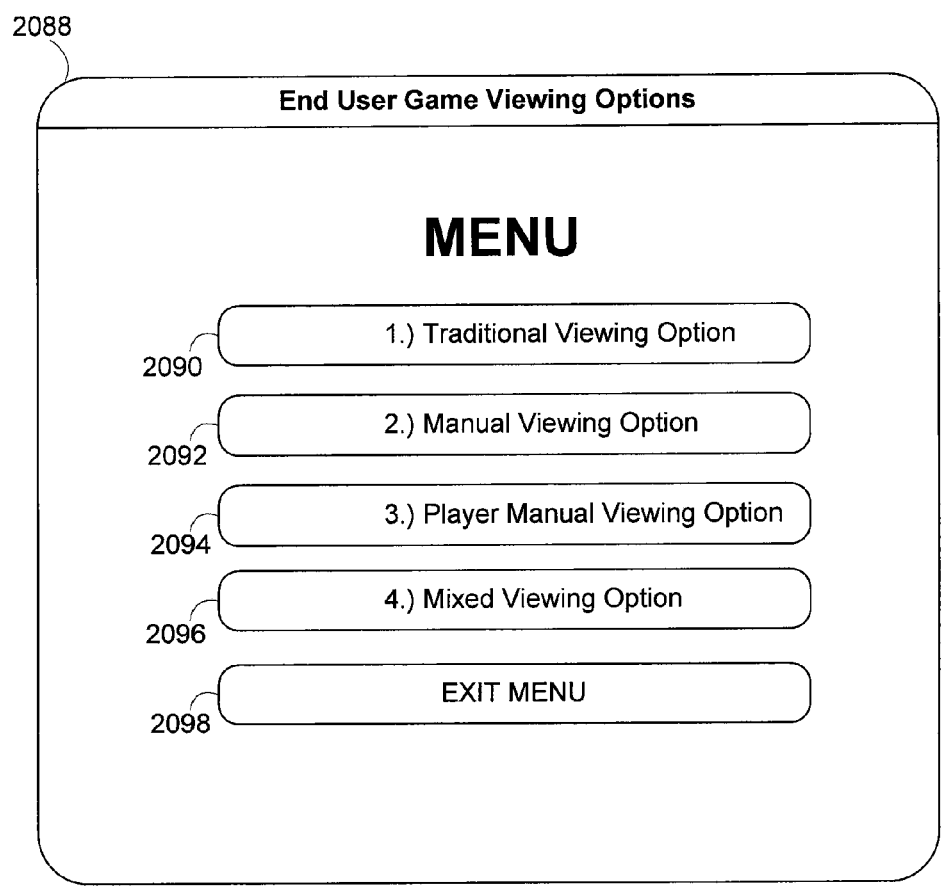
FIG. 20B shows a menu interface that provides the end user at an end user viewing system with different viewing options in accordance with the disclosure.
Figure 24:
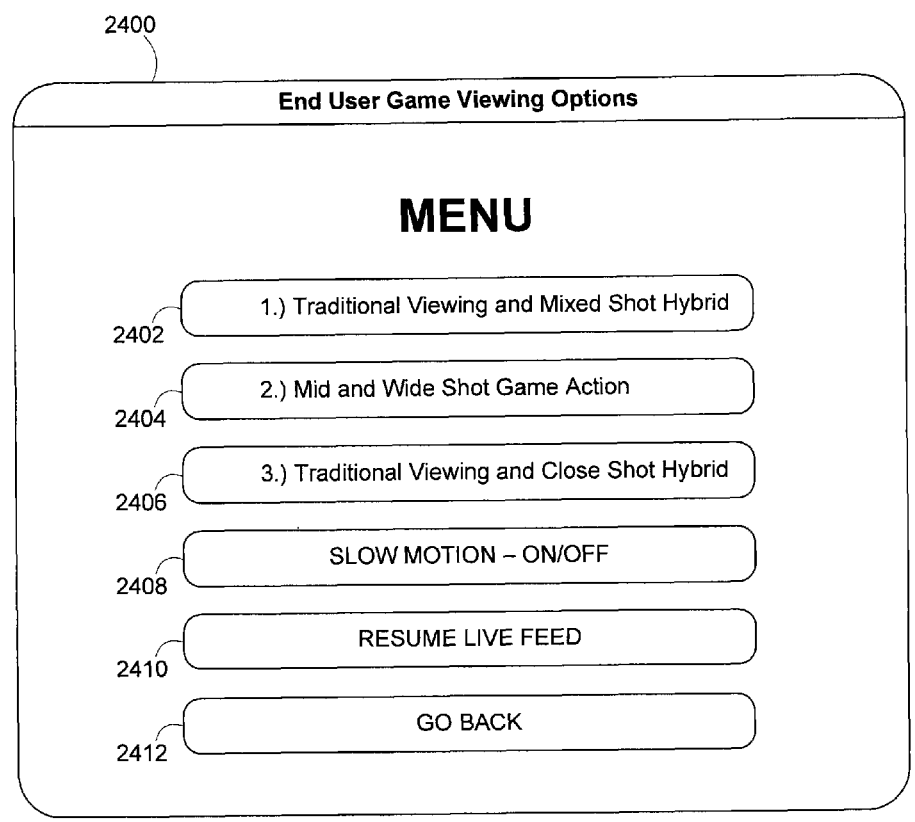
FIG. 24 shows still another menu interface that provides the end user at an end user viewing system with different viewing options in accordance with the disclosure.

The Mixed Viewing Option 2096 shown in FIG. 20, directs the end user to a menu 2400 shown in FIG. 24. These viewing options are where the software takes over the director's chair and picks from a variety of shots based on what is occurring in the game itself. The end user or production director is able to select from a variety of different styles that look at the game in different ways. The first viewing option is 2402 (end user interface) or 2032 (director interface) Traditional Viewing and Mid Shot Hybrid. The second viewing option is 2404 (end user interface) or 2034 (director interface) Mid and Wide Shot Game Action. The third viewing option is 2406 (end user interface) or 2036 (director interface) Traditional Viewing and Close Shot Hybrid. The option 2408 allows the end user to turn the slow motion scenario shots on or off. When slow motion scenarios are used, the camera feed is delayed by a small amount of time. This can be compensated for in the down time in between plays in the case of American football. Also, one mode can make use of hard-drives installed at the end user's television to record portions of the game in much the same way TiVo works. The end user then will be able to view the slow motion feed, and when they desire be able to fast forward or jump to the live feed. The option 2410 allows the end user to resume the live feed. Slow motion scenarios are described further below. The 2412 option allows the end user to return to the previous menu 2088 in FIG. 20B.

Traditional Viewing and Mid Shot Hybrid

Figure 25:
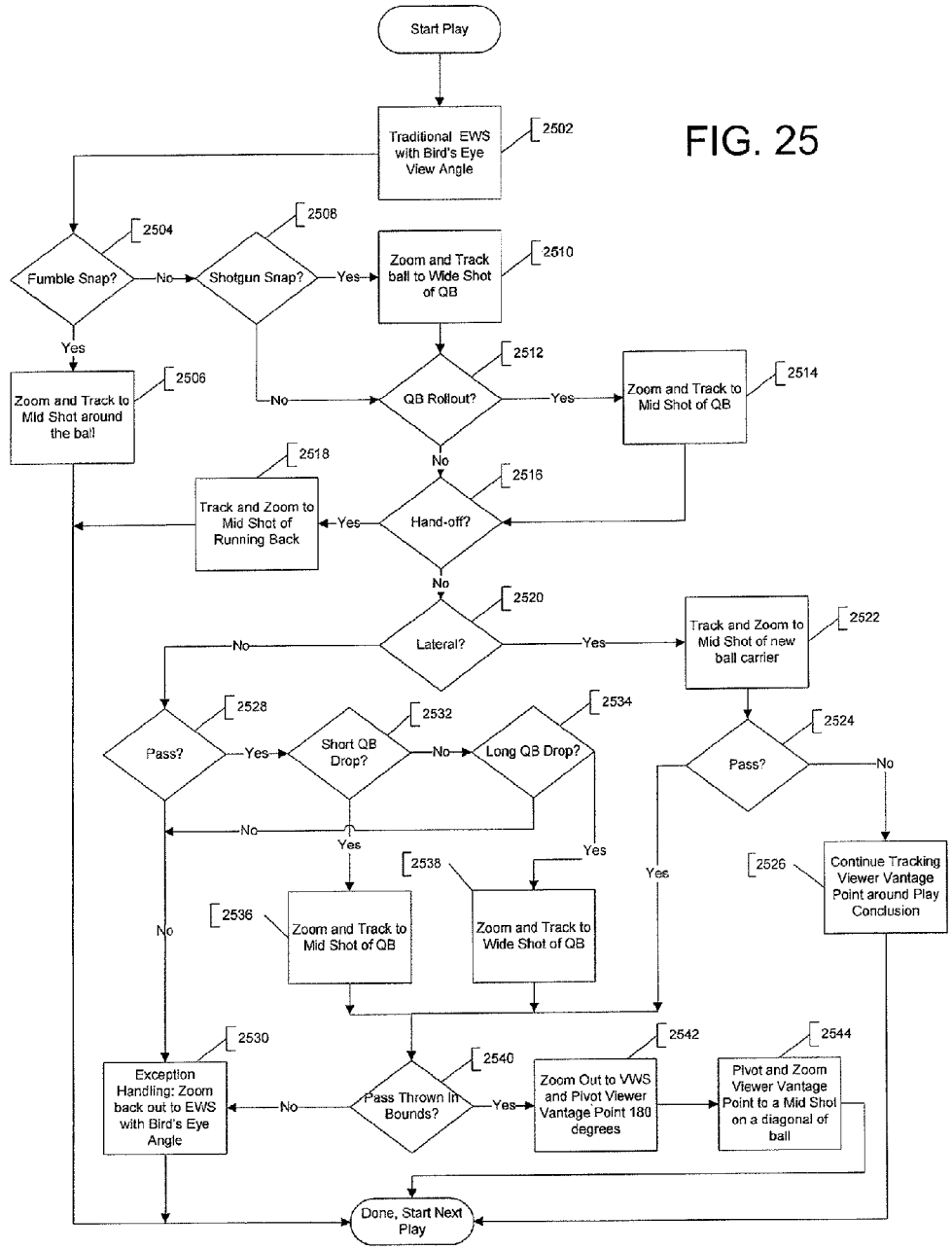
FIG. 25 is a flow chart of operations to provide the camera selection and viewpoint features described herein.

The Traditional Viewing and Mid Shot Hybrid viewing option 2402 (end user interface) or 2032 (director interface) is shown in FIGS. 20A and 24. FIG. 25 is a flow chart of operations provided by a computer program that operates to control camera selection and viewpoint in accordance with the disclosure. In particular, FIG. 25 shows processing to implement a Traditional Viewing and Mid Shot Hybrid Mixed Viewing Option 2402. The processing of FIG. 25 is especially applicable to camera control for the American football sporting event. Those skilled in the art, however, will understand how the basic teachings and principles apply to other games and sporting events.

Thus, techniques similar to those illustrated in FIG. 25 can be applied to other sports such as basketball and soccer. Furthermore, the processing can be implemented in different ways. For example, the illustrated processing can be adapted to view the game from the perspective of one side or the other, for example, a play can be viewed from the perspective of the defenders (as opposed to from the offense's perspective described herein). Also, the choice of Wide Shots versus Mid shots can vary. The decision of how to track the vantage point of the viewer into which particular shot, will depend on the preferences of a system designer. This processing aims to zoom into the action without deterring the viewer's knowledge of the rest of the players and the rest of the game's interactions.

Camera angle choices are omitted from the illustrated processing so as to limit the complexity of the illustration. In the discussion, "vantage point" refers to the cameras that are selected for the broadcast or production coverage. The processing can be implemented using eye-level, high angle, low angle, or slanted angle shots. Although, the preferred angle for the Mid and Wide shots used is typically between seven and twelve feet above the field of play (in the Z-axis direction). This height is also shown and discussed before in the section CAMERA MOUNTING APPARATUSES. This level seems to display the players' athletic gifts without deterring the viewer from what exactly is going on in the game at a given time. As well, this shot will most likely be taken from a diagonal from the action so as to show depth perception of the game's interactions. Most of the angles will be on a diagonal around 10 yards away (up or down the field) from the ball's position. Additionally, more complex implementations will provide conditions for determining how the software will choose the camera angles.

In FIG. 25, the processing starts with the Traditional EWS with a bird's eye view angle indicated by the first operation 2502. As the play starts, position information of the ball and the players will be sent to the system and analyzed by the software and scenarios will be determined. First off, the software will check at the second operation 2504 to see if the snap was fumbled. This can be indicated by the ball's position after the snap. If the position data from the ball and player equipment indicates that the ball travels up off of the field and then travels back downward onto the field at the beginning of the play, the system determines that a fumble has occurred. If such conditions are not met, then the system assumes that no fumble has occurred. If a fumble occurs, the system will zoom and track in from the EWS to a Mid Shot operation 2506 around the ball. The angle will be on a diagonal facing the offense, ten yards away from the ball and ten yards up the field from the offense's perspective (so, looking back down the field at the offense). This shot can also be chosen to be 10 yards removed from the line of scrimmage behind the offense and looking in the direction the offense is moving.

If no fumble occurred, the next conditional check at box 2508 of FIG. 25 is whether or not a shotgun snap was used. This can be determined at the beginning of the play based on location data of the quarterback and the ball. If position information from the quarterback and the ball indicates that the quarterback is a few yards or more removed from the ball, then the system assumes the play is a shotgun formation. If so, the system will operate such that the vantage point of the viewer will zoom and track from the EWS into a Wide Shot 2510 of the Quarterback once the ball is snapped. The angle will be on a diagonal facing the offense, ten yards away from the ball and ten yards up the field from the offense's perspective. This shot can also be chosen to be ten yards removed from the line of scrimmage behind the offense and looking in the direction the offense is moving.

Next, the system will check at box 2512 to see if the quarterback rolled out into the pocket or not. This can be determined simply by the position of the ball in conjunction with the position of the quarterback and whether or not the two are moving together behind the line of scrimmage. If so, the vantage point of the viewer will zoom and track in from the EWS to a Mid Shot 2514 of the Quarterback rolling out. Also, as the quarterback moves, the vantage point will track and move at approximately the same speed as the quarterback. The angle will be on a diagonal facing the offense, ten yards away from the ball and ten yards up the field from the offense's perspective.

The system then checks to see at box 2516 if the quarterback handed off the ball or not. This can be determined by position information of the ball, quarterback, and running back. If the position information indicates that the quarterback's position moves away from the ball and the ball moves with the running back, the system concludes that the ball was handed off. If so, the system operates so that the vantage point of the viewer will zoom and track from the EWS to a Mid Shot 2518 of the running back. The angle will be on a diagonal facing the offense, ten yards away from the ball and 10 yards up the field from the offense's perspective. The system may start to pan and zoom into a Wide Shot of the quarterback before he hands the ball off.

The system will then check at box 2520 to see whether or not a lateral was made. This scenario can be identified by the location of the ball and the quarterback. If the position information indicates that the ball travels away from the quarterback and stays behind the line of scrimmage, the system concludes that a lateral has been made. If this occurs, the system will operate so that the vantage point of the viewer will zoom and track in from the EWS to a Mid Shot 2522 of the new ball carrier. The angle will be on a diagonal facing the offense, ten yards away from the ball and ten yards up the field from the offense's perspective. Now, the system will check at box 2524 to see if the new ball carrier passes the ball or not. This can be identified by the ball's position with respect to the new ball carrier. If the position information indicates that the ball travels away from the new ball carrier, the system concludes that a pass has indeed occurred. If so, the system will proceed to judge if the pass is thrown in bounds at box 2540 (mentioned later), using the position information. If not, the system will continue to track the viewer vantage point around the ball until the play has concluded at 2526.

The software next checks to see whether or not a pass was thrown by the quarterback at 2528. As linebackers know well, a pass is usually indicated by either a short 2532 or long 2534 quarterback drop. The system concludes that a short quarterback drop has occurred when the position information indicates that a quarterback takes a few steps off the line of scrimmage, typically a few yards or so (one to three yards off the line). At box 2534, the system determines a long drop as being a drop of five yards or more. If none of the conditions described so far is met, the system moves into an Exception Handling Stage at box 2530. The vantage point of the viewer zooms and tracks back out to an EWS with a bird's eye view camera angle.

As noted, a short quarterback drop (2532) can be indicated by the position of the ball and the quarterback relative to the scrimmage line. If this data matches a short drop, then the system responds. If so, the vantage point of the viewer zooms and tracks to a Mid Shot 2536 of the quarterback. A long quarterback drop 2534 can be determined by the position of the ball and the quarterback and the aforementioned scenario description. If this occurs, the vantage point of the viewer will zoom and track to a Wide Shot of the quarterback 2538. For both the short 2532 and long 2534 drops, the camera angle will be on a diagonal facing the offense, ten yards away from the ball and ten yards up the field from the offense's perspective. This shot can also be chosen to be ten yards removed from the line of scrimmage behind the offense and looking in the direction the offense is moving.

Lastly, the system will determine whether or not the pass was thrown in bounds 2540. This can be determined by the position of the ball with respect to the playing field. Once the ball is thrown by the quarterback, the system can immediately determine the ball's trajectory or where the ball will travel before it occurs. That is, the system uses known extrapolation processing and flight tracking estimation techniques to determine where the ball will travel. Once the ball is thrown, the system operates so that the vantage point of the viewer will zoom and track out to a EWS if the ball is going out of bounds 2530.

If the system determines the thrown ball is staying in bounds, the system operates so that the vantage point of the viewer will zoom and track to a VWS and pivot around the ball as it travels into the air at box 2542. Before the quarterback throws the ball the viewer vantage point will be looking at the quarterback from the sideline diagonal. As the ball is thrown, the transition can rotate around from the sideline to where the ball is going to land. Alternatively, a larger pan sequence will pivot from the sideline back behind the quarterback and all the way around to where the ball is going to land. The pivot point of the viewer vantage point will be the 3-D location where the ball reaches the peak of its flight travel (zero acceleration). This trajectory point can be calculated by the system immediately after the ball leaves the quarterback's hand. The vantage point of the viewer will pivot 180-degrees immediately after the ball leaves the quarterback's hands and pivot at a speed so that it will finish its pivoting when the ball reaches the peak of its flight or zero acceleration. Also, the vantage point of the viewer will gradually zoom out so that it will be at the VWS when the ball reaches zero acceleration. The pivot will occur in the direction behind the quarterback. In this way, as the ball travels upward, the system operates to permit viewers to see down the field and view the rest of the players interacting. So, the first pivot 2542 begins at one sideline and ends on the other sideline.

As the ball begins its decent back down towards the field, as determined by the position information of the ball, the system selects the vantage point of the viewer to pivot 180-degrees (starting at one sideline and ending on another) to its original orientation before the ball was thrown. However, now the viewer vantage point is further down the field near where the ball comes down. So, the system will determine the 3D location where the ball will come down on the field before it occurs and use that for the pivot point to shift the viewer vantage perspective around during the final 180 degree rotation. As the ball travels downward, the vantage point of the viewer will zoom and track back into a Mid Shot 2544. The angle will be on a diagonal facing the offense, ten yards down the field from where the ball will land and ten yards up the field from the offense's perspective. This will allow the viewer to see the receiver/(s) and defense backs battle to catch the incoming ball. The vantage point of the viewer will then continue to track the movement of the ball until the play's conclusion.

Other exceptions to the processing may exist. Implementation of the system can include more complicated extensions upon the processing. For instance, it will be necessary to loop through different conditional scenarios if fumbles or other change of possession instances lead to more in game action. Additional Complexities to the processing are abundant and certain. This is where software design will turn this initial idea into a comprehensive entertainment package.

Mid and Wide Shot Game Action

Figure 26:
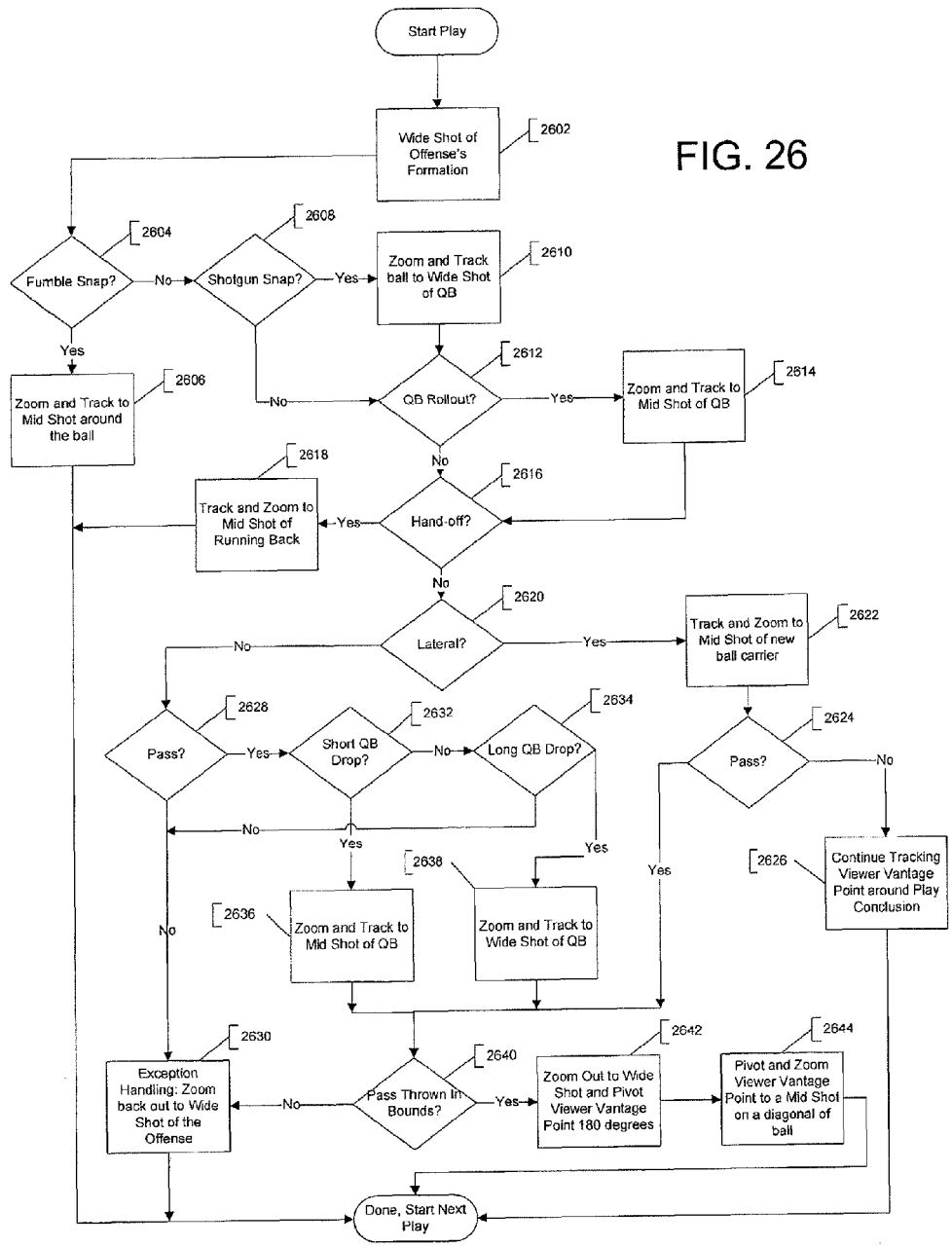
FIG. 26 is a flow chart of operations to provide the camera selection and viewpoint features described herein.

The Mid and Wide Shot Game Action viewing option 2404 (end user interface) or 2034 (director interface) is shown in FIGS. 20A and 24. FIG. 26 is a flow chart of operations provided by a computer program that operates to control camera selection and viewpoint in accordance with the disclosure. In particular, FIG. 26 shows processing to implement a Mid and Wide Shot Game Action Mixed Viewing Option. The processing of FIG. 26 is especially applicable to camera control for the American football sporting event. Similar processing can be applied to other sports such as Basketball and Soccer. The Mid Shot Game Action implementation proceeds in the same fashion as the Traditional Viewing and Mid Shot Hybrid. The difference lies in the zooming in and out of the in game action. This implementation zooms in and stays close to the action with Mid shots and Wide shots of the game without zooming back out to VWSs or EWSs. The decision making process proceeds in exactly the same manner.

Notable differences between the Traditional Viewing and Mid Shot Hybrid and the Mid and Wide Shot Game Action viewing options exist in operations 2602, 2630, and 2642 of FIG. 26. The first operation 2602 starts viewing the play from a Wide Shot closer to the action on a diagonal facing the offense, ten yards away from the ball and ten yards up the field from the offensive team's perspective. The conditional scenarios that proceed to change the viewer vantage point from the first stage 2602 to the stage 2630 occur in the same logical fashion as the corresponding stages in FIG. 25. The exception handling stage 2630 proceeds to operate the same as the operation 2530 in FIG. 25, but instead of zooming out to a EWS with "bird's eye" angle, the shot zooms out to a Wide Shot. The Wide Shot 2630 will track the ball and stay ten yards down the field from the offensive team's perspective until the play's conclusion. The operation of box 2642 will utilize the system in the same way logically as the operation 2542, but instead with the viewer vantage point zooming out to a Wide Shot of the game as opposed to the VWS operation at box 2542.

Traditional Viewing and Close Shot Hybrid

Figure 27:
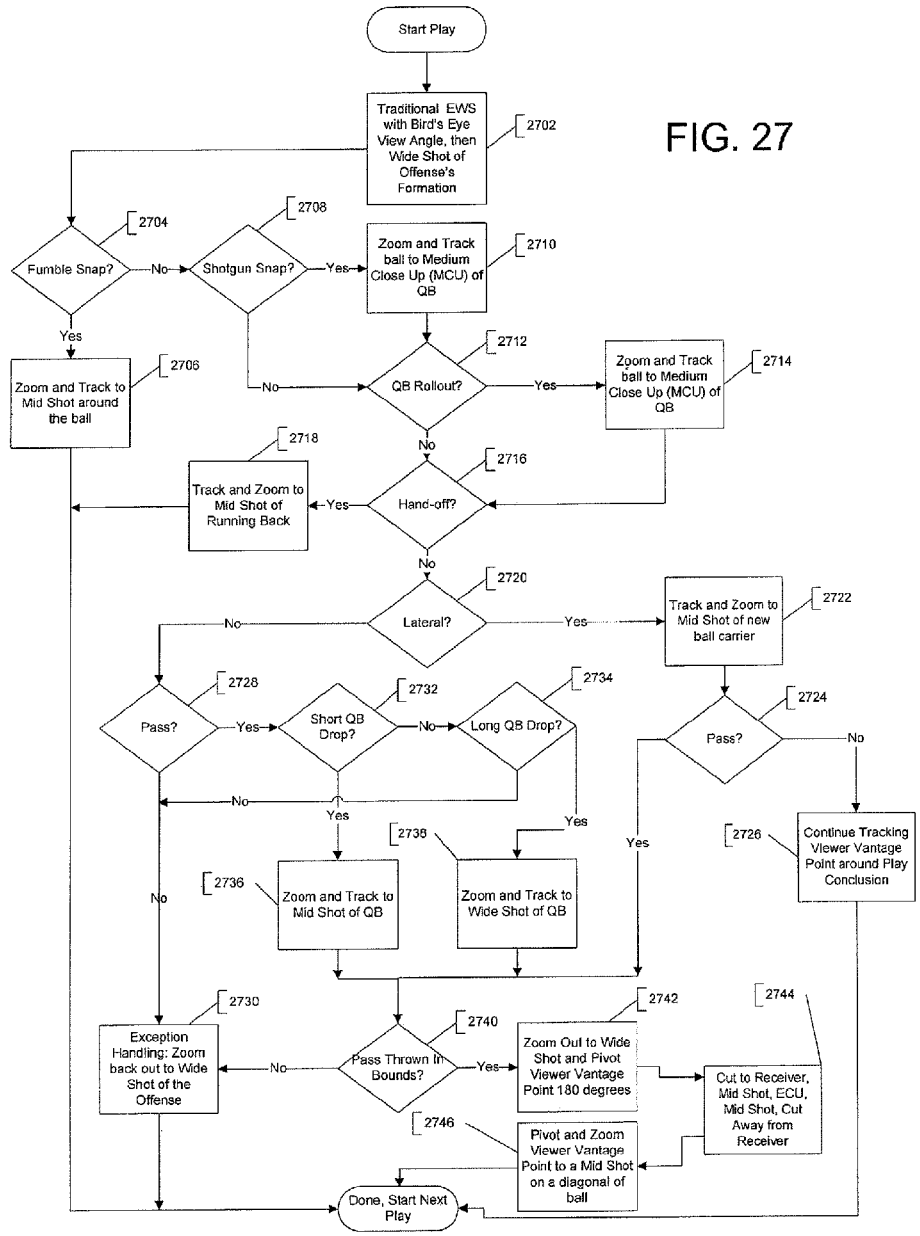
FIG. 27 is a flow chart of operations to provide the camera selection and viewpoint features described herein.

The Traditional Viewing and Close Shot Hybrid viewing option 2406 (end user interface) or 2036 (director interface) is shown in FIGS. 20A and 24. FIG. 27 is a flow chart of operations provided by a computer program that operates to control camera selection and viewpoint in accordance with the disclosure. In particular, FIG. 27 shows processing to implement the Traditional Viewing and Close Shot Hybrid Mixed Viewing Option. The processing of FIG. 27 is especially applicable to camera control for the American football sporting event. Similar processing can be applied to other sports such as Basketball and Soccer. The Traditional Viewing and Close Shot Hybrid implementation proceeds in a similar manner as the Traditional Viewing and Mid Shot Hybrid. The difference lies in the zooming in and out of the in game action. This implementation zooms in much closer than the Traditional Viewing and Mid Shot Hybrid. So, more of the shots will zoom into a MCU (Medium Close Up) shot or CU (Close up) shot. The decision making process proceeds in a very similar way. Distinguishable differences are mentioned below.

The operation 2702 will start initially with a Traditional EWS with a bird's eye view angle and then quickly zooms into a Wide Shot of the game. The position of the Wide Shot will be on a diagonal ten yards away from the ball and ten yards up the field from the offense's perspective. As opposed to the pan and zoom shot transition, the transition may make use of a cut-away to an in-between shot before cutting back to the Wide Shot. Such an intermittent shot might look like shots used in Any Given Sunday, where you see a shot looking from the ground up at the offensive line as it approaches the line of scrimmage and sets up for the play. Camera placement for such a shot would need to use a camera at or around the field level and looking up at the offensive line. Such a shot may make use of a camera built into the football or the cone cameras mentioned earlier. This shot is optional as it may be difficult to place a camera at a position to capture this shot.

The operation 2702 can also aim to take advantage of tension building Extreme Close Up (ECU) shots of players eyes. Such shots were used in Western movies such as Sergio Leone's The Good, The Bad, and The Ugly. These shots will come in the few seconds before the snap. The shots will cut away from the Wide Shot of the offense's formation to different player's eyes and then cut back to the Wide Shot of the offense's formation. Multiple ECU shots may be used before the snap of the ball. These shots will likely include shots of the quarterback's, linebackers' and other players' eyes that make movements before the play starts. Play audibles and play checking will be punctuated by these shots. If desired, delayed feeds will permit more of these shots in slow motion before the play starts.

Other operations 2704, 2706, 2708, and 2712 proceed the same way as corresponding operations 2504, 2506, 2508, and 2512 depicted in FIG. 25. The operations 2710 and 2714 differ from the FIG. 25 operations 2510 and 2514 in that the vantage point of the viewer will zoom into a Medium Close Up (MCU) shot of the quarterback. This closer shot will likely occur intermittently between a Medium or Wide shot of the quarterback, so that the viewer can still keep track of how the game is progressing. Transitions can occur through either cutting or panning and zooming. The operations 2710 and 2714 function the same way as in FIG. 25 operations 2510 and 2514 in terms of the algorithm flow and logic used.

The operations 2716, 2718, 2720, 2722, 2724, 2726, 2728, 2732, 2734, 2736, 2738, and 2740 proceed the same as operations 2516, 2518, 2520, 2522, 2524, 2526, 2528, 2532, 2534, 2536, 2538, and 2540. However, the FIG. 27 operations 2718 and 2722 may choose to punctuate the change of ball carrier action with a short zoom from the Mid Shot to a MCU of the new ball carrier and then zoom back out to the Mid Shot. This kind of shot would show the viewer that the ball has changed hands from the quarterback to another player (running back or other back). Likewise, operations 2736 and 2738 consist of scenarios where the quarterback is about to pass the ball and can also make use of the short MCU shot. A second or so after the quarterback pauses after dropping into the pocket he will then make his decision of what to do with the ball. The timing of the human reaction and thought processing of the quarterback can be calibrated as a short period after the quarterback settles down into the pocket. Therefore, the system will quickly zoom into a MCU shot of the quarterback shortly after he settles down into the pocket and then zoom back out the Mid Shot 2736 and the Wide Shot 2738. This intermittent zoom-in-and-out MCU shot will more effectively show the viewer the process of the quarterback's decision making.

The operation 2730 of FIG. 27 differs from the FIG. 25 operation 2530 in that the exception handling stage zooms out to a Wide Shot of the game as opposed to an EWS shot as at the operation 2530. The angle will be on a diagonal facing the offense, ten yards down the field from where the ball is located at all times. So, this shot will then be able to move up and down the field until the play's conclusion.

The operation 2742 functions the same as the operation 2542, but instead the FIG. 27 operation 2742 makes use of a Wide Shot as opposed to the VWS of the operation 2542. An extra stage of operation 2744 is added to the algorithm depicted in FIG. 27. This intermittent shot starts first with a Mid Shot of the intended receiver running down field. The intended receiver can be tracked by the system based on the know extrapolation point where the ball would land, should it fall to the field, and the extrapolation point of the nearest offensive receiver. The receivers will be traveling down the field at a certain velocities and their positions at a future time can be extrapolated within a certain probability. The time reference point then will be when the ball projectile hits the ground (based on the ball's trajectory). This time reference point will then predict where the receivers will be at that time, assuming their velocity continues to move in the same direction. These positions can then be compared to the previously mentioned ball position. Thus, the nearest receiver can be identified by the system. Exceptions exist when receivers run pass route's that are not in a straight line, such as a "slant", "button-hook", "hitch-and-go", and/or other routes. So, the operation 2742 can either cut to the Mid Shot of the intended receiver or zoom and pan into that shot. The Mid Shot will then be complemented with a reaction ECU shot of the receiver. The transition from the Mid Shot to the ECU can be accomplished either by cutting or by zooming into the receiver. The ECU shot will then cut or zoom out to the Mid Shot. Finally, the Mid Shot will either cut or zoom and pan into the operation 2746, which interacts identically as the operation 2544 mentioned earlier.

Slow Motion Conditional Situations

The slow motion option 2408 (end user interface) and 2038 (director interface) is shown in FIGS. 20A and 24. Slow motion shots can be characterized by critical moments in a sporting event where the game seems to change in favor of one team or the other. Once more, slow motion can be used to punctuate extreme displays of athleticism or top plays. This is often seen in replays of critical sporting event plays, slam dunks, or the like. A good example of these types of plays is featured daily on ESPN's Sports Center Top 10 show. Working slow motion into a live feed would be difficult and would require delaying the camera feed. In sporting events such as football, an implementation of such would be much easier as the game pauses in between downs. For sports like basketball, the feed would catch up during timeouts or other breaks. For soccer, the feed would lag the live event more and more as the game progressed until breaks in between periods.

The first scenario where the system would look to exploit advantages gained by slow motion shots is during critical moments of a sporting event. In a football game, the system would access if it was a fourth down opportunity and the team had decided not to punt the ball. This would be assessed by the down tracked by the system and the formation of the players given their position information. Also, the system would determine if a player was running towards a touchdown (using position information) and about to cross over the end zone (say within 5 yards or so). When critical moments such as these were identified by the system and software, the system would then look to find the exact moment to cut into slow motion (using the position information). If a player was running towards the end zone, the last couple yards might be shot in slow motion. Also, the vantage point of the viewer may zoom and track around the player as he runs toward the end zone in slow motion. Shots like this can be seen in the movie The Matrix when a character moves into slow motion and the vantage point tracks or pans around the character. It should be noted that such shots in a theatrical release are staged and carefully prepared and shot. In contrast, the present system operates in real time for camera selection and viewpoint selection.

Unusual player actions can be captured with the present system. For example, when Reggie Bush played for his college team (USC), he would often somersault into the end zone on occasions when he scored a touchdown. If filmed with the present system as described herein, the vantage point of the viewer would cut into slow motion and track around the field in a range of 90 to 180 degrees as he somersaulted into the end zone, pausing as he reached the peak height of his summersault (or characterized by zero acceleration). This type of shot would add to the entertainment value of the game at hand, especially considering the fact that the viewing of such would be during the first time the viewer ever saw it broadcasted live (or close to live).

The other scenario that can make use of slow motion shots includes moments where the ball and the players reach zero acceleration or the peak point of a projectile-like motion. In basketball, a player's position can be determined with respect to the basket. Also, the scenario where the player approaches the hoop with the ball and leaps off the floor can be identified by the position information. So, a slow motion shot can be characterized by this set of events to show the player's leaping ability and the vertical distance off the ground the player clears during the lay-up or dunk. Such a shot would want to use a camera that had a vantage point of around rim level so as to show the distance the player is away from the ground during the dunk. In football, when a ball is passed from the quarterback to a receiver the ball reaches zero acceleration during the peak height of its flight travel. This can be characterized by the position information that the system provides.

Figure 31A:
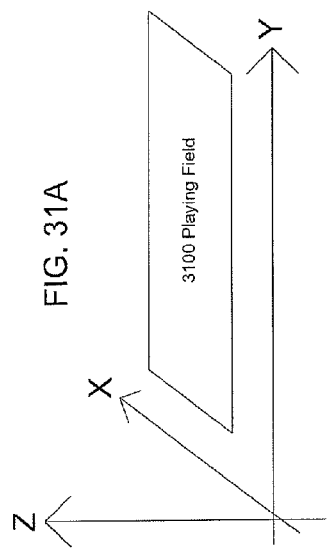
FIGS. 31A and 31B show a three dimensional depiction of changing the 2D viewer perspective around the three dimensional ongoing event in accordance with the disclosure.
Figure 31B:
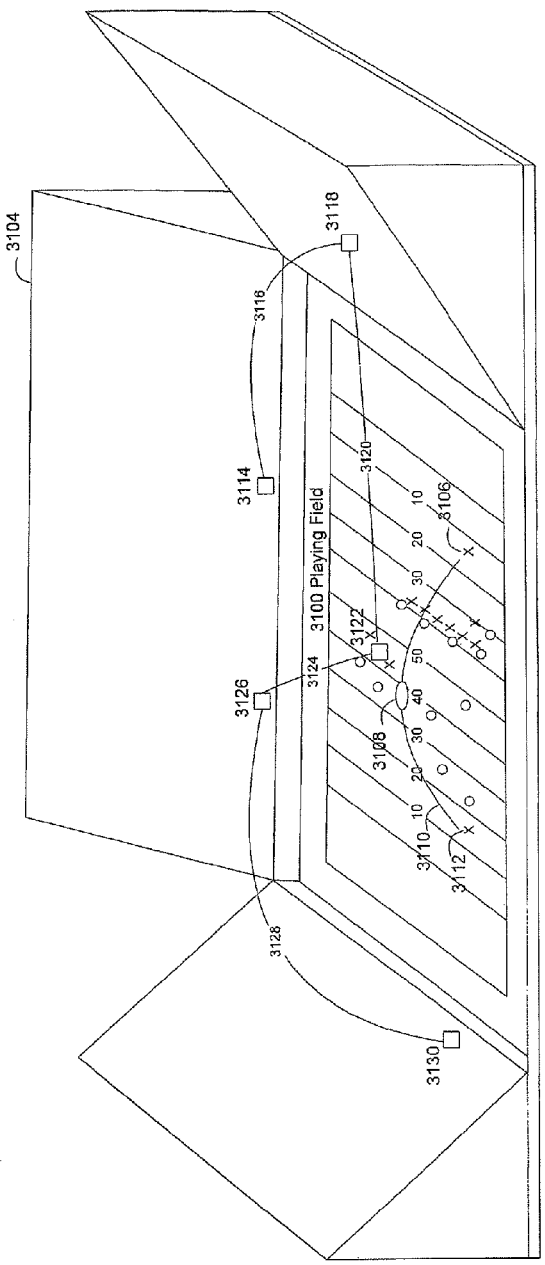

FIG. 31 illustrates an American football slow motion pass scenario. FIG. 31A shows the X-Y-Z axes relative to the playing field 3100. FIG. 31B shows the football playing field 3100 and an event stadium 3104. Players of an offensive team in the game are illustrated by X's and players of the defensive team in the game are marked by O's. A quarterback is identified by the 3106 X. The quarterback's pass trajectory is identified by a curved line 3110. The football's position at its peak height or zero acceleration point is marked by 3108. The receiver who is going to try and catch the ball is marked by the X 3112.

The play starts with the viewer vantage point on the sideline at the square 3114. The vantage point of the viewer at 3114 is a Mid shot looking down the field from a position around twelve feet in the air and about ten yards removed from behind the quarterback on a diagonal looking down the field. As the quarterback 3106 completes his drop into the pocket, the vantage point of the viewer pans and zooms out along curved path 3116. The viewer vantage point is then at square 3118 where the transition has zoomed out into a VWS, so that the viewer can see all of the players running down the field trying to get open for the pass. The shot zooms and tracks out to the VWS as the quarterback drops back. When the ball is passed by the quarterback, the system then identifies when the ball has left about 20% of its travel distance into the air. At this point the system operates so that the vantage point of the viewer zooms in from 3118 along a path 3120 to a spot around 3 feet removed from the football itself 3122. The system determines when the ball reaches zero acceleration and tracks into a close shot of the ball at the square 3122 as the ball traveled from 20% of its flight path to the set designated 50% of its flight path zero acceleration point shown at 3108. As the vantage point of the viewer tracks into the ball shot 3122, the system gradually transitions from normal viewing speed into slow motion. So, when the ball reaches zero acceleration the game is viewed in full-fledged slow motion. This would allow the viewer to see the slowly spinning and spiraling ball in the foreground and the players running around the field in the background as the viewer looked down on the field from this shot at 3122. Then as the ball travels back down toward the field from the 50% flight path point to a point about 80% flight path point of travel distance, the game begins to speed back up and track out of the closer shot of the football. The transition occurs along the path 3124 to the square 3126 and pans along the curve 3128 to the square 3130. This pivoting, zooming and tracking path from 3122 to 3130 occurs similarly to the zooming shot into 3122. The viewer vantage point moves from 3122 to 3130 such that the transition starts at the 50% flight path point and ends at the 80% flight path point. The transition back out of slow motion also occurs gradually so that at the 50% flight path point (3122 perspective), the viewer is watching the game in full-fledged slow motion; and at the 80% flight path point (3130 perspective), the viewer is watching the game at normal speed. The ending shot at 3130 is a Medium shot. The angle will be on a diagonal facing the offense, ten yards away from the ball and ten yards up the field from the offense's perspective (at around twelve feet above the field). This would then show the receiver and defense backs to be seen by the viewer battling for the incoming pass. Other crucial game moments characterized by zero acceleration not mentioned here could make use of slow motion shots.

Surgically Implantable, Plastic, and Nanotube Transceivers

Other positioning system options can make use of the aforementioned transceiver, accelerometer, transponder, infrared video-based tracking system, LIDAR, and/or RADAR system applications. Transceiver chip size limitations are at the forefront of the issues needed to be overcome to successfully implement the invention described here. Small transceiver chips, if designed in the conventional fashion, will need to have small antennas and thus need to send the positioning signals at relatively high frequencies.

One option for player sensors, is for the sensor to be surgically implanted at fixed positions in the human body. These sensors will need to abide with specified Electromagnetic SARs (Specific Absorption Rates) and be designed with the appropriate hermetic packaging. New advances in plastic CMOS processes have been made recently at the University of Illinois at Urbana-Champaign as per "Silicon Slivers for Flexible Circuits" by Willie D. Jones in the IEEE *Spectrum* magazine issue of March 2008 at page 15. These types of plastic chips are also described in "On the Way to Plastic Computation" by Luigi Fortuna and other authors in the IEEE *Circuits and Systems* magazine in volume 8, number 3 in the third quarter 2008 on pages 6-18. Such circuitry may very well be suited for use in embodiments described herein. Flexible chips made out of plastic would be able to work well as the ball sensor in that they would be able to flex and bend with the ball. Plastic chips could also be used to implement the player transceivers.

As mentioned in "Nanotube Radio" by K. Jensen, J. Weldon, H. Garcia, and A. Zettl in the American Chemical Society's *Nano Letters* Oct. 31, 2007 publication, the Center of Integrated Nanomechanical Systems, at the University of California at Berkeley recently successfully designed nanotube transceivers. Applications for the nanotube transceivers are reported to include controlled devices small enough to exist in the human bloodstream, or simply smaller, cheaper, and more efficient wireless devices such as cellular phones. Transceivers small enough to exist in the bloodstream would be very applicable to the player transceivers. Nanotube transceivers would be able to be injected into the bloodstream of players, and if enough transceivers were injected into the player's bloodstream, 3D position information of the players would then be available to the viewer vantage point selection system. The system would be able to see the players' bodies as opposed to fixed positions that indicate where the players are. From this data the system described herein would be able to track the real-time position and movements of the players' 3D bodies themselves. This would further empower the possible conditional scenarios that could be identified based on the player position information for the software and the viewer vantage point selection system described in the invention. Nanotube transceivers could also be used to implement the ball transceivers and position tracking.

Augmented Realities Applications

Augmented Realities or AR was described in "Is It Live Or Is It AR?" by Jay David Bolter and Blair Macintyre in the IEEE *Spectrum* magazine issue of August 2007 at pages 30-35. Augmented Realities are a newly emerging technology that is able to overlay images on what people see everyday. Some applications use a headset or wearable similar to a pair of glasses that uses lasers to project high definition images onto the retina. Other existing applications involving Augmented Realities include real-time augmentation of broadcast video. Real-time augmentation of broadcast video is seen in the "yellow-line" overlaid on football broadcasting video feeds. Also, virtual advertisements use a type of chroma-key technology to place advertisements that are not actually recorded onto the video signal.

The position information of the ball and player/(s) at an event allow the system described herein to overlay different information related to the televised game. For example, in American football players' names, jersey numbers, and other statistics can be displayed above them in the final video signal before a play is about to start. This is similar to American football video games where players' names and numbers are highlighted before the play starts. Likewise, other types of video imagery can be overlaid on the event, based on the position information of the ball and players in a game. The system must first identify the position of where the broadcast cameras are focused. Secondly, the system needs to determine and account for how each camera lens distorts the image. Thirdly, the players' position is identified and their velocity is identified if they are moving. Then overlaid image graphics are created based on the collected data, and the images are overlaid on each frame (i.e. 30 frames per second). The process needs to be sufficiently synchronized to effectively accomplish the effect.

Augmented Reality presentations can be displayed on the broadcast video signal or through wearables onto the viewer's retina itself. One embodiment makes use an Augmented Reality presentation where mobile AR devices are used featuring wearables for spectators at a live sporting event. The spectators in the stadium watching the game can wear glasses as described above. These can then project data and images about the game overlaid on what the spectator is viewing. Spectators can select from viewing options such as the players' names, jersey numbers, and statistics. This would be implemented similarly to how video games display player information before the start of a play in football games. They could also see transparent video feeds of instant replays of the event overlaid on their vision. Once more, during a play they could have all the viewing options described by the system above available to them and overlaid on what they are currently seeing. They could select from the traditional viewing option, manual POVs selection viewing options, and the mixed viewing options. The images would probably want to be projected more towards the peripheral of the spectator's vision, so as to compliment the actual event, as opposed to cover it up. As well as display Augmented Reality presentations through the use of wearables, Augmented Reality presentations can be used on the video signal seen at home by viewers on TV as well. Different imagery is overlaid on the video signal using the methods as described before.

System Prototype

Figure 32:
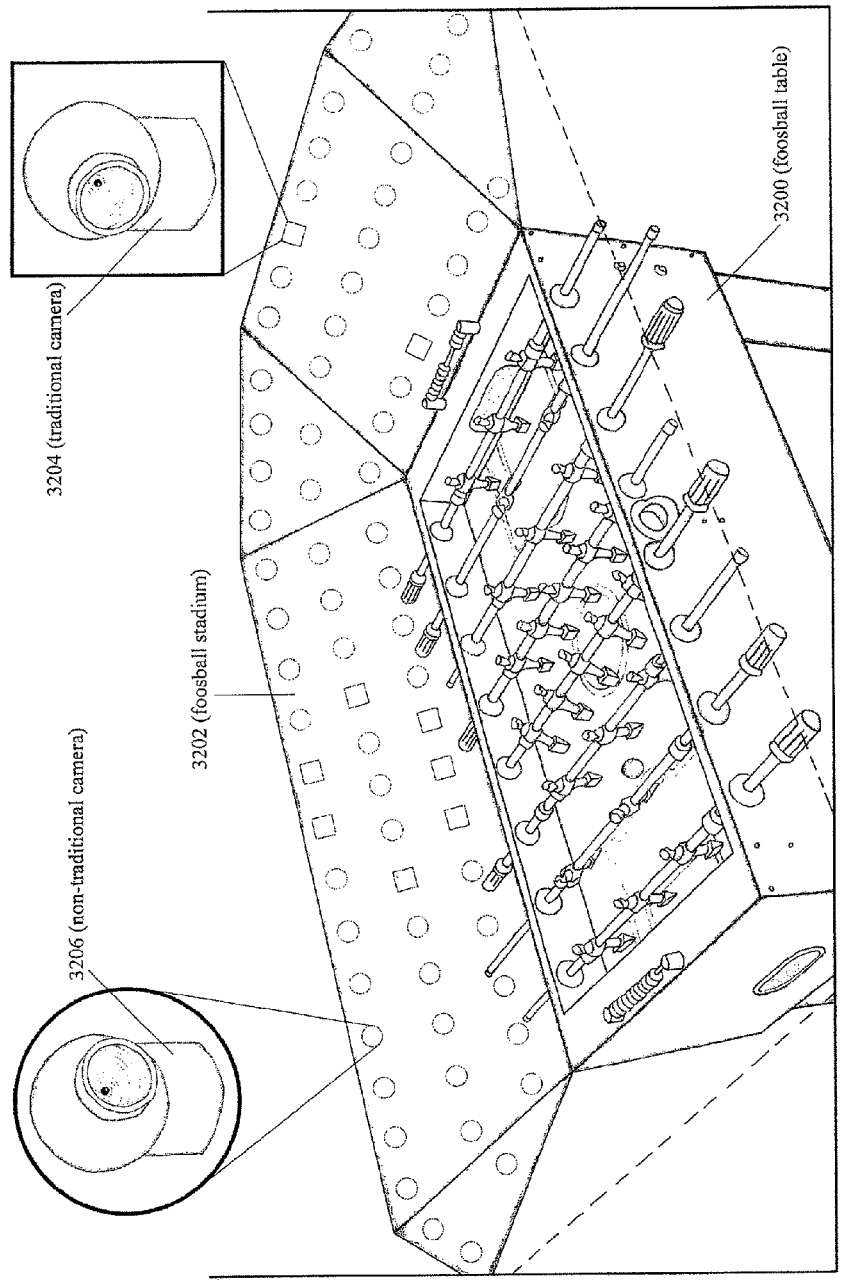
FIG. 32 shows a foosball table system prototype and corresponding illustration of camera placement in accordance with the disclosure.

The system described herein can be implemented in three main developmental stages. The first developmental stage is a system prototype. The second developmental stage is to automate traditional camera coverage techniques that are in practice today. The third developmental stage is to acquire new automated camera coverage not being used today because of the advantage gained by the ball and player position information. FIG. 32 illustrates the system prototype that uses a foosball table 3200. The foosball table 3200 is surrounded by a scaled down miniature version of a soccer stadium or arena 3202. The soccer stadium 3202 can be made out of different simple materials such as plywood or plastic. The soccer stadium 3202 can also be made of transparent materials such as Plexiglas so that one can look through the transparent stadium. The prototype uses small cameras that are placed around the event such as web cameras. Pan-tilt-zoom web cameras are used to robotically track ball position movement. The foosball position is constantly monitored by the system using position determination techniques as mentioned before. Such position determination techniques use position sensors such as transceivers, transponders, accelerometers, and/or RADAR positioning devices installed within the ball. Other positioning methods include infrared video-based tracking systems, digital signal processing (DSP) image processing techniques such as triangulation, LIDAR, and SONAR positioning techniques. The foosball players' positions are also identified. Position sensors are placed on the players to track those movements. Position sensor placement is usually targeted to track the movement of the base of the player that makes contact with the foosball during a game. This way, the system can predict when a player is about to make contact with the ball.

Camera placement around the event uses both traditional and non-traditional camera placement. Traditional camera placement is shown by the traditional cameras 3204 shown in FIG. 32. The traditional cameras 3204 are marked by the square shapes around the foosball stadium 3202. The traditional cameras 3204 are chosen at traditional positions used during soccer games in present day coverage of the sporting event. These camera position placement configurations can be found in *Television Sports Production Fourth Edition* written by Jim Owens on pages 216 and 217. In addition to the traditional camera placement, non-traditional cameras 3206 are placed around the foosball stadium 3202 to acquire additional camera perspectives and shots of the event. The non-traditional cameras 3206 are marked by circle shapes positioned around the foosball stadium 3202. In addition to the traditional cameras 3204 and non-traditional cameras 3206 shown in FIG. 32, other cameras can also be placed around the foosball table itself. This is done by cutting out holes in the side of the foosball table and installing cameras around the event in the cut out holes.

The prototype system then receives all of the camera outputs from the plurality of cameras at a processor. The system also receives ball and player position information at the processor. The system then decides based on the position information which camera output to select and display. Then the system receives updated ball and player information. The system changes the camera output from the selected camera output to a different camera output in response to the updated position information. The system can also robotically control some or all of the cameras by adjusting their pan, tilt, zoom, and focus functions.

System for Camera Output Selection

Figure 28:
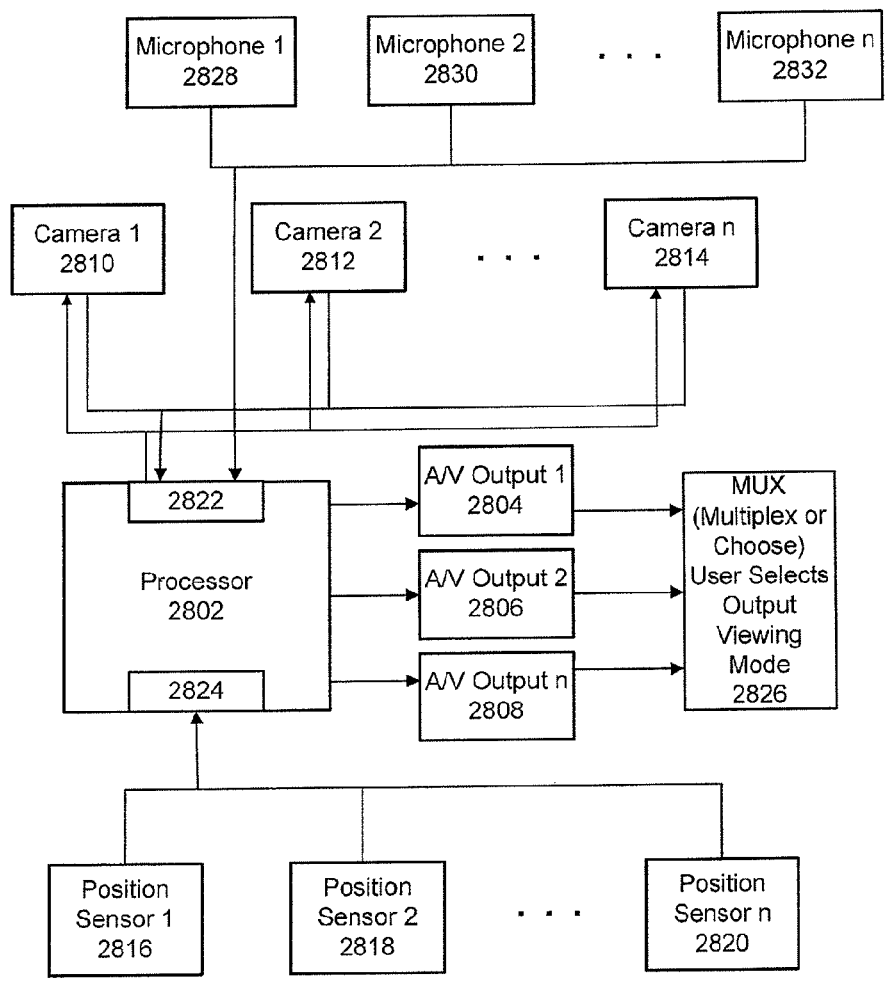
FIG. 28 is a block diagram of a system constructed in accordance with the disclosure.

FIG. 28 is a block diagram of a system 2800 constructed in accordance with the embodiments described above. The system 2800 includes a processor 2802 that produces n distinct audio/video outputs 2804, 2806, . . . , and 2808. Where n is some number 3 or greater. The user is able to then select from the different output viewing modes 2804, 2806, . . . , and 2808. The processor receives data corresponding to camera output including video signals or video feeds (including audio signals in some embodiments) or video feed identification data from multiple cameras 2810, 2812, 2814 designated as Camera 1, Camera 2, . . . , Camera n, respectively. Where n is some number 3 or greater. The Cameras 1-*n* can be stationary cameras, manually operated cameras (mounted or handheld), and remotely controlled or robotic cameras. In some embodiments the processor receives audio information from multiple microphones 2828, 2830, and 2832 designated as Microphone 1, Microphone 2, . . . , Microphone n, respectively. Where n is a number where n=2 or greater.

The processor also receives position information from position devices 2816, 2818, 2820 incorporated into balls, game equipment, clothing, apparel, and the like as described above, designated in FIG. 28 as Position Sensor 1, Position Sensor 2, . . . , Position Sensor n, respectively. Where n is some number where n=2 or greater. The processor 2802 may comprise a computer with central processor unit (CPU) and input/output facilities, memory, storage medium, and other resources sufficient to operate in accordance with the description herein. The processor 2802 can be any of various devices such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof. The memory or storage medium can include one or more memories for storing data, including read only memory (ROM), random access memory (RAM), magnetic RAM, core memory, magnetic disk storage mediums, optical storage mediums, flash memory devices and/or other machine readable mediums for storing information. The processor 2802 includes interfaces 2822 to receive camera output information from the cameras 2810, 2812 and 2814 and interfaces 2824 to receive position information from the sensors 2816, 2818 and 2820. The camera output may be video only, or the output may include video signal(s) or information, audio signal(s) or information, other data, or some combination of all.

The system processor 2802 receives the camera output from the various cameras 2810, 2812, 2814 either as real time feeds from the cameras or as identification information sufficient for the processor to select one camera or another as the camera whose output is selected as one of the system outputs 2804. With remotely controlled or robotic cameras, the cameras 2810, 2812, and 2814 are controlled by the processor 2802 through a feedback system. This feedback system allows the processor 2802 to receive and control the focus, pan, tilt, and zoom variables of the robotically controlled cameras to adjust them accordingly. Other cameras (e.g., handheld, or tripod mounted or fixed stationary cameras) can provide information identifying the pan, tilt, zoom settings as well as position and/or orientation to the system processor 2802. System Outputs 2806, . . . , 2808 operate in a similar manner. The cameras can be arranged about a playing area, stadium, arena, or the like so as to provide a 360-degree field of view coverage of the ongoing event. The cameras can also be placed at discrete positions around the event such that the arrangements are incomplete or non-seamless arrays of cameras positioned at non-uniform positions. The system output 2804 provides the point of view, viewing angle, and perspective as described above (respective field of view coverage). System outputs 2806, . . . , 2808 work in a similar fashion. The system output can be provided to broadcast equipment, recording equipment, and the like for viewing.

The system processor 2802 also receives position information from the position sensors 2816, 2818, 2820 to track the position of balls, players, equipment, and the like as described above. As described, the position information comprises real-time position information for equipment associated with the ongoing event, provided by devices such as transmitter/transceiver, RADAR detectable element, and accelerometer combinations that are embedded in equipment used in the ongoing event, such as position information-producing chips embedded into balls, playing equipment, apparel worn by persons participating in the event, and the like. The position information may be provided in absolute terms, such as latitude and longitude information in the form of GPS information, or the position information may be provided in accordance with an event-specific location system installed at the venue for the event such that position information of equipment and players participating in the event can be precisely determined as described above. For example, the position information must be sufficient to separately identify the positions of a football, quarterback, ball carrier, and other players in a football game relative to the playing field.

The system processor 2802 executes its operating program and utilizes the position information 2816, 2818, 2820 as described herein to select from among the camera views 2810, 2812, 2814 to provide the desired real time outputs 2804, 2806, 2808. As noted above, the processor also can control zoom (focal length), focus, pan and tilt capabilities of a particular camera and can switch from camera to camera so as to change the output viewing angle and point of view. The processor can also interpolate images in between cameras for more seamless transitions between cameras. The system performs such operations in accordance with the position information and other processing such as position estimation of balls, players, and equipment. In this way, the system 2800 provides improved coverage of games and sporting events, and can be used for improved rules enforcement during games and sporting events.

Figure 29:
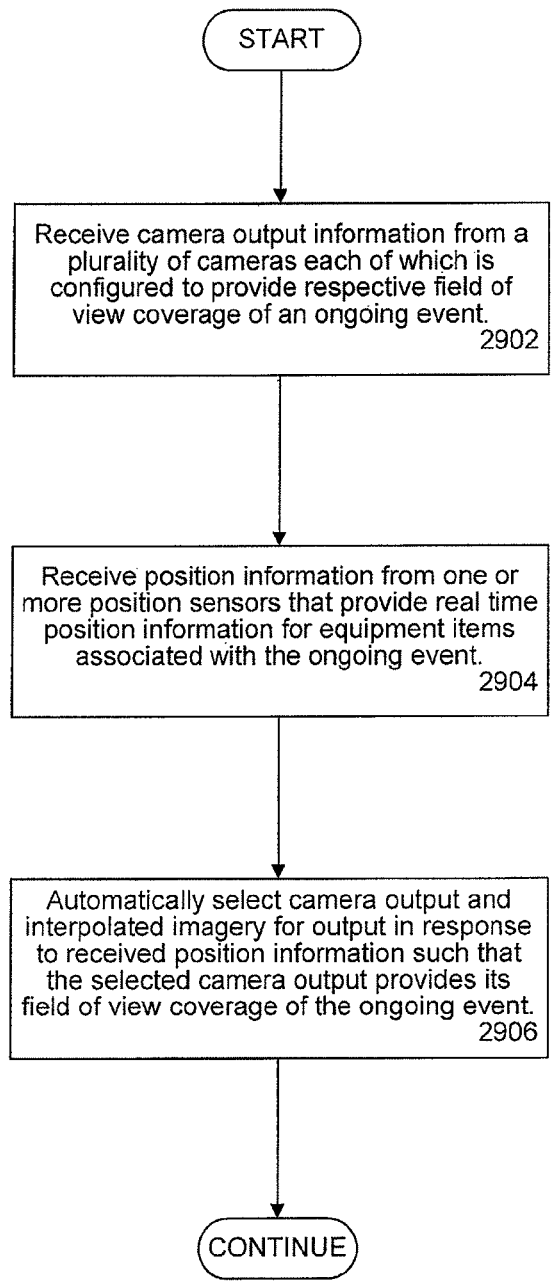
FIG. 29 is a flow chart of operations performed by the system of FIG. 28 to provide the camera selection and viewpoint features described herein.

FIG. 29 shows a flow chart of operations performed by the system of FIG. 28 to provide the camera selection and viewpoint features described herein. The first operation, represented by the flow chart box 2902, involves receiving camera output information from the plurality of cameras configured to provide a respective field of view coverage of an ongoing event. As noted above, the cameras may be arranged such that the fields of view from each camera output can be combined to provide a complete or seamless field of view coverage, or the cameras may be arranged so that the field of view from the output of each camera is independently utilized. Next, at box 2904, the system receives position information from one or more position sources that provide real time position information for equipment associated with the ongoing event. The position sources may comprise, for example, position sensors located on the equipment or may comprise interfaces that receive position data from sensors. The last operation, at box 2906, involves the system automatically selecting a camera output, and optionally combining output signals from two cameras using interpolation techniques to form interpolated imagery, from the plurality of cameras for output in response to the received position information such that the selected camera output provides its field of view coverage of the ongoing event (e.g., field of view coverage of a predetermined equipment of importance such as a ball or player). The selected camera output is intended for viewing, such as by a broadcast audience. The operations in boxes 2902, 2904 and 2906 are repeated until the event has concluded. That is, the position sensors provide real-time information and therefore updated position information is continuously received. During the repeated operations, the selections are made at box 2906 to switch to different camera output from different cameras, based on the updated position information received at box 2904, to provide variations in viewer perspective using the methods described above.

The system described herein can be integrated into a conventional manual system where the production director, camera operators, and various intermediaries manually select which camera output (feed) and viewpoint to use. In this mode, the camera output of the automated system described herein could be selected as one of the "cameras" that the production director wishes to show. Within the automated system itself, the system would select and switch from cameras with which the automated system is coupled. The automated system can be coupled with any or all of the manually operated cameras, fixed cameras, robotic cameras and mobile cameras (e.g., those on dollies, cranes, jibs, poles, rails, and/or cables, etc.) that are available. Likewise, the automated system can be coupled with any or all of the manually operated microphones, fixed microphones, robotic microphones and mobile microphones. Coupling the automated system with manually operated cameras and/or microphones would enable the automated system to default to manually operated cameras and/or microphones for cases such as the Exception Handling Stages at boxes 2530, 2630 and 2730 in FIGS. 25-27. In addition, this type of integration would allow the production director to choose when to use the automatic system.

Robotically-controlled feedback cameras can be designed to have dual functionality and operate as both automatically controlled and manually controlled by a camera operator. When the camera is automatically controlled, a processor keeps track of the camera's respective field of view and makes adjustments. This is accomplished by determining the pan, tilt, zoom, and focus settings of the camera at all times, such as through feedback from processor-controlled motors that adjust the pan, tilt, zoom, and focus settings or from other feedback mechanisms known to those skilled in the art. The processor can change the settings for pan, tilt, zoom, and focus. Thus, the camera keeps track of where it is looking and makes adjustments when it is automatically operated. Likewise, when such a camera is manually operated it also can keep track of where it is looking through feedback from motors that adjust the pan, tilt, zoom, and focus settings or other feedback mechanisms. Then, when the camera needs to resume automated operation it can re-calibrate quickly having known where it was looking during manual operation and resume automatic operation. Likewise, robotically-controlled feedback microphones can be designed to have dual functionality and operate as both automatically controlled and manually controlled by an operator.

In accordance with the system described herein, a number of features can be provided. These features include, for example, a method for determining the position and other related data of a ball in a game of play using a ball with a transceiver, RADAR detectable element, or circuitry of any kind built into it. A second feature is that of determining the acceleration and other related data of a ball in a game of play using a ball with an accelerometers or MEMs of any kind built into it. Another feature is that of determining the position and other related data of the players in a game of play using a transceiver, RADAR detectable element, or circuitry of any kind that are designed to fit/clip onto/embedded into/or put under equipment, apparel/clothing, socks, and/or shoes used by the players. Yet another feature is determining the acceleration and other related data of the players in a game of play using an accelerometers or MEMs of any kind that are designed to fit/clip onto/embedded into/or put under equipment, apparel/clothing, socks, and/or shoes used by the players. Equipment at the ongoing event includes the ball, puck, or other gaming projectile used during the event, a player(s), apparel/clothing, socks, shoes, and other equipment described in the sections BALL TRACKING AND POSITION INFORMATION and PLAYER POSITION SENSORS AND POSITION INFORMATION and in FIGS. 1-7.

Another feature provided comprises a system that is able to select video and audio data of a game of play. The system uses position information of a ball in a game and/or position information of the players as inputs. Methods for obtaining position information consist of circuitry and MEMs devices, namely transceivers, RADAR detectable elements, and accelerometers. The system can also use LIDAR, SONOR, infrared video-based tracking systems, DSP image processing techniques such as triangulation, and any other positioning methods. The system then decides, based on these inputs, which video camera to use, the type of shot, camera angle, audio signals, and/or other output data for viewing the game. The electrical system may or may not use software. Another provided feature is a technique in which a 3D environment of the live game is created inside software. The system can then choose vantage points from specific 3D locations from within this environment based on position information of the ball and the players in the game. The 3D location is then used to compose the shot from the camera arrays and interpolation techniques.

Yet another feature provided by the described embodiments is a system that is able to access gaming rules and affect officials' ability to make referee calls. The system uses position information of a ball in a game and/or position information of the players as inputs. The system then analyzes the data to produce outputs that aid officials in making officiating decisions. The electrical system may or may not use software. Video cameras are placed on a player in a game of play used to obtain an original camera angle of the game. A video camera is attached on top of or embedded into or placed under equipment, apparel, clothing, socks, shoes or the like used by players. The camera feed is then transmitted via a transceiver to a system outside of the game of play. An audio transducer such as a microphone placed on a player in a game of play used to obtain an original audio feed of the game in play. Microphones are attached on top of, or embedded into or placed under equipment, apparel, clothing, socks, shoes or the like used by players. The audio feed is then transmitted via a transceiver to a system outside of the game of play. Another feature is that of an Augmented Realities application that uses position information of the ball and/or the players in a game. Dollies, cranes, jibs, poles, rails, cables or robotics can be used to move cameras in the system.

The systems and methods described above may be implemented in a number of ways to include a processor that performs the operations described herein. One such implementation includes various electronic components. For example, the system described herein that includes the processor may also include various additional units or components, which may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

A system that performs the processing operations described herein can include hardware elements that can be electrically coupled via a system bus (or may otherwise be in communication, as appropriate). The hardware elements can include one or more central processor units (CPUs), including without limitation one or more general-purpose processors and/or one or more special-purpose processors (such as digital signal processing chips, graphics acceleration chips, and/or the like); one or more input devices, which can include, without limitation, a mouse, a keyboard, and/or the like; and one or more output devices, which can include without limitation a display device, a printer, and/or the like.

The procedures and operations of the system described herein are performed by the processor in response to the processor executing one or more sequences of one or more instructions (which might be incorporated into a processor operating system and/or other code, such as an application program) contained in working memory of the system. Such instructions may be read into the working memory from another machine-readable medium, such as one or more storage device(s). Merely by way of example, execution of the sequences of instructions contained in the working memory might cause the processor(s) to perform one or more procedures of the methods described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine readable medium" and "computer readable medium," as used herein, refer to any medium that participates in providing data that causes a machine to operate in a specific fashion. In an embodiment implemented using the computational system 2800, various machine-readable media might be involved in providing instructions/code to processor(s) 2802 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (2808 or 2810). Volatile media includes, without limitation, dynamic memory, such as the working memory 2818. Transmission media includes coaxial cables, copper wire, microwave link, RF (Radio Frequency) link, satellite links, multicore cables, triax cables, fiber optic cables, and fiber optics, including the wires that comprise the bus 2826, as well as the various components of the communication subsystem 2814 (and/or the media by which the communications subsystem 2814 provides communication with other devices). Hence, transmission media can also take the form of waves (including, without limitation, radio, microwaves, acoustic, and/or light waves, such as those generated during radio-wave and infra-red data communications).

The present invention has been described above in terms of presently preferred embodiments so that an understanding of the present invention can be conveyed. There are, however, many configurations for camera control systems not specifically described herein but with which the present invention is applicable. The present invention should therefore not be seen as limited to the particular embodiments described herein, but rather, it should be understood that the present invention has wide applicability with respect to camera control systems generally. All modifications, variations, or equivalent arrangements and implementations that are within the scope of the attached claims should therefore be considered within the scope of the invention.

I claim:

1. A method of computer controlled camera selection for viewing, the method comprising:
    receiving camera outputs at a processor from a plurality of cameras, each of which is configured to provide a respective camera output showing respective field of view coverage of an ongoing event;
    receiving position information at the processor, wherein the position information is associated with equipment at the ongoing event such that the received position information provides real time position information of the equipment;
    storing multiple event states into memory from which the data may be read by the processor;
    wherein each event state is programmed responsive to event information and intelligence data extracted from the ongoing event and/or unique logical combinations of event information and intelligence data extracted from the ongoing event in real time;
    wherein the event information and intelligence data includes event participant assignment execution outcome and results, event participant decision making outcome and results, and event participant interactions with other participants;
    wherein the event information and intelligence data are extracted in real time responsive to the equipment position information inputs, conditional logic responsive to the equipment position information inputs, and/or other logical combinations of equipment position information inputs;
    wherein the ongoing event has a current event state, where the current event state is identified in real time as one of the preprogrammed multiple event states;
    wherein the current event state is updated in real time and may involve a transition from a previous event state that is different from the current event state;
    wherein the current event state transition is responsive to changes in event information and intelligence data extracted from the received position information in real time;
    selecting a camera output from among the received plurality of camera outputs in response to the current event state such that the selected camera output provides its respective field of view coverage of the ongoing event and producing a processor signal comprising the selected camera output.

2. The method of claim 1, further comprising upon selecting the selected camera output in response to the current event state, combining the selected camera output with a camera output different from the selected camera output.

3. The method of claim 1, further comprising switching from outputting video frames of the selected camera output at a first rate to outputting video frames of the selected camera output at a second rate in response to the position information, at least one of the first rate or the second rate resulting in slow motion video.

4. The method of claim 1, further comprising combining audio information with the selected camera output, wherein the audio information is chosen independently of the position information.

5. The method of claim 1, further comprising combining audio information with the selected camera output, wherein the audio information is chosen in response to the position information.

6. The method of claim 1, wherein at least one camera of the plurality of cameras is configured to provide three dimensional (3D) field of view coverage of the ongoing event.

7. The method of claim 1, wherein at least two of the cameras are configured at multiple vertical distances above the ongoing event.

8. The method of claim 7, wherein the at least two of the cameras are spaced contiguously at the multiple vertical distances.

9. The method of claim 1, wherein at least two of the cameras are configured at multiple radial positions arranged radially around the ongoing event substantially in the same plane.

10. The method of claim 9, wherein the at least two of the cameras are spaced contiguously at the multiple radial positions.

11. The method of claim 1, wherein at least one camera from the plurality of cameras comprises a panoramic view camera.

12. The method of claim 1, further comprising controlling at least one function of at least one camera of the plurality of cameras in response to the position information, the at least one function including at least one of focus, zoom, pan, or tilt.

13. The method of claim 1, further comprising controlling at least one camera of the plurality of cameras to change location relative to the ongoing event in response to the position information.

14. The method of claim 1, further including receiving a manual selection of camera output from among the plurality of cameras that suspends the processor from selecting a camera output in response to the current event state.

15. The method of claim 14, further including receiving a selection for the processor to resume selecting a camera output in response to the current event state.

16. The method of claim 1, wherein the processor signal comprises camera outputs from more than one camera of the plurality of camera outputs, the method further comprising:
    receiving a manual selection of a single camera output from among the plurality of camera outputs of the processor signal;
    suspending selecting a camera output in response to the current event state.

17. The method of claim 1, wherein the processor signal comprises camera outputs from more than one camera of the plurality of camera outputs, the method further comprising:
    transmitting the processor signal to an end user viewing system for display at the end user viewing system, wherein the end user viewing system includes a user interface such that a manual selection input to the user interface identifies a single camera output from among the plurality of camera outputs of the transmitted processor signal for display at the end user viewing system.

18. The method of claim 1, wherein the selected camera output is combined with an augmented reality presentation.

19. The method of claim 1, wherein the equipment at the ongoing event includes at least one of a player, ball, puck, gaming projectile, clothing, apparel, jersey, shorts, pants, sox, shoes, hat, headband, sweatband, armband, helmet, shoulder pads, elbow pads, or shin guards.

20. The method of claim 1, wherein at least one of the plurality of cameras is mounted on a camera pole apparatus.

21. The method of claim 1, wherein one or more mirrors are used to produce at least one of the camera outputs.

22. The method of claim 1, wherein the position information includes rate of change of position information of the equipment.

23. The method of claim 1, wherein a computer generated three dimensional environment is created using the position information, wherein the position information is associated with equipment at the ongoing event.

24. The method of claim 1, wherein the selected camera output is a different camera output from a previously selected camera output that was selected according to the previous event state.

25. The method of claim 1, wherein the current event state is determined in response to the received position information and in accordance with a predetermined three-dimensional space occupied by the equipment.

26. The method of claim 25, wherein the equipment includes two or more sensors for transmission of position data, with which the three-dimensional positional space presently occupied by the equipment at the ongoing event may be determined in real time.

27. The method of claim 25, wherein the equipment includes two or more sensors for transmission of position data, with which the three-dimensional positional space presently occupied by the ball and/or other gaming projectile may be determined in real time.

28. The method of claim 1, wherein the received position information is transmitted from equipment at the ongoing event such that the received position information provides real time position information of the equipment from which the position information was transmitted.

29. The method of claim 28, wherein the position information is transmitted as a signal comprising at least one of RADAR, LIDAR, SONAR, or infrared signals.

30. A system for computer controlled camera selection for viewing, the system comprising:
a processor that is configured to receive camera outputs from a plurality of cameras, each of which is configured to provide a respective camera output showing respective field of view coverage of an ongoing event, and that is configured to receive position information, wherein the position information is associated with equipment at the ongoing event such that the received position information provides real time position information of the equipment, and is configured to store multiple event states into memory from which the data may be read by the processor;
wherein each event state is programmed responsive to event information and intelligence data extracted from the ongoing event and/or unique logical combinations of event information and intelligence data extracted from the ongoing event in real time;
wherein the event information and intelligence data includes event participant assignment execution outcome and results, event participant decision making outcome and results, and event participant interactions with other participants;
wherein the event information and intelligence data are extracted in real time responsive to the equipment position information inputs, conditional logic responsive to the equipment position information inputs, and/or other logical combinations of equipment position information inputs;
wherein the ongoing event has a current event state, where the current event state is identified in real time as one of the preprogrammed multiple event states;
wherein the current event state is updated in real time and may involve a transition from a previous event state that is different from the current event state;
wherein the current event state transition is responsive to changes in event information and intelligence data extracted from the received position information in real time;
wherein the processor selects a camera output from among the received plurality of camera outputs in response to the current event state such that the selected camera output provides its respective field of view coverage of the ongoing event and producing a processor signal comprising the selected camera output.

31. The system of claim 30, wherein the processor is further configured to, upon selecting the selected camera output in response to the current event state, combining the selected camera output with a camera output different from the selected camera output.

32. The system of claim 30, wherein the processor is further configured to switch from outputting video frames of the selected camera output at a first rate to outputting video frames of the selected camera output at a second rate in response to the position information, at least one of the first rate or the second rate resulting in slow motion video.

33. The system of claim 30, wherein the processor is further configured to combine audio information with the selected camera output, wherein the audio information is chosen independently of the position information.

34. The system of claim 30, wherein the processor is further configured to combine audio information with the selected camera output, wherein the audio information is chosen in response to the position information.

35. The system of claim 30, wherein at least one camera of the plurality of cameras is configured to provide three dimensional (3D) field of view coverage of the ongoing event.

36. The system of claim 30, wherein at least two of the cameras are configured at multiple vertical distances above the ongoing event.

37. The system of claim 36, wherein the at least two of the cameras are spaced contiguously at the multiple vertical distances.

38. The system of claim 30, wherein at least two of the cameras are configured at multiple radial positions arranged radially around the ongoing event substantially in the same plane.

39. The system of claim 38, wherein the at least two of the cameras are spaced contiguously at the multiple radial positions.

40. The system of claim 30, wherein at least one camera from the plurality of cameras comprises a panoramic view camera.

41. The system of claim 30, wherein the processor is further configured to control at least one function of at least one camera of the plurality of cameras in response to the position information, the at least one function including at least one of focus, zoom, pan, or tilt.

42. The system of claim 30, wherein the processor controls at least one camera of the plurality of cameras to change location relative to the ongoing event in response to the position information.

43. The system of claim 30, wherein the processor receives a manual selection of camera output from among the plurality of cameras that suspends the processor from selecting a camera output in response to the current event state.

44. The system of claim 43, further including receiving a selection for the processor to resume selecting a camera output in response to the current event state.

45. The system of claim 30, wherein the processor signal comprises a signal that includes camera outputs from more than one camera of the plurality of cameras, and the system further includes a user interface of the processor that receives a manual selection of camera output from among the plurality of camera outputs and in response suspends selecting a camera output in response to the current event state.

46. The system of claim 30, wherein the processor signal comprises a signal that includes camera outputs from more than one camera of the plurality of cameras, and the system further includes a user interface that receives a user selection from an end user viewing system, the user selection identifying a single camera output from among the plurality of camera outputs comprising the processor signal such that the identified single camera output is provided for viewing at the end user viewing system.

47. The system of claim 30, wherein the processor output is combined with an augmented reality presentation.

48. The system of claim 30, wherein the equipment at the ongoing event includes at least one of a player, ball, puck, gaming projectile, clothing, apparel, jersey, shorts, pants, sox, shoes, hat, headband, sweatband, armband, helmet, shoulder pads, elbow pads, or shin guards.

49. The system of claim 30, wherein at least one of the plurality of cameras is mounted on a camera pole apparatus.

50. The system of claim 30, wherein one or more mirrors are used to produce at least one of the camera outputs.

51. The system of claim 30, wherein the position information includes rate of change of position information of the equipment.

52. The system of claim 30, wherein a computer generated three dimensional environment is created using the position information, wherein the position information is associated with equipment at the ongoing event.

53. The system of claim 30, wherein the selected camera output is a different camera output from a previously selected camera output that was selected according to the previous event state.

54. The system of claim 30, wherein the current event state is determined in response to the received position information and in accordance with a predetermined three-dimensional space occupied by the equipment.

55. The system of claim 54, wherein the equipment includes two or more sensors for transmission of position data, with which the three-dimensional positional space presently occupied by the equipment at the ongoing event may be determined in real time.

56. The system of claim 54, wherein the equipment includes two or more sensors for transmission of position data, with which the three-dimensional positional space presently occupied by the ball and/or other gaming projectile may be determined in real time.

57. The system of claim 30, wherein the received position information is transmitted from equipment at the ongoing event such that the received position information provides real time position information of the equipment from which the position information was transmitted.

58. The system of claim 57, wherein the position information is transmitted as a signal comprising at least one of RADAR, LIDAR, SONAR, or infrared signals.

59. A computer program product embodied on a non-transitory computer-readable storage medium containing computer implementable instructions executable by a computer to perform a method comprising:
receiving camera outputs at a processor from a plurality of cameras, each of which is configured to provide a respective camera output showing respective field of view coverage of an ongoing event;
receiving position information at the processor, wherein the position information is associated with equipment at the ongoing event such that the received position information provides real time position information of the equipment;
storing multiple event states into memory from which the data may be read by the processor;
wherein each event state is programmed responsive to event information and intelligence data extracted from the ongoing event and/or unique logical combinations of event information and intelligence data extracted from the ongoing event in real time;
wherein the event information and intelligence data includes event participant assignment execution outcome and results, event participant decision making outcome and results, and event participant interactions with other participants;
wherein the event information and intelligence data are extracted in real time responsive to the equipment position information inputs, conditional logic responsive to the equipment position information inputs, and/or other logical combinations of equipment position information inputs;
wherein the ongoing event has a current event state, where the current event state is identified in real time as one of the preprogrammed multiple event states;
wherein the current event state is updated in real time and may involve a transition from a previous event state that is different from the current event state;
wherein the current event state transition is responsive to changes in event information and intelligence data extracted from the received position information in real time;
wherein the method performed by the computer further comprises selecting a camera output from among the received plurality of camera outputs in response to the current event state such that the selected camera output provides its respective field of view coverage of the ongoing event, and producing a processor signal comprising the selected camera output.

60. The computer program product of claim 59, the performed method further comprising upon selecting the selected camera output in response to the current event state, combining the selected camera output with a camera output different from the selected camera output.

61. The computer program product of claim 59, the performed method further comprising switching from outputting video frames of the selected camera output at a first rate to outputting video frames of the selected camera output at a second rate in response to the position information, at least one of the first rate or the second rate resulting in slow motion video.

62. The computer program product of claim 59, the performed method further comprising combining audio information with the selected camera output, wherein the audio information is chosen independently of the position information.

63. The computer program product of claim 59, the performed method further comprising combining audio information with the selected camera output, wherein the audio information is chosen in response to the position information.

64. The computer program product of claim 59, wherein at least one of the plurality of cameras is configured to provide three dimensional (3D) field of view coverage of the ongoing event.

65. The computer program product of claim 59, wherein at least two of the cameras are configured at multiple vertical distances above the ongoing event.

66. The computer program product of claim 65, wherein the at least two cameras are spaced contiguously at the multiple vertical distances.

67. The computer program product of claim 59, wherein at least two of the cameras are configured at multiple radial positions arranged radially around the ongoing event substantially in the same plane.

68. The computer program product of claim 67, wherein the at least two cameras are spaced contiguously at the multiple radial positions.

69. The computer program product of claim 59, wherein at least one camera from the plurality of cameras comprises a panoramic view camera.

70. The computer program product of claim 59, the performed method further comprising controlling at least one function of at least one camera of the plurality of cameras in response to the position information, the at least one function including at least one of focus, zoom, pan, or tilt.

71. The computer program product of claim 59, the performed method further comprising controlling at least one camera of the plurality of cameras to change location relative to the ongoing event in response to the position information.

72. The computer program product of claim 59, the performed method further including receiving a manual selection of camera output from among the plurality of cameras that suspends the processor from selecting a camera output in response to the current event state.

73. The computer program product of claim 72, the performed method further including receiving a selection for the processor to resume selecting a camera output in response to the current event state.

74. The computer program product of claim 59, wherein the processor signal comprises camera outputs from more than one camera of the plurality of camera outputs, the performed method further comprising:
receiving a manual selection of a single camera output from among the plurality of camera outputs of the processor signal;
suspending selecting a camera output in response to the current event state.

75. The computer program product of claim 59, wherein the processor signal comprises camera outputs from more than one camera of the plurality of camera outputs, the performed method further comprising:
transmitting the processor signal to an end user viewing system for display at the end user viewing system, wherein the end user viewing system includes a user interface such that a manual selection input to the user interface identifies a single camera output from among the plurality of camera outputs of the transmitted processor signal for display at the end user viewing system.

76. The computer program product of claim 59, wherein the processor output is combined with an augmented reality presentation.

77. The computer program product of claim 59, wherein the equipment at the ongoing event includes at least one of a player, ball, puck, gaming projectile, clothing, apparel, jersey, shorts, pants, sox, shoes, hat, headband, sweatband, armband, helmet, shoulder pads, elbow pads, or shin guards.

78. The computer program product of claim 59, wherein at least one of the plurality of cameras is mounted on a camera pole apparatus.

79. The computer program product of claim 59, wherein one or more mirrors are used to produce at least one of the camera outputs.

80. The computer program product of claim 59, wherein the position information includes rate of change of position information of the equipment.

81. The computer program product of claim 59, wherein a computer generated three dimensional environment is created using the position information, wherein the position information is associated with equipment at the ongoing event.

82. The computer program product of claim 59, wherein the selected camera output is a different camera output from a previously selected camera output that was selected according to the previous event state.

83. The computer program product of claim 59, wherein the current event state is determined in response to the received position information and in accordance with a predetermined three-dimensional space occupied by the equipment.

84. The computer program product of claim 83, wherein the equipment includes two or more sensors for transmission of position data, with which the three-dimensional positional space presently occupied by the equipment at the ongoing event may be determined in real time.

85. The computer program product of claim 83, wherein the equipment includes two or more sensors for transmission of position data, with which the three-dimensional positional space presently occupied by the ball and/or other gaming projectile may be determined in real time.

86. The computer program product of claim 59, wherein the received position information is transmitted from equipment at the ongoing event such that the received position information provides real time position information of the equipment from which the position information was transmitted.

87. The computer program product of claim 86, wherein the position information is transmitted as a signal comprising at least one of RADAR, LIDAR, SONAR, or infrared signals.

88. A method of configuring a computer system, the method comprising:
establishing a network communication link from a source computer to the computer system;
transmitting program instructions from the source computer to the computer system over the network communication link, wherein the transmitted program instructions are configured to be stored in the computer system and executed, to receive camera outputs at a processor from a plurality of cameras, each of which is configured to provide a respective camera output showing respective field of view coverage of an ongoing event, receive position information at the processor,
wherein the position information is associated with equipment at the ongoing event such that the received position information provides real time position information of the equipment, store multiple event states into memory from which the data may be read by the processor;
wherein each event state is programmed responsive to event information and intelligence data extracted from the ongoing event and/or unique logical combinations of event information and intelligence data extracted from the ongoing event in real time;
wherein the event information and intelligence data includes event participant assignment execution outcome and results, event participant decision making outcome and results, and event participant interactions with other participants;
wherein the event information and intelligence data are extracted in real time responsive to the equipment position information inputs, conditional logic responsive to the equipment position information inputs, and/or other logical combinations of equipment position information inputs;

wherein the ongoing event has a current event state, where the current event state is identified in real time as one of the preprogrammed multiple event states;

wherein the current event state is updated in real time and may involve a transition from a previous event state that is different from the current event state;

wherein the current event state transition is responsive to changes in event information and intelligence data extracted from the received position information in real time; and wherein the transmitted program instructions are further configured such that, when executed by the processor, the computer system receives the selected camera output from among the received plurality of camera outputs in response to the current event state such that the selected camera output provides its respective field of view coverage of the ongoing event and produces a processor signal comprising the selected camera output.

89. The method of computer system configuring of claim 88, wherein the selected camera output is a different camera output from a previously selected camera output that was selected according to the previous event state.

90. The method of computer system configuring of claim 88, wherein the current event state is determined in response to the received position information and in accordance with a predetermined three-dimensional space occupied by the equipment.

91. The method of claim 90, wherein the equipment includes two or more sensors for transmission of position data, with which the three-dimensional positional space presently occupied by the equipment at the ongoing event may be determined in real time.

92. The method of claim 90, wherein the equipment includes two or more sensors for transmission of position data, with which the three-dimensional positional space presently occupied by the ball and/or other gaming projectile may be determined in real time.

93. The method of computer system configuring of claim 88, wherein the received position information is transmitted from equipment at the ongoing event such that the received position information provides real time position information of the equipment from which the position information was transmitted.

94. The method of computer system configuring of claim 88, further comprising upon selecting the selected camera output in response to the current event state, combining the selected camera output with a camera output different from the selected camera output.

95. The method of computer system configuring of claim 93, wherein the position information is transmitted as a signal comprising at least one of RADAR, LIDAR, SONAR, or infrared signals.

* * * * *